US012517690B2

(12) United States Patent
Sun et al.

(10) Patent No.: US 12,517,690 B2
(45) **Date of Patent: *Jan. 6, 2026**

(54) CROSS DEVICE INTERACTIONS

(71) Applicant: Apple Inc., Cupertino, CA (US)

(72) Inventors: Tianjia Sun, Santa Clara, CA (US); Chang Zhang, San Jose, CA (US); Paul X. Wang, Cupertino, CA (US); Aaron Wang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/893,844

(22) Filed: Sep. 23, 2024

(65) Prior Publication Data

US 2025/0123786 A1 Apr. 17, 2025

Related U.S. Application Data

(63) Continuation of application No. 17/821,457, filed on Aug. 22, 2022, now Pat. No. 12,099,772, which is a (Continued)

(51) Int. Cl.
*G06F 3/14* (2006.01)
*G06F 3/01* (2006.01)
(Continued)

(52) U.S. Cl.
CPC ............ *G06F 3/1423* (2013.01); *G06F 3/013* (2013.01); *G06F 3/0238* (2013.01);
(Continued)

(58) Field of Classification Search
CPC .... G06F 3/013; G06F 3/04812; G06F 3/1423; G06F 3/04845; G06F 3/0485;
(Continued)

(56) References Cited

U.S. PATENT DOCUMENTS 5,483,261 A 1/1996 Yasutake
5,488,204 A 1/1996 Mead et al.
(Continued)

FOREIGN PATENT DOCUMENTS

CN 104246678 A 12/2014
EP 2073514 A2 6/2009
(Continued)

OTHER PUBLICATIONS

Non-Final Office Action received for U.S. Appl. No. 18/328,704, mailed on Dec. 18, 2024, 28 pages.
(Continued)

*Primary Examiner* — Muhammad N Edun
(74) *Attorney, Agent, or Firm* — Kubota & Basol LLP

(57) ABSTRACT

The present disclosure generally relates to engaging in cross device interactions. The method includes at a first device with a first display, while a second device having a second display is placed over a first region of the first display, detecting, via input devices of the first device, a first input. In response to detecting the first input and in accordance with a determination that the first input occurred while focus was directed to the second device, the method includes causing a response to the first input to be displayed on the second display. In response to detecting the first input and in accordance with a determination that the first input occurred while focus was directed to the first device, the method includes displaying, on the first display, a response to the first input without causing a response to the first input to be displayed on the second display.

27 Claims, 57 Drawing Sheets

Related U.S. Application Data continuation of application No. 16/506,697, filed on Jul. 9, 2019, now Pat. No. 11,422,765.

(60) Provisional application No. 62/696,024, filed on Jul. 10, 2018.

(51) Int. Cl.

| | |
|---|---|
| ***G06F 3/023*** | (2006.01) |
| ***G06F 3/04812*** | (2022.01) |
| ***G06F 3/04845*** | (2022.01) |
| ***G06F 3/0485*** | (2022.01) |
| ***G06F 3/04883*** | (2022.01) |
| ***G06F 3/16*** | (2006.01) |

(52) U.S. Cl.
CPC ...... *G06F 3/04812* (2013.01); *G06F 3/04845* (2013.01); *G06F 3/0485* (2013.01); *G06F 3/04883* (2013.01); *G06F 3/167* (2013.01); *G06F 2203/0381* (2013.01)

(58) Field of Classification Search
CPC .... G06F 3/04883; G06F 3/167; G06F 3/0346; G06F 3/04842; G06F 3/1454; G06F 3/0238; G06F 2203/0381; G09G 2354/00
See application file for complete search history.

(56) References Cited

U.S. PATENT DOCUMENTS

| | | | |
|---|---|---|---|
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,570,557 | B1 | 5/2003 | Westerman et al. |
| 6,677,932 | B1 | 1/2004 | Westerman |
| 6,690,387 | B2 | 2/2004 | Zimmerman et al. |
| 6,839,741 | B1 | 1/2005 | Tsai |
| 7,015,894 | B2 | 3/2006 | Morohoshi |
| 7,184,064 | B2 | 2/2007 | Zimmerman et al. |
| 7,277,901 | B2 | 10/2007 | Parker et al. |
| 7,483,899 | B2 | 1/2009 | Berry et al. |
| 7,503,007 | B2 | 3/2009 | Goodman et al. |
| 7,529,796 | B2 | 5/2009 | Riddle |
| 7,614,008 | B2 | 11/2009 | Ording |
| 7,633,076 | B2 | 12/2009 | Huppi et al. |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,707,249 | B2 | 4/2010 | Spataro et al. |
| 7,756,935 | B2 | 7/2010 | Gaucas |
| 7,761,507 | B2 | 7/2010 | Herf et al. |
| 7,844,914 | B2 | 11/2010 | Andre et al. |
| 7,957,762 | B2 | 6/2011 | Herz et al. |
| 7,970,850 | B1 | 6/2011 | Callanan et al. |
| 8,006,002 | B2 | 8/2011 | Kalayjian et al. |
| 8,060,820 | B2 | 11/2011 | Bedi et al. |
| 8,108,464 | B1 | 1/2012 | Rochelle et al. |
| 8,239,784 | B2 | 8/2012 | Hotelling et al. |
| 8,279,180 | B2 | 10/2012 | Hotelling et al. |
| 8,381,135 | B2 | 2/2013 | Hotelling et al. |
| 8,453,052 | B1 | 5/2013 | Newman et al. |
| 8,464,147 | B2 | 6/2013 | Seetharam |
| 8,479,122 | B2 | 7/2013 | Hotelling et al. |
| 8,713,106 | B2 | 4/2014 | Spataro et al. |
| 8,806,382 | B2 | 8/2014 | Matsuda |
| 8,826,148 | B2 | 9/2014 | Yuniardi et al. |
| 8,826,375 | B2 | 9/2014 | Smith et al. |
| 9,031,543 | B2 | 5/2015 | Lee |
| 9,165,285 | B2 | 10/2015 | Schultz et al. |
| 9,189,480 | B2 | 11/2015 | Thiruvidan et al. |
| 9,282,167 | B2 | 3/2016 | Jo et al. |
| 9,348,458 | B2 | 5/2016 | Hotelling et al. |
| 9,413,891 | B2 | 8/2016 | Dwyer et al. |
| 9,418,117 | B1 | 8/2016 | Molina et al. |
| 9,603,123 | B1 | 3/2017 | Jackson et al. |
| 9,703,468 | B2 | 7/2017 | Reeves et al. |
| 9,832,195 | B2 | 11/2017 | Gillett et al. |
| 9,852,761 | B2 | 12/2017 | Anzures |
| 9,933,937 | B2 | 4/2018 | Lemay et al. |
| 10,185,932 | B2 | 1/2019 | Costenaro et al. |
| 10,291,560 | B2 | 5/2019 | Bern et al. |
| 10,318,034 | B1 | 6/2019 | Hauenstein et al. |
| 11,079,995 | B1 | 8/2021 | Hulbert et al. |
| 11,122,158 | B2 | 9/2021 | Christie et al. |
| 11,310,178 | B2 | 4/2022 | Crevier et al. |
| 11,310,181 | B2 | 4/2022 | Park et al. |
| 11,422,765 | B2 | 8/2022 | Sun et al. |
| 11,556,225 | B1 | 1/2023 | Romagnoli et al. |
| 11,558,323 | B1 | 1/2023 | Yamamoto et al. |
| 11,604,561 | B2 | 3/2023 | Deets et al. |
| 11,616,749 | B2 | 3/2023 | Voss |
| 12,107,803 | B2 | 10/2024 | Estrada et al. |
| 12,294,555 | B2 | 5/2025 | Kim |
| 2002/0015024 | A1 | 2/2002 | Westerman et al. |
| 2003/0131062 | A1 | 7/2003 | Miyashita |
| 2003/0212746 | A1 | 11/2003 | Fitzpatrick et al. |
| 2003/0236752 | A1 | 12/2003 | Dawson et al. |
| 2005/0165584 | A1 | 7/2005 | Boody et al. |
| 2005/0165920 | A1 | 7/2005 | Kerr et al. |
| 2005/0190059 | A1 | 9/2005 | Wehrenberg |
| 2006/0017692 | A1 | 1/2006 | Wehrenberg et al. |
| 2006/0033724 | A1 | 2/2006 | Chaudhri et al. |
| 2006/0036703 | A1 | 2/2006 | Fulmer et al. |
| 2006/0041848 | A1 | 2/2006 | Lira |
| 2006/0053195 | A1 | 3/2006 | Schneider et al. |
| 2006/0197753 | A1 | 9/2006 | Hotelling |
| 2006/0256008 | A1 | 11/2006 | Rosenberg |
| 2007/0049258 | A1 | 3/2007 | Thibeault |
| 2007/0168444 | A1 | 7/2007 | Chen et al. |
| 2007/0222768 | A1 | 9/2007 | Geurts et al. |
| 2008/0028017 | A1 | 1/2008 | Garbow et al. |
| 2008/0028323 | A1 | 1/2008 | Rosen et al. |
| 2008/0298720 | A1 | 12/2008 | Klassen et al. |
| 2009/0019392 | A1 | 1/2009 | Higuchi et al. |
| 2009/0037605 | A1 | 2/2009 | Li |
| 2009/0322689 | A1 | 12/2009 | Kwong et al. |
| 2010/0081475 | A1 | 4/2010 | Chiang et al. |
| 2010/0184375 | A1 | 7/2010 | Ohkita |
| 2010/0235746 | A1 | 9/2010 | Anzures |
| 2010/0257457 | A1 | 10/2010 | De Goes |
| 2010/0287513 | A1 | 11/2010 | Singh et al. |
| 2011/0066685 | A1 | 3/2011 | Kitada et al. |
| 2011/0078573 | A1 | 3/2011 | Ooba |
| 2011/0083111 | A1 | 4/2011 | Forutanpour et al. |
| 2011/0107234 | A1 | 5/2011 | Lee et al. |
| 2011/0209102 | A1 | 8/2011 | Hinckley et al. |
| 2011/0225178 | A1 | 9/2011 | Ingrassia et al. |
| 2012/0131491 | A1 | 5/2012 | Lee |
| 2012/0136951 | A1 | 5/2012 | Mulder |
| 2012/0154294 | A1 | 6/2012 | Hinckley et al. |
| 2012/0284344 | A1 | 11/2012 | Costenaro et al. |
| 2012/0284345 | A1 | 11/2012 | Costenaro et al. |
| 2012/0289203 | A1 | 11/2012 | Santo et al. |
| 2012/0317489 | A1 | 12/2012 | Kuulusa et al. |
| 2013/0024778 | A1 | 1/2013 | Reeves et al. |
| 2013/0036364 | A1 | 2/2013 | Johnson |
| 2013/0076595 | A1 | 3/2013 | Sirpal et al. |
| 2013/0198304 | A1 | 8/2013 | Jung |
| 2013/0321340 | A1 | 12/2013 | Seo et al. |
| 2014/0006994 | A1 | 1/2014 | Koch et al. |
| 2014/0101575 | A1 | 4/2014 | Kwak et al. |
| 2014/0101578 | A1 | 4/2014 | Kwak et al. |
| 2014/0101579 | A1 | 4/2014 | Kim et al. |
| 2014/0104643 | A1 | 4/2014 | Park |
| 2014/0115469 | A1 | 4/2014 | Pendergast et al. |
| 2014/0123038 | A1 | 5/2014 | Ahn et al. |
| 2014/0152576 | A1 | 6/2014 | Kim et al. |
| 2014/0164365 | A1 | 6/2014 | Graham |
| 2014/0187162 | A1 | 7/2014 | Mei |
| 2014/0188989 | A1 | 7/2014 | Stekkelpak et al. |
| 2014/0195928 | A1 | 7/2014 | Carlen |

(56) References Cited

U.S. PATENT DOCUMENTS

| | | | |
|---|---|---|---|
| 2014/0247207 | A1 | 9/2014 | Pahud et al. |
| 2014/0247346 | A1 | 9/2014 | Bozarth et al. |
| 2014/0280748 | A1 | 9/2014 | Hinckley et al. |
| 2014/0310365 | A1 | 10/2014 | Sample et al. |
| 2014/0323162 | A1 | 10/2014 | Ezra et al. |
| 2014/0365912 | A1 | 12/2014 | Shaw et al. |
| 2014/0372390 | A1 | 12/2014 | Matsuzawa et al. |
| 2015/0009189 | A1 | 1/2015 | Nagara |
| 2015/0026595 | A1 | 1/2015 | Lu et al. |
| 2015/0061968 | A1 | 3/2015 | Park et al. |
| 2015/0074615 | A1 | 3/2015 | Han et al. |
| 2015/0095430 | A1 | 4/2015 | Kaushik et al. |
| 2015/0121535 | A1 | 4/2015 | Fiss |
| 2015/0143211 | A1 | 5/2015 | Kaufthal et al. |
| 2015/0195220 | A1 | 7/2015 | Hawker et al. |
| 2015/0220493 | A1 | 8/2015 | Hayashi et al. |
| 2015/0242110 | A1 | 8/2015 | Balakrishnan et al. |
| 2015/0264111 | A1 | 9/2015 | Aleksandrov |
| 2015/0317120 | A1 | 11/2015 | Kim et al. |
| 2015/0338888 | A1 | 11/2015 | Kim et al. |
| 2015/0347368 | A1 | 12/2015 | Carlen et al. |
| 2015/0350134 | A1 | 12/2015 | Yang et al. |
| 2016/0035312 | A1 | 2/2016 | Lee et al. |
| 2016/0124698 | A1 | 5/2016 | Reeves et al. |
| 2016/0198499 | A1 | 7/2016 | Lee et al. |
| 2016/0234135 | A1 | 8/2016 | Kim |
| 2016/0234659 | A1 | 8/2016 | Luo |
| 2016/0308940 | A1 | 10/2016 | Procopio et al. |
| 2017/0032021 | A1 | 2/2017 | Watanachote |
| 2017/0149906 | A1 | 5/2017 | Demaris et al. |
| 2017/0164140 | A1 | 6/2017 | Li et al. |
| 2017/0177194 | A1 | 6/2017 | Lyons et al. |
| 2017/0177610 | A1 | 6/2017 | Knotts et al. |
| 2017/0187656 | A1 | 6/2017 | Bastide et al. |
| 2017/0273050 | A1 | 9/2017 | Levak et al. |
| 2017/0285895 | A1 | 10/2017 | Nathwani et al. |
| 2018/0018636 | A1 | 1/2018 | Bisti et al. |
| 2018/0095611 | A1 | 4/2018 | Kuscher et al. |
| 2018/0121465 | A1 | 5/2018 | Bajaj et al. |
| 2018/0145937 | A1 | 5/2018 | Choi et al. |
| 2018/0225132 | A1 | 8/2018 | Pierce et al. |
| 2018/0246933 | A1 | 8/2018 | Darrow et al. |
| 2018/0352072 | A1 | 12/2018 | Christie et al. |
| 2019/0179501 | A1 | 6/2019 | Seeley et al. |
| 2019/0243889 | A1 | 8/2019 | Carter et al. |
| 2019/0334847 | A1 | 10/2019 | Genovese et al. |
| 2019/0361950 | A1 | 11/2019 | Ganesan et al. |
| 2019/0362002 | A1 | 11/2019 | Dowling et al. |
| 2020/0019367 | A1 | 1/2020 | Sun et al. |
| 2020/0125792 | A1 | 4/2020 | Rochelle et al. |
| 2020/0274916 | A1 | 8/2020 | Choi |
| 2020/0356221 | A1 | 11/2020 | Behzadi et al. |
| 2021/0103366 | A1 | 4/2021 | Behzadi et al. |
| 2021/0110327 | A1 | 4/2021 | Bellet et al. |
| 2021/0133681 | A1 | 5/2021 | Dhaliwal et al. |
| 2021/0174188 | A1 | 6/2021 | Hewitt et al. |
| 2021/0357169 | A1 | 11/2021 | Hulbert et al. |
| 2022/0014486 | A1 | 1/2022 | Botwick et al. |
| 2022/0108413 | A1 | 4/2022 | Hack et al. |
| 2022/0155920 | A1 | 5/2022 | Behzadi et al. |
| 2023/0053643 | A1 | 2/2023 | Yamamoto et al. |
| 2023/0078889 | A1 | 3/2023 | Sun et al. |
| 2023/0208662 | A1 | 6/2023 | Choi |
| 2023/0379286 | A1 | 11/2023 | Maruyama et al. |
| 2024/0143553 | A1 | 5/2024 | Chang et al. |
| 2024/0281189 | A1 | 8/2024 | Hulbert et al. |
| 2025/0028688 | A1 | 1/2025 | Chang et al. |
| 2025/0165207 | A1 | 5/2025 | Hulbert et al. |
| 2025/0224852 | A1 | 7/2025 | Behzadi et al. |

FOREIGN PATENT DOCUMENTS

| | | | |
|---|---|---|---|
| EP | 2293531 | A1 | 3/2011 |
| EP | 3041313 | A1 | 7/2016 |
| JP | 2000-163031 | A | 6/2000 |
| JP | 2002-342033 | A | 11/2002 |
| JP | 2003-152615 | A | 5/2003 |
| WO | 2013/169849 | A2 | 11/2013 |
| WO | 2014/105276 | A1 | 7/2014 |
| WO | 2017/176036 | A1 | 10/2017 |

OTHER PUBLICATIONS

Final Office Action received for U.S. Appl. No. 18/328,704, mailed on Sep. 10, 2024, 26 pages.

Non-Final Office Action received for U.S. Appl. No. 18/328,704, mailed on Mar. 26, 2024, 26 pages.

Notice of Allowance received for U.S. Appl. No. 17/589,309, mailed on Jul. 3, 2024, 5 pages.

Corrected Notice of Allowability received for U.S. Appl. No. 17/086,205, mailed on Nov. 10, 2021, 2 pages.

Corrected Notice of Allowance received for U.S. Appl. No. 16/506,697, mailed on Jul. 18, 2022, 2 pages.

Final Office Action received for U.S. Appl. No. 16/147,183, mailed on Oct. 14, 2020, 18 pages.

Final Office Action received for U.S. Appl. No. 16/506,697, mailed on Mar. 25, 2021, 15 pages.

Final Office Action received for U.S. Appl. No. 17/589,309, mailed on Nov. 13, 2023, 24 pages.

International Search Report received for PCT Patent Application No. PCT/US2020/031732, mailed on Sep. 28, 2020, 5 pages.

International Search Report received for PCT Patent Application No. PCT/US2023/024377, mailed on Sep. 25, 2023, 4 pages.

Non-Final Office Action received for U.S. Appl. No. 16/147,183, mailed on Mar. 5, 2020, 16 pages.

Non-Final Office Action received for U.S. Appl. No. 16/506,697, mailed on Sep. 7, 2021, 15 pages.

Non-Final Office Action received for U.S. Appl. No. 16/506,697, mailed on Sep. 15, 2020, 13 pages.

Non-Final Office Action received for U.S. Appl. No. 16/584,685, mailed on Jan. 2, 2020, 17 pages.

Non-Final Office Action received for U.S. Appl. No. 17/389,041, mailed on May 3, 2023, 13 pages.

Non-Final Office Action received for U.S. Appl. No. 17/589,309, mailed on Jan. 31, 2023, 22 pages.

Non-Final Office Action received for U.S. Appl. No. 17/821,457, mailed on Jan. 30, 2024, 10 pages.

Notice of Allowance received for U.S. Appl. No. 17/589,309, mailed on Mar. 6, 2024, 7 pages.

Notice of Allowance received for U.S. Appl. No. 17/821,457, mailed on May 16, 2024, 5 pages.

Notice of Allowance received for U.S. Appl. No. 16/147,183, mailed on Apr. 2, 2021, 6 pages.

Notice of Allowance received for U.S. Appl. No. 16/506,697, mailed on Apr. 8, 2022, 8 pages.

Notice of Allowance received for U.S. Appl. No. 16/584,685, mailed on Jul. 27, 2020, 10 pages.

Notice of Allowance received for U.S. Appl. No. 17/086,205, mailed on Oct. 20, 2021, 10 pages.

Notice of Allowance received for U.S. Appl. No. 17/389,041, mailed on Dec. 13, 2023, 6 pages.

Search Report received for Chinese Patent Application No. 202210128123.8, mailed on Dec. 9, 2023, 4 pages (2 pages of English Translation and 2 pages of Official Copy).

Supplemental Notice of Allowability received for U.S. Appl. No. 17/086,205, mailed on Dec. 30, 2021, 5 pages.

Dearman et al., "Determining the orientation of proximate mobile devices using their back facing camera.", Proceedings of the SIGCHI Conference on Human Factors in Computing Systems., May 2012, 4 pages.

Gostner et al., "Usage of Spatial Information for Selection of Co-located Devices", Proceedings of the 10th International Conference on Human Computer Interaction with Mobile Devices and Services, Sep. 2008, pp. 427-430.

Hazas et al., "A Relative Positioning System for Co-located Mobile Devices", Proceedings of the 3rd International Conference on Mobile Systems, Applications, and Services, Jun. 2005, pp. 177-190.

(56) References Cited

OTHER PUBLICATIONS

Kortuem et al., "Sensing and Visualizing Spatial Relations of Mobile Devices", Proceedings of the 18th Annual ACM Symposium on User Interface Software and Technology, Oct. 2005, pp. 93-102.
Lee et al., "A Multi-Touch Three Dimensional Touch-Sensitive Tablet", CHI'85 Proceedings, Apr. 1985, pp. 21-25.
Rubine Dean, "Combining Gestures and Direct Manipulation", CHI'92, May 3-7, 1992, pp. 659-660.
Rubine Deanh. , "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Non-Final Office Action received for U.S. Appl. No. 18/634,130, mailed on Apr. 23, 2025, 19 pages.
Final Office Action received for U.S. Appl. No. 18/328,704, mailed on May 15, 2025, 30 pages.
Non-Final Office Action received for U.S. Appl. No. 18/904,945, mailed on Aug. 11, 2025, 32 pages.
Advisory Action received for U.S. Appl. No. 18/328,704, mailed on Jun. 16, 2025, 4 pages.

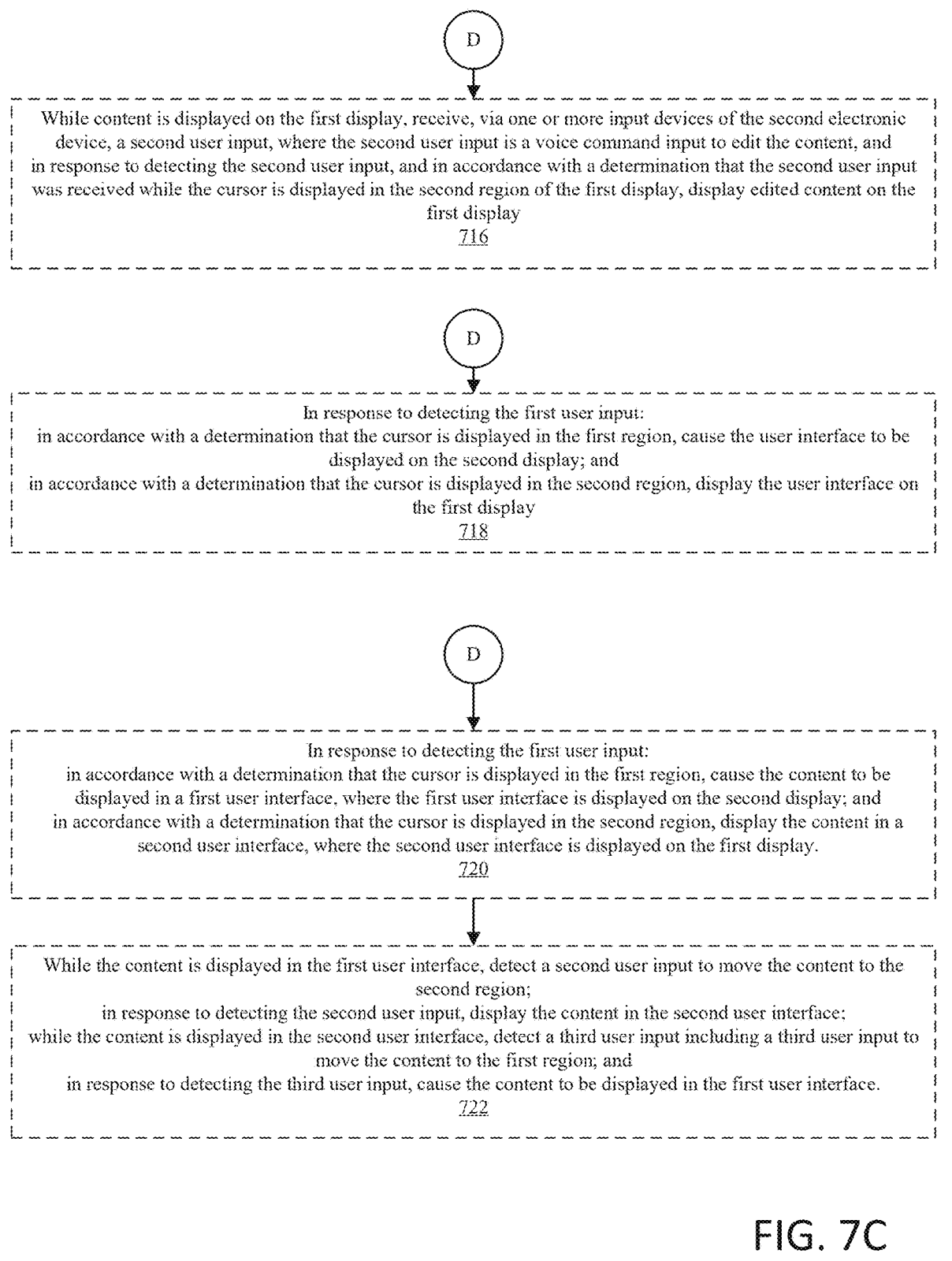

D

While content is displayed on the first display, receive, via one or more input devices of the second electronic device, a second user input, where the second user input is a voice command input to edit the content, and in response to detecting the second user input, and in accordance with a determination that the second user input was received while the cursor is displayed in the second region of the first display, display edited content on the first display
716

D

In response to detecting the first user input:
in accordance with a determination that the cursor is displayed in the first region, cause the user interface to be displayed on the second display; and
in accordance with a determination that the cursor is displayed in the second region, display the user interface on the first display
718

D

In response to detecting the first user input:
in accordance with a determination that the cursor is displayed in the first region, cause the content to be displayed in a first user interface, where the first user interface is displayed on the second display; and
in accordance with a determination that the cursor is displayed in the second region, display the content in a second user interface, where the second user interface is displayed on the first display.
720

While the content is displayed in the first user interface, detect a second user input to move the content to the second region;
in response to detecting the second user input, display the content in the second user interface;
while the content is displayed in the second user interface, detect a third user input including a third user input to move the content to the first region; and
in response to detecting the third user input, cause the content to be displayed in the first user interface.
722

FIG. 7C

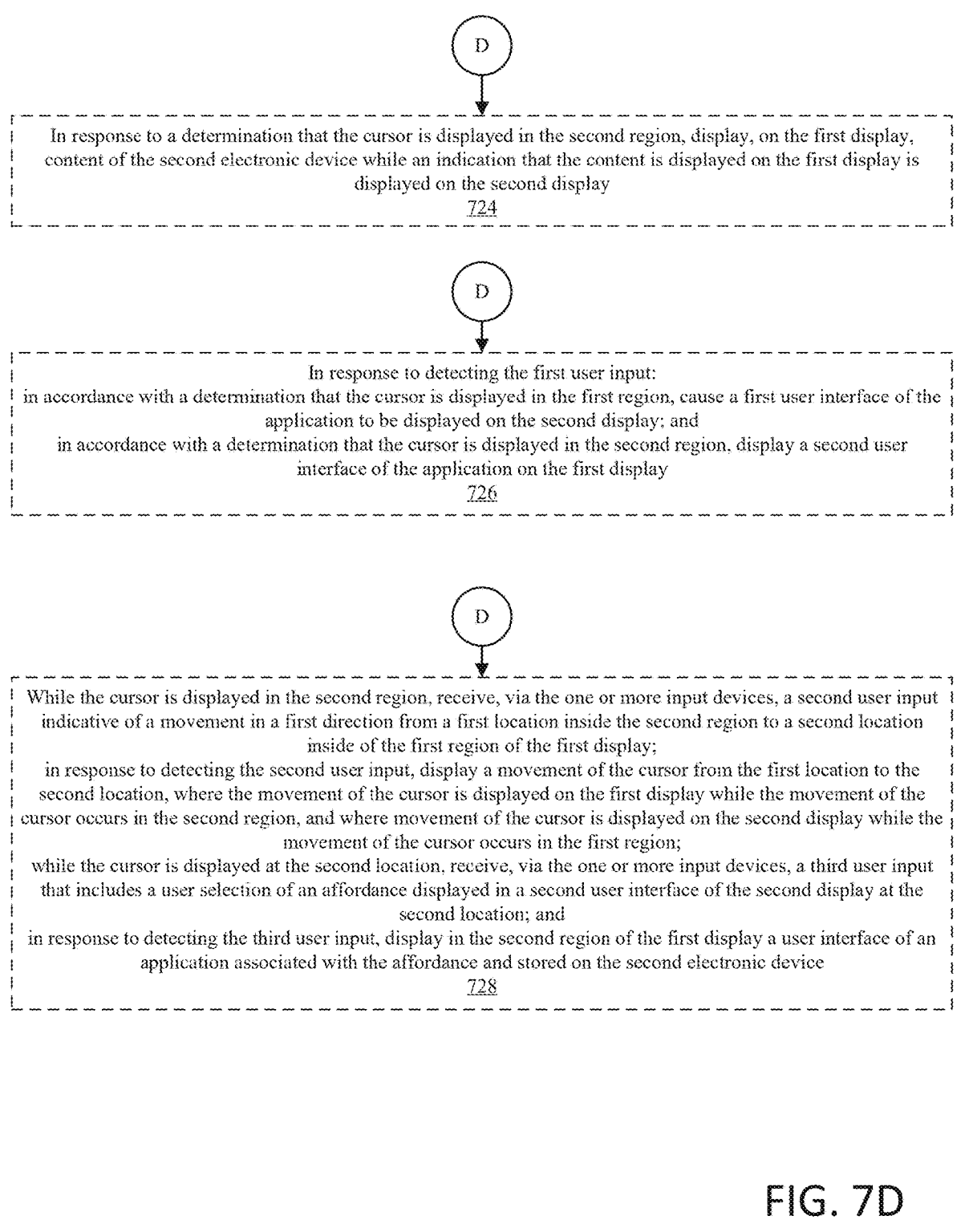

D

In response to a determination that the cursor is displayed in the second region, display, on the first display, content of the second electronic device while an indication that the content is displayed on the first display is displayed on the second display
724

D

In response to detecting the first user input:
in accordance with a determination that the cursor is displayed in the first region, cause a first user interface of the application to be displayed on the second display; and
in accordance with a determination that the cursor is displayed in the second region, display a second user interface of the application on the first display
726

D

While the cursor is displayed in the second region, receive, via the one or more input devices, a second user input indicative of a movement in a first direction from a first location inside the second region to a second location inside of the first region of the first display;
in response to detecting the second user input, display a movement of the cursor from the first location to the second location, where the movement of the cursor is displayed on the first display while the movement of the cursor occurs in the second region, and where movement of the cursor is displayed on the second display while the movement of the cursor occurs in the first region;
while the cursor is displayed at the second location, receive, via the one or more input devices, a third user input that includes a user selection of an affordance displayed in a second user interface of the second display at the second location; and
in response to detecting the third user input, display in the second region of the first display a user interface of an application associated with the affordance and stored on the second electronic device
728

FIG. 7D

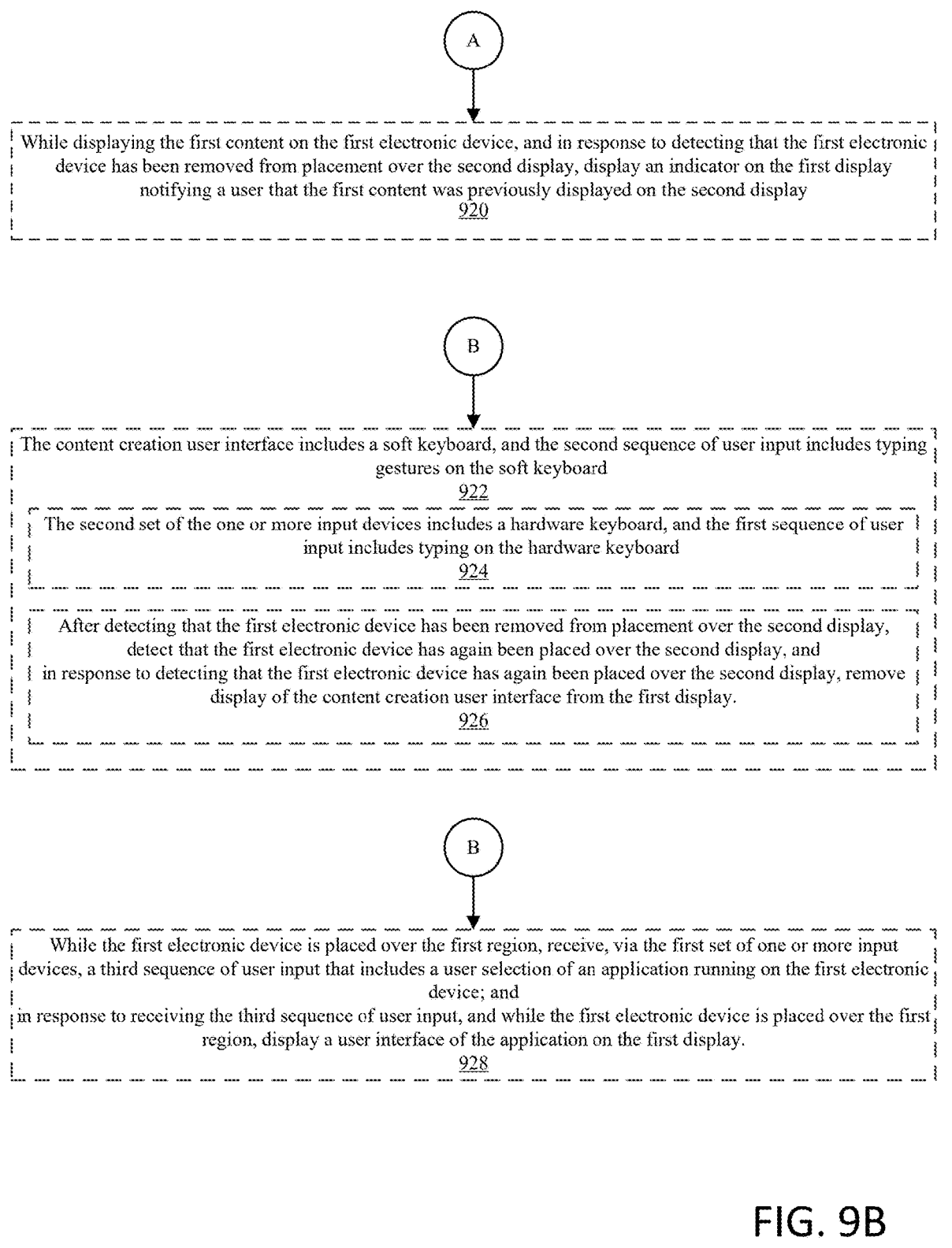

A

While displaying the first content on the first electronic device, and in response to detecting that the first electronic device has been removed from placement over the second display, display an indicator on the first display notifying a user that the first content was previously displayed on the second display
920

B

The content creation user interface includes a soft keyboard, and the second sequence of user input includes typing gestures on the soft keyboard
922

The second set of the one or more input devices includes a hardware keyboard, and the first sequence of user input includes typing on the hardware keyboard
924

After detecting that the first electronic device has been removed from placement over the second display, detect that the first electronic device has again been placed over the second display, and
in response to detecting that the first electronic device has again been placed over the second display, remove display of the content creation user interface from the first display.
926

B

While the first electronic device is placed over the first region, receive, via the first set of one or more input devices, a third sequence of user input that includes a user selection of an application running on the first electronic device; and
in response to receiving the third sequence of user input, and while the first electronic device is placed over the first region, display a user interface of the application on the first display.
928

FIG. 9B

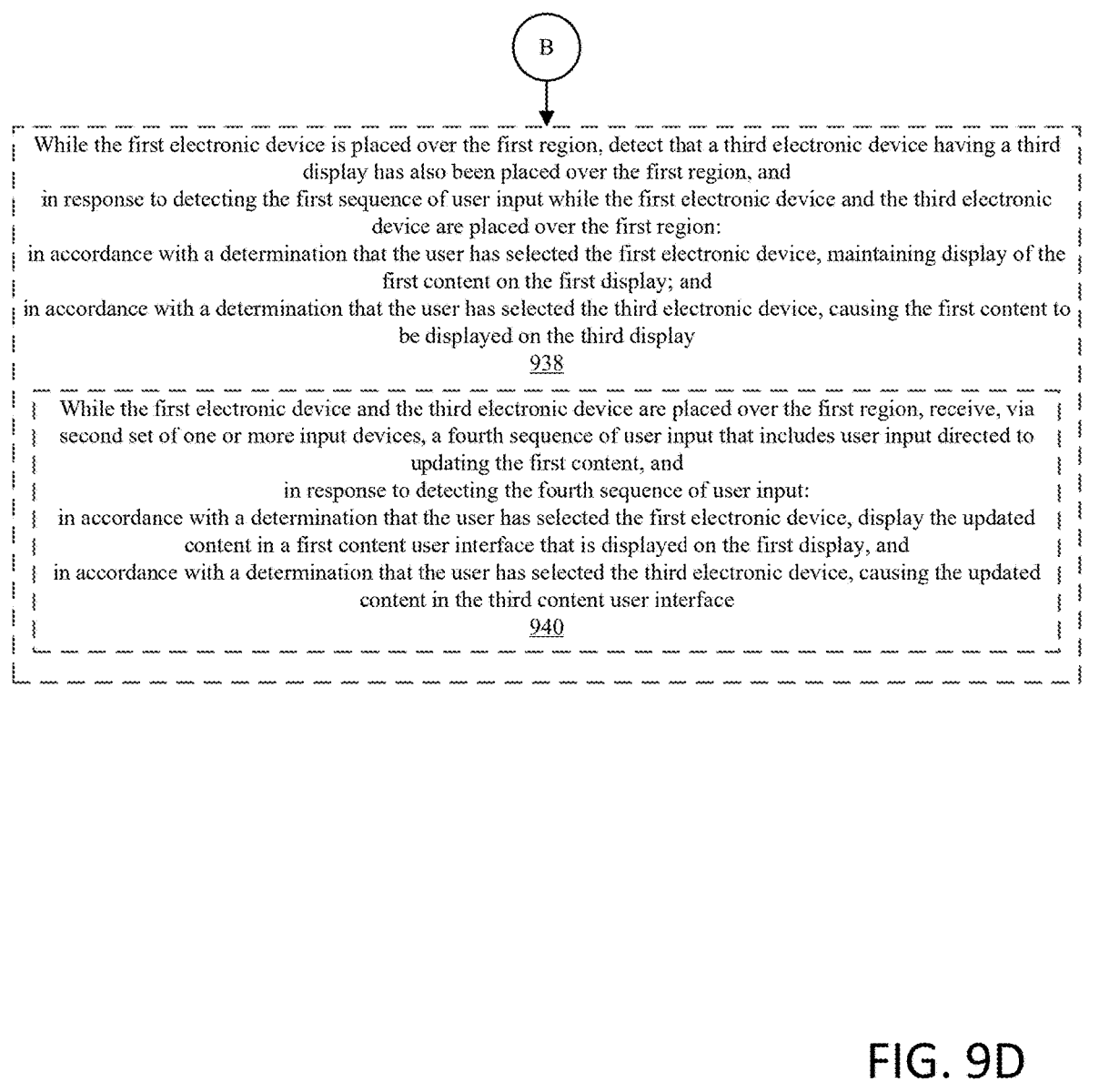

B

While the first electronic device is placed over the first region, detect that a third electronic device having a third display has also been placed over the first region, and
in response to detecting the first sequence of user input while the first electronic device and the third electronic device are placed over the first region:
in accordance with a determination that the user has selected the first electronic device, maintaining display of the first content on the first display; and
in accordance with a determination that the user has selected the third electronic device, causing the first content to be displayed on the third display
938

While the first electronic device and the third electronic device are placed over the first region, receive, via second set of one or more input devices, a fourth sequence of user input that includes user input directed to updating the first content, and
in response to detecting the fourth sequence of user input:
in accordance with a determination that the user has selected the first electronic device, display the updated content in a first content user interface that is displayed on the first display, and
in accordance with a determination that the user has selected the third electronic device, causing the updated content in the third content user interface
940

FIG. 9D

CROSS DEVICE INTERACTIONS

CROSS-REFERENCE TO RELATED APPLICATIONS

This application is a continuation of U.S. patent application Ser. No. 17/821,457, filed Aug. 22, 2022, and published on Mar. 16, 2023 as U.S Publication No. 2023-0078889, which is a continuation of U.S. patent application Ser. No. 16/506,697, filed Jul. 9, 2019, and issued on Aug. 23, 2022 as U.S. Pat. No. 11,422,765, which claims benefit of U.S. Provisional Patent Application No. 62/696,024, entitled "CROSS DEVICE INTERACTIONS," filed on Jul. 10, 2018, which are hereby incorporated by reference in their entireties for all purposes.

FIELD

The present disclosure relates generally to computer user interfaces, and more specifically to techniques for engaging in cross device interactions.

BACKGROUND

A user sometimes interacts with multiple devices to access content stored on or accessible through the respective devices. However, some devices have or are connected to displays that are less optimal for viewing content. Further, the user is sometimes more comfortable with using certain input devices to interact with content.

Exemplary user interface hierarchies include groups of related user interfaces used for: organizing files and applications; storing and/or displaying digital images, editable documents (e.g., word processing, spreadsheet, and presentation documents), and/or non-editable documents (e.g., secured files and/or .pdf documents); recording and/or playing video and/or music; text-based communication (e.g., e-mail, texts, tweets, and social networking); voice and/or video communication (e.g., phone calls and video conferencing); and web browsing. A user will, in some circumstances, need to perform such user interface navigations within or between a file management program (e.g., Finder from Apple Inc. of Cupertino, Calif.), an image management application (e.g., Photos from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), or a spreadsheet application (e.g., Numbers from Apple Inc. of Cupertino, Calif.).

But methods for performing these navigations and animating the transition between related user interfaces in a user interface hierarchy are cumbersome and inefficient. In addition, these methods take longer than necessary, thereby wasting energy. This latter consideration is particularly important in battery-operated devices.

Additionally, abrupt transitions between different user interfaces can be distracting and jarring for users, reducing the efficiency and enjoyment of the user when using the device.

BRIEF SUMMARY

Current methods for interacting with content displayed on electronic devices are outdated, time consuming, and inefficient. For example, some existing methods use complex and time-consuming user interfaces, which may include multiple key presses or keystrokes, and may include extraneous user interfaces. In addition, these methods take longer than necessary, thereby wasting energy. This latter consideration is particularly important in battery-operated devices.

Accordingly, the present technique provides electronic devices with faster, more efficient methods and interfaces for engaging in cross device interactions. Such methods and interfaces optionally complement or replace other methods for engaging in cross device interactions. Such methods and interfaces reduce the number, extent, and/or nature of the inputs from a user, reduce the cognitive burden on the user, and produce a more efficient human-machine interface. For battery-operated computing devices, such methods and interfaces conserve power and increase the time between battery charges. Further, such methods and interfaces also streamline content interaction across multiple devices, which reduce unnecessary received inputs and improves user efficiency and output.

The above deficiencies and other problems associated with user interfaces for electronic devices (e.g., with touch-sensitive surfaces) are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at a first electronic device with a first display and one or more input devices. While a second electronic device having a second display is placed over a first region of the first display, the method includes detecting, via the one or more input devices of the first electronic device, a first user input. In response to detecting the first user input, and in accordance with a determination that the first user input occurred while focus was directed to the second electronic device, the method includes causing a response to the first user input to be displayed on the second display. In response to detecting the first user input, and in accordance with a determination that the first user input occurred while focus was directed to the first electronic device, the method includes displaying, on the first display, a response to the first user input without causing a response to the first user input to be displayed on the second display.

In accordance with some embodiments, a non-transitory computer-readable storage medium comprising one or more programs, the one or more programs including instructions which, when executed by a first electronic device with a first display and one or more input devices, while a second electronic device having a second display is placed over a first region of the first display, cause the first electronic device to detect, via the one or more input devices of the first electronic device, a first user input. In response to detecting the first user input, and in accordance with a determination that the first user input occurred while focus was directed to the second electronic device, the instructions also cause the second electronic device to display, on the second display, a response to the first user input. In response to detecting the first user input, and in accordance with a determination that the first user input occurred while focus was directed to the first electronic device, the instructions also cause the first electronic device to display, on the first display, a response to the first user input without causing a response to the first user input to be displayed on the second display.

In accordance with some embodiments, a method is performed at a first electronic device with a first display and a first set of one or more input devices. While the first electronic device is placed over a first region of a second display of a second electronic device, the method includes receiving, via a second set of one or more input devices of the second electronic device, a first sequence of user input. In response to detecting the first sequence of user input, the method includes displaying first content generated based on the first sequence of user input on the first display. While displaying the first content generated based on the first sequence of user input on the first display, the method includes detecting that the first electronic device has been removed from placement over the second display. In response to detecting that the first electronic device has been removed from placement over the second display, the method includes displaying a content creation user interface on the first display while concurrently displaying the first content. While displaying the first content and the content creation user interface on the first display, the method includes receiving, via the first set of one or more input devices, a second sequence of user input that includes user input directed to the content creation user interface. In response to detecting the second sequence of user input, the method includes displaying second content concurrently with the first content.

In accordance with some embodiments, a non-transitory computer-readable storage medium comprising one or more programs, the one or more programs including instructions which, when executed by a first electronic device with a first display and a first set of one or more input devices, while the first electronic device is placed over a first region of a second display of a second electronic device, cause the first electronic device to receive, via a second set of one or more input devices of the second electronic device, a first sequence of user input. In response to detecting the first sequence of user input, the instructions also cause the first electronic device to display first content generated based on the first sequence of user input on the first display. While displaying the first content generated based on the first sequence of user input on the first display, the instructions also cause the first electronic device to detect that the first electronic device has been removed from placement over the second display. In response to detecting that the first electronic device has been removed from placement over the second display, the instructions also cause the first electronic device to display a content creation user interface on the first display while concurrently displaying the first content. While displaying the first content and the content creation user interface on the first display, the instructions also cause the first electronic device to receive, via the first set of one or more input devices, a second sequence of user input that includes user input directed to the content creation user interface. In response to detecting the second sequence of user input, the instructions also cause the first electronic device to display second content concurrently with the first content.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for interacting with content across multiple devices, thereby increasing the effectiveness, efficiency, and user satisfaction with such devices. Such methods and interfaces may complement or replace other methods for interacting with content across multiple devices.

BRIEF DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 7A-7F are flow diagrams of a process for engaging in cross device interactions in accordance with some embodiments.

FIGS. 9A-9D are flow diagrams of a process for interacting with content and user interface elements displayed on a display of an electronic device when the electronic device is placed over a display of another electronic device and when the electronic device is removed from the display of the other electronic device in accordance with some embodiments.

DESCRIPTION OF EMBODIMENTS

Figure 1A:
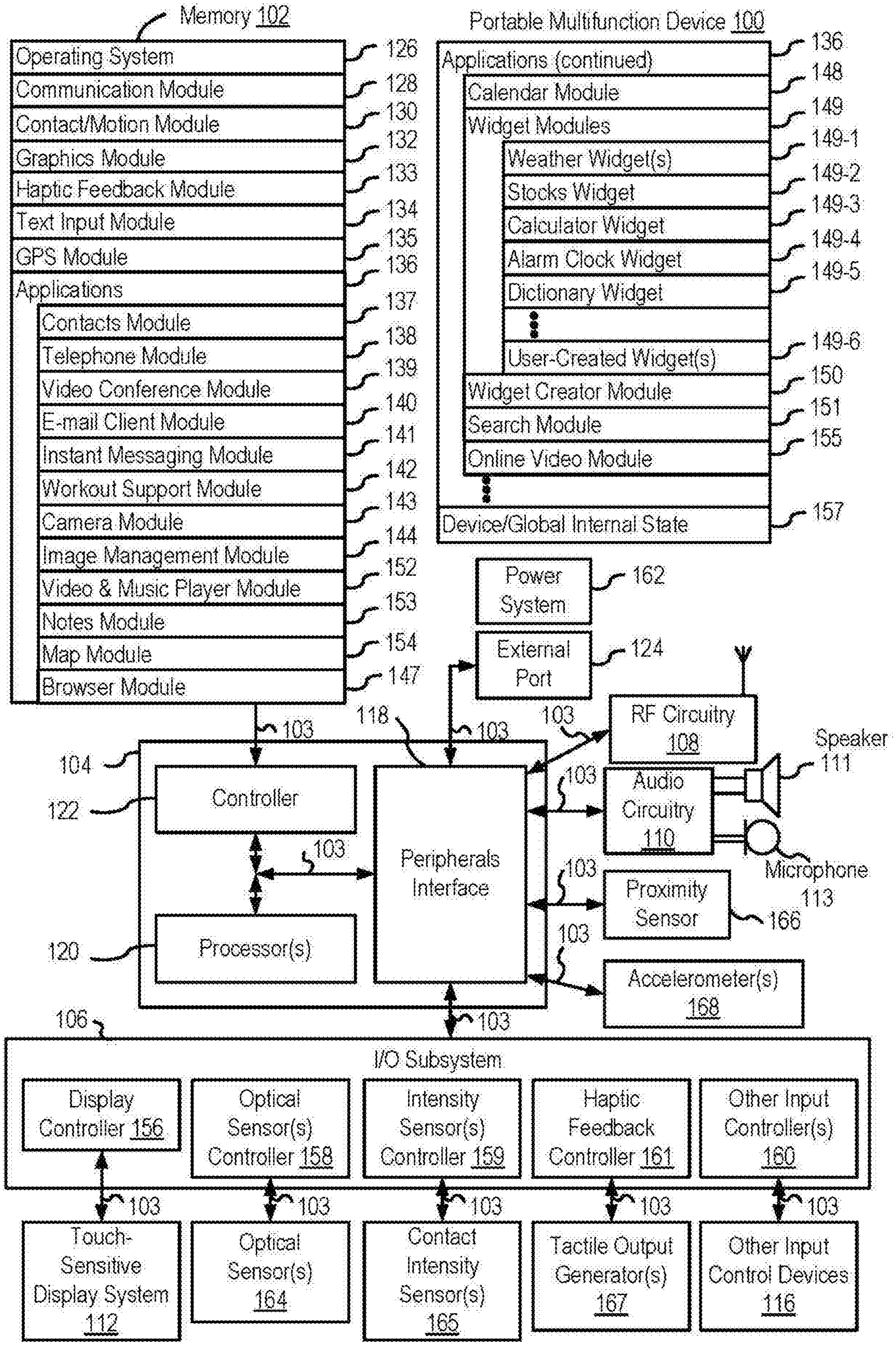
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for engaging in cross device interactions. Such techniques can reduce the cognitive burden on a user who interacts with content displayed in computer user interfaces of devices that are placed over each other, thereby enhancing productivity. Further, such techniques can reduce processor and battery power otherwise wasted on redundant user inputs.

Below, FIGS. 1A-1B, 2, 3, 4A-4B, and 5A-B provide a description of exemplary devices for performing the techniques for engaging in cross device interactions. FIGS. 6A-6Y illustrate exemplary user interfaces for engaging in cross device interactions. FIGS. 7A-7F are flow diagrams illustrating methods of engaging in cross device interactions. The user interfaces in FIGS. 6A-6Y are used to illustrate the processes described below, including the processes in FIGS. 7A-7F. FIGS. 8A-8L illustrate exemplary user interfaces for interacting with content displayed on a display of an electronic device when the electronic device is placed over a display of another electronic device and when the electronic device is removed from the display of the other electronic device in accordance with some embodiments. FIGS. 9A-9D are flow diagrams illustrating methods of interacting with content displayed on a display of an electronic device when the electronic device is placed over a display of another electronic device and when the electronic device is removed from the display of the other electronic device in accordance with some embodiments. The user interfaces in FIGS. 8A-8L are used to illustrate the processes described below, including the processes in FIGS. 9A-9D.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/ output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both cars) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
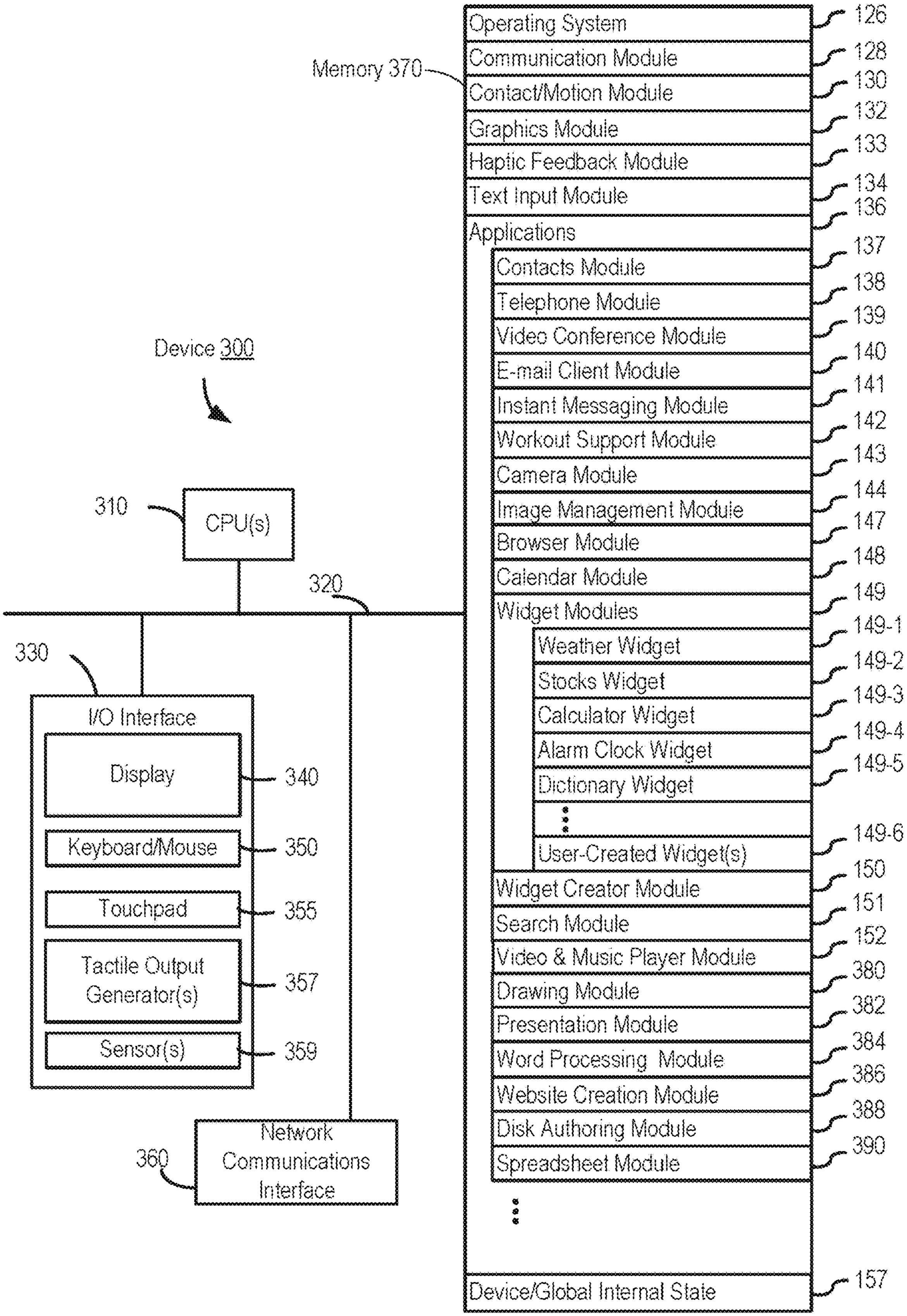
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, IOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client module 140, IM 141, browser 147, and any other application that needs text input).

GPS module 135 determines the location of the device and provides this information for use in various applications (e.g., to telephone module 138 for use in location-based dialing; to camera module 143 as picture/video metadata;

and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
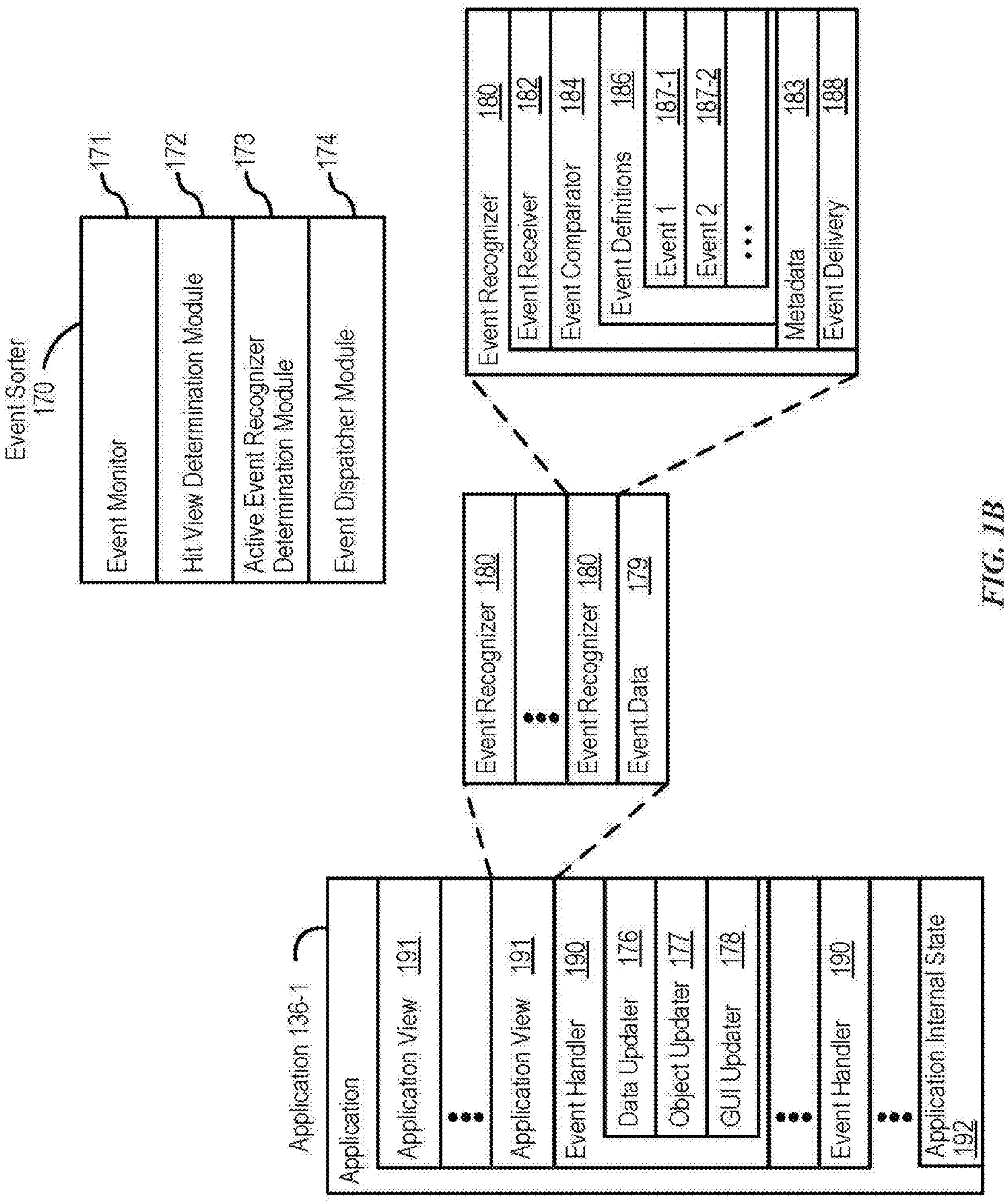
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
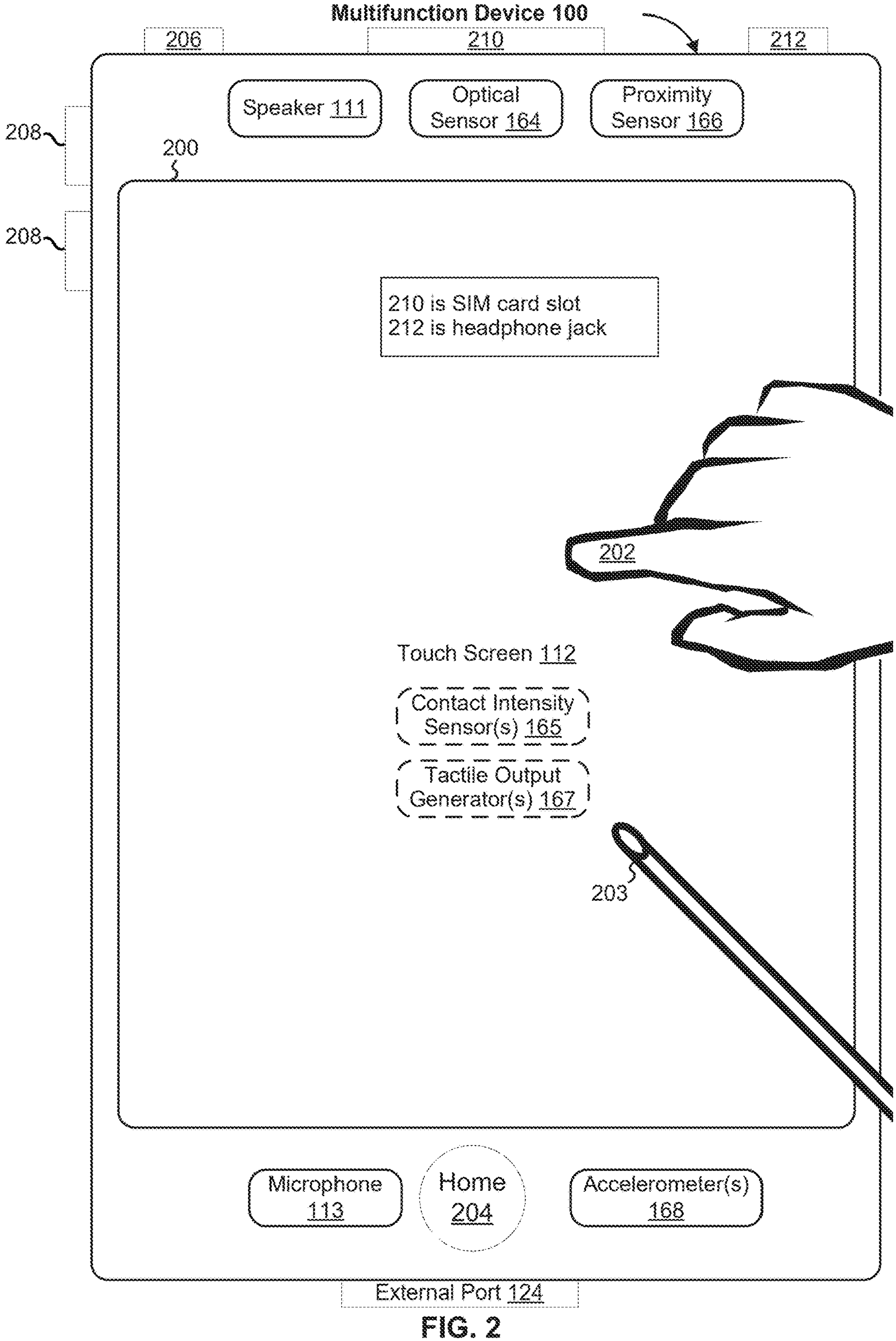
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
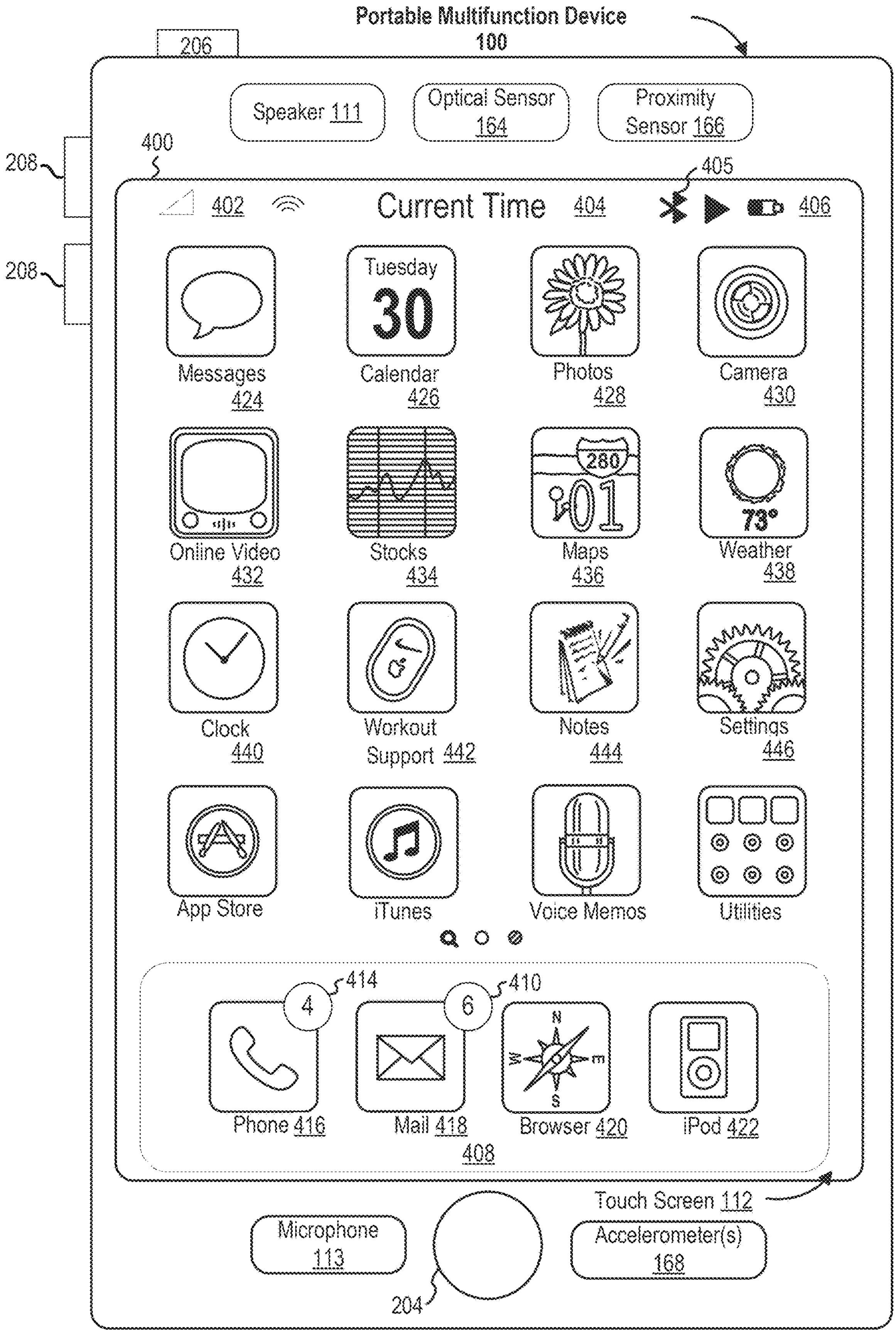
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
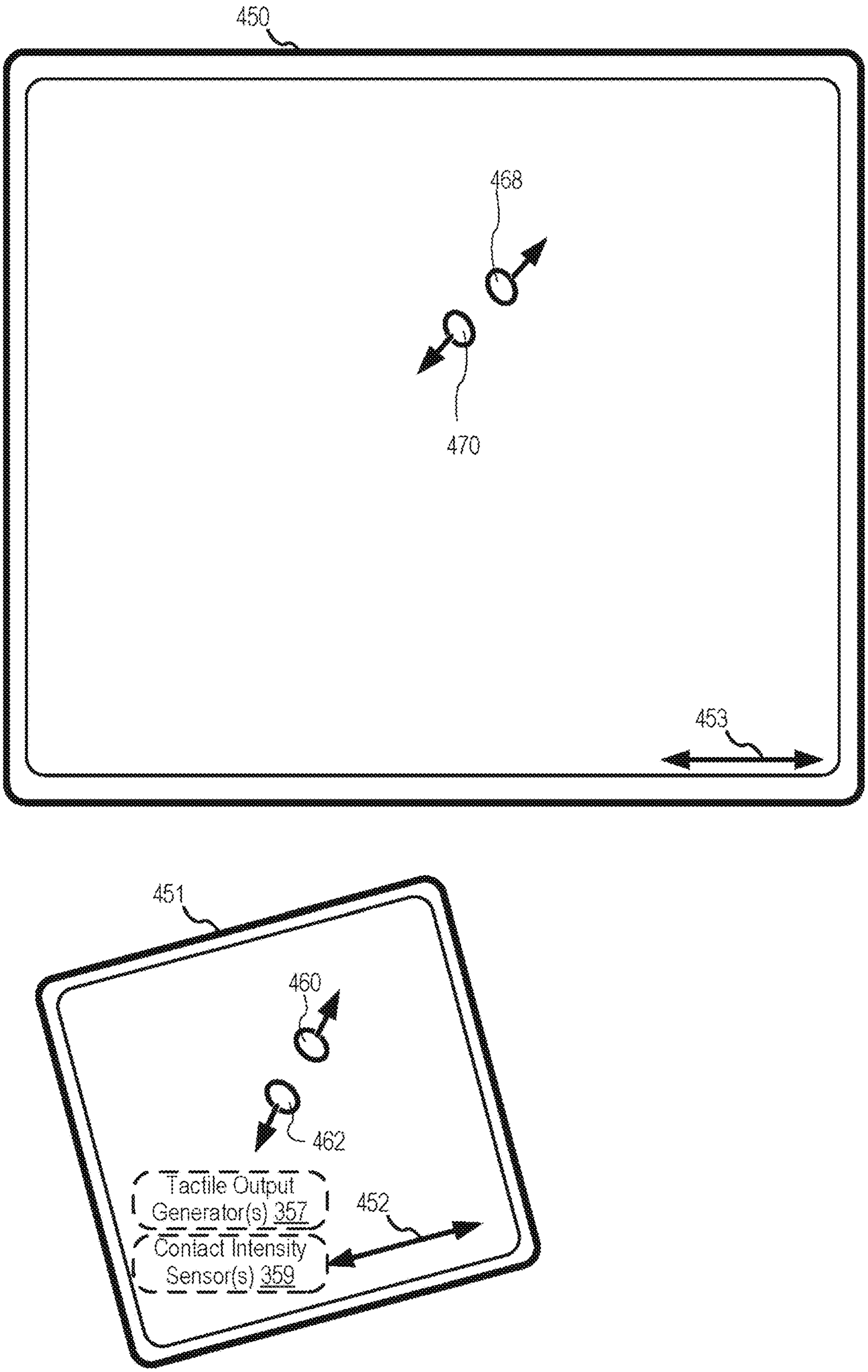
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
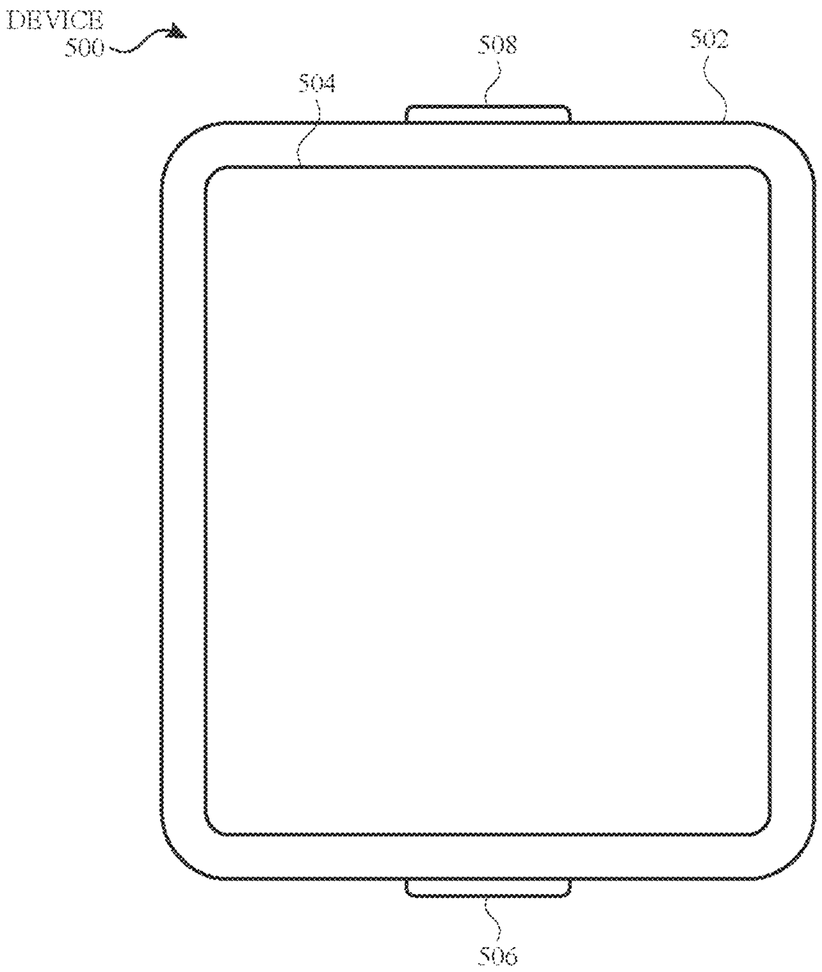
FIG. 5A illustrates a personal electronic device in accordance with some embodiments.
Figure 6A:
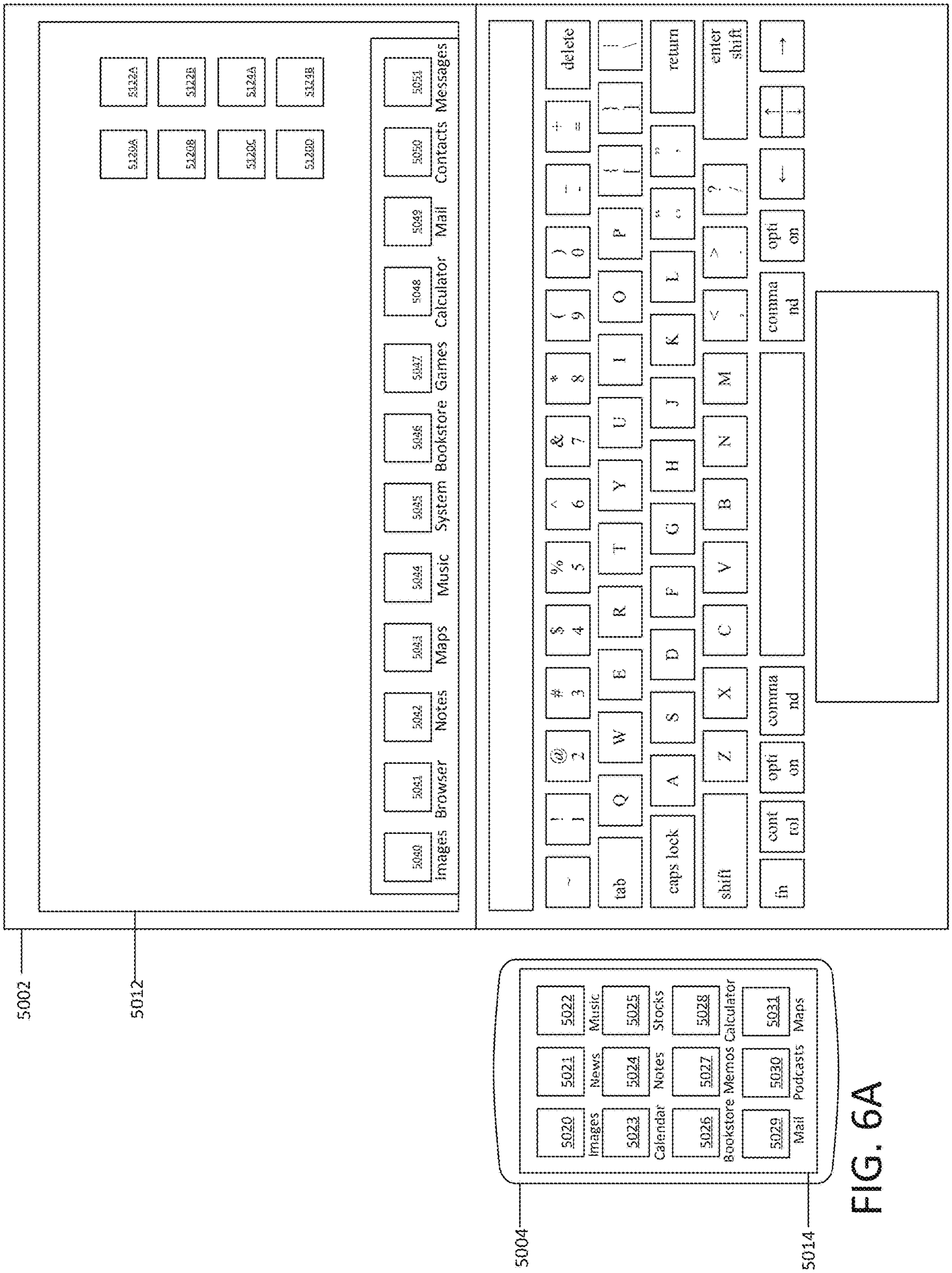
FIGS. 6A-6Y illustrate exemplary user interfaces for engaging in cross device interactions in accordance with some embodiments.
Figure 6A:
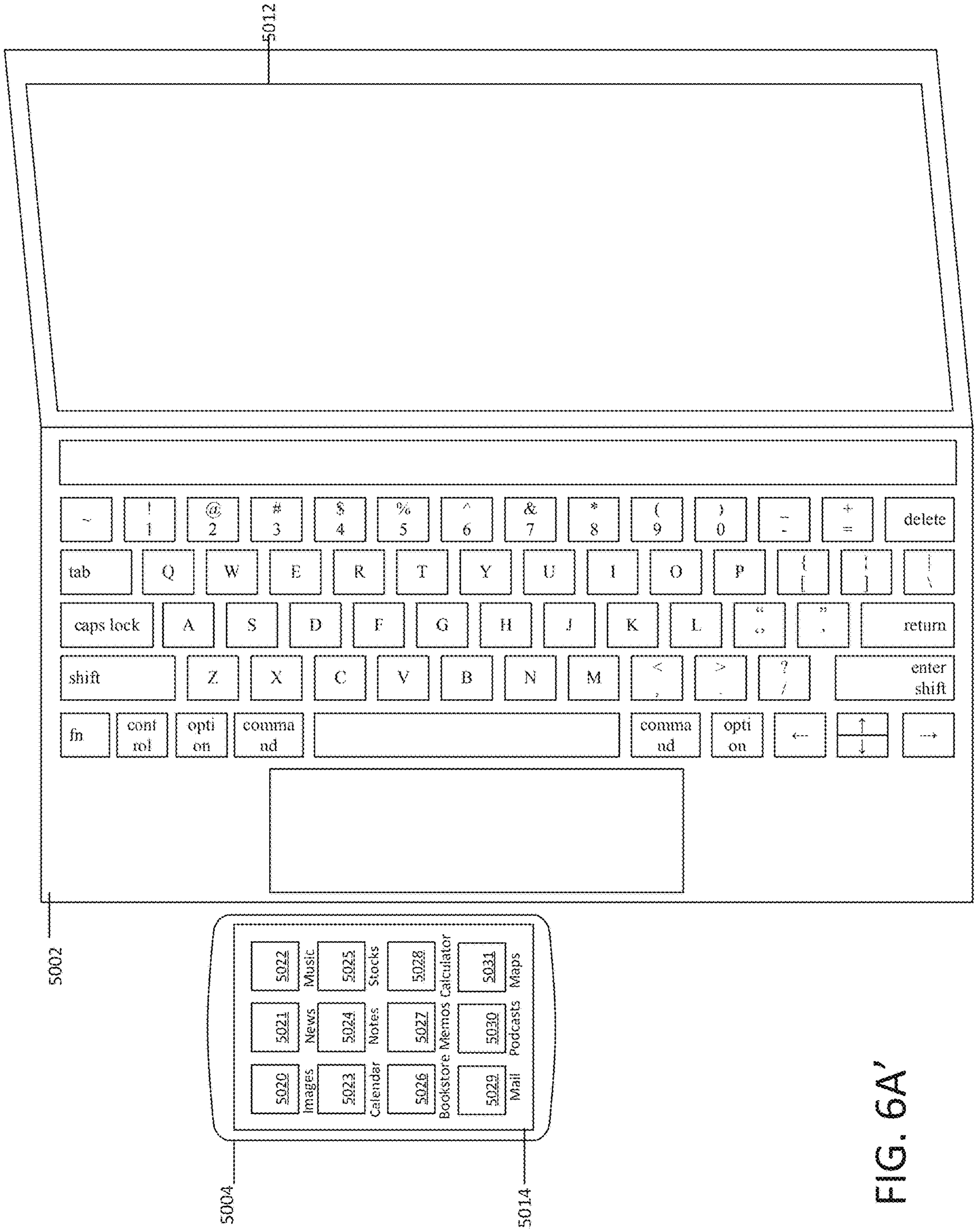

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
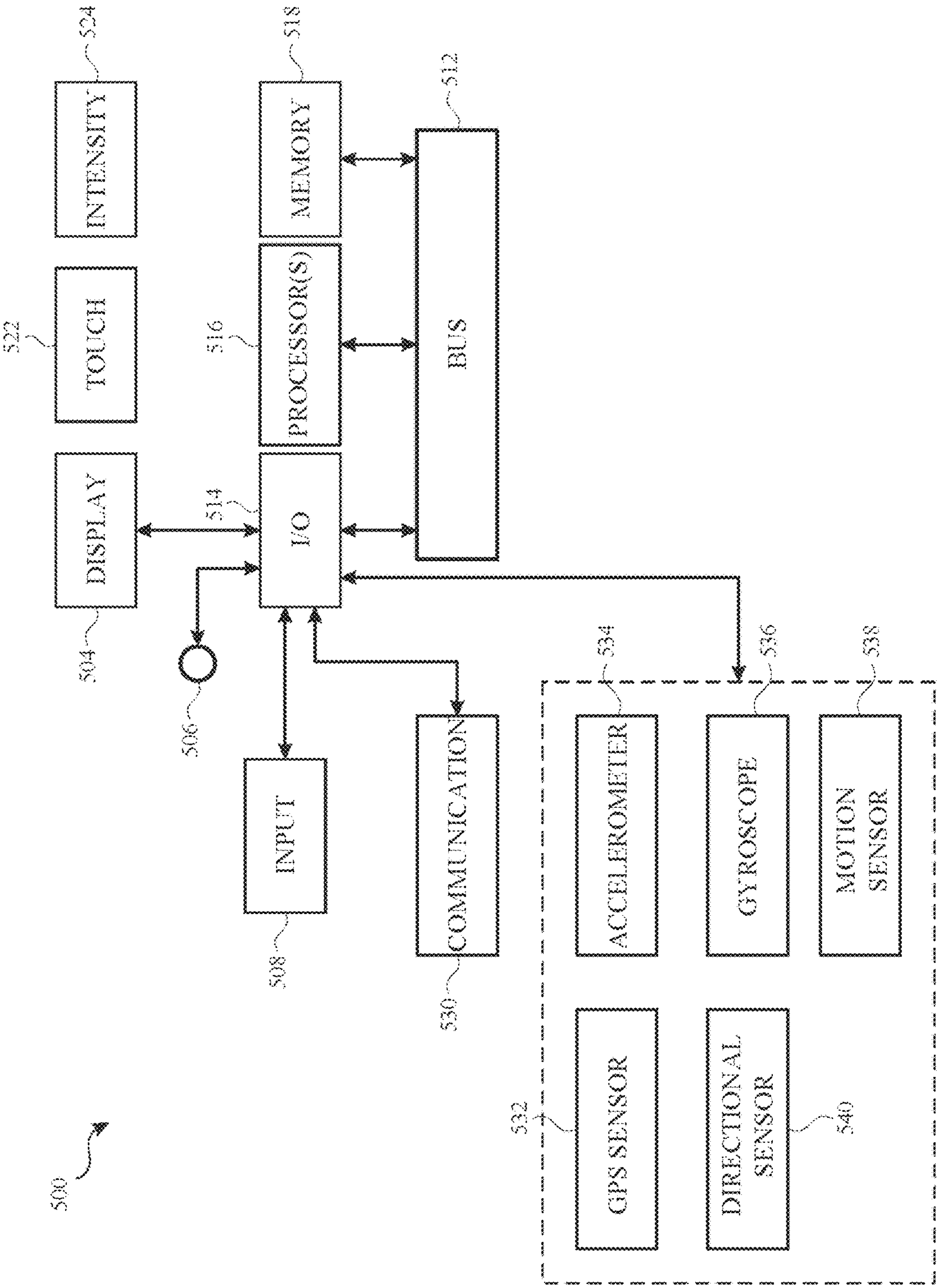
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 and 900 (FIGS. 7A-7F and 9A-9D). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6Y illustrate exemplary user interfaces for engaging in cross device interactions. The user interfaces in these figures are used to illustrate the processes described below, including the processes in FIGS. 7A-7F. More particularly, FIGS. 6A-6Y illustrate an electronic device 5004 (smartphone) that is placed over a region of a display 5012 (laptop computer's display) of another electronic device 5002 (laptop computer). In the illustrated embodiments of FIGS. 6A-6Y, electronic device 5002 is a laptop computer and electronic device 5004 is a smartphone. Electronic devices 5002 and 5004 are optionally any of device 100, 300, or 500 illustrated in FIG. 1, 3, or 5A. In the illustrated embodiments FIGS. 6A-6Y, display 5012 is a display of electronic device 5002, and display 5014 (smartphone's display) is a display of electronic device 5004. Displays 5012 and 5014 represent displays that are similar or identical to display 112 of device 100, 300, or 500. In some embodiments, display 5012 represents a display that has larger display capabilities relative to display 5014. Although some of the examples that follow will be given with reference to inputs on a touch-screen display (where the touch-sensitive surface and the display are combined) such as touch-sensitive display 5014, in some embodiments, the device detects inputs on a touch-sensitive surface 451 that is separate from the display 450, as shown in FIG. 4B. In other embodiments, the processes described herein may be implemented with devices having physical user-interfaces, voice interfaces, or other suitable interfaces. For convenience of explanation, the embodiments described below will be discussed with reference to operations performed on a device with a touch-sensitive display system 5012 or 5014. In such embodiments, a focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 5012 or 5014. However, analogous operations are, optionally, performed on a device with a display 450 and a separate touch-sensitive surface 451 in response to detecting the contacts on the touch-sensitive surface 451 while displaying the user interfaces discussed below, along with a focus selector.

FIG. 6A illustrates electronic device 5002 (laptop computer) placed side-by-side with electronic device 5004 (smartphone). FIG. 6A' is an alternative embodiment of FIG. 6A and illustrates a different view of the side-by-side placement of electronic device 5002 and electronic device 5004. In the illustrated embodiment of FIG. 6A, multiple application affordances are displayed on display 5012 (laptop computer's display) and display 5014 (smartphone's display). As used herein, the term "application affordance" refers to a type of affordance that the user interacts with to access a user interface of a corresponding application that runs on at least one of electronic device 5002 and electronic device 5004. In the illustrated embodiments of FIGS. 6A-6Y, application affordances displayed on display 5012 include images affordance 5040, browser affordance 5041, notes affordance 5042, maps affordance 5043, music affordance 5044, system affordance 5045, bookstore affordance 5046, games affordance 5047, calculator affordance 5048, mail affordance 5049, contacts affordance 5050, and messages affordance 5051. Further, in the illustrated embodiments of FIGS. 6A-6G and 6Q, application affordances displayed on display 5014 include images affordance 5020, news affordance 5021, music affordance 5022, calendar affordance 5023, notes affordance 5024, stocks affordance 5025, bookstore affordance 5026, memos affordance 5027, calculator affordance 5028, e-mail affordance 5029, podcasts affordance 5030, and maps affordance 5031. The user optionally selects any of application affordances 5020-5031 and 5040-5051 (e.g., mail affordance 5049) to access user interfaces of a corresponding application (e.g., a mail application). In the illustrated embodiments, multiple content affordances are also displayed on display 5012 (laptop computer's display). As used herein, the term "content affordance" refers to an affordance the user interacts with to view content associated with the content affordance on at least one of display 5012 and display 5014. In the illustrated embodiments of FIGS. 6A-6Y, content affordances displayed on display 5012 include image affordances 5120A-5120D, notes affordances 5122A-5122B, and music affordances 5124A-5124B. In some embodiments, the application affordances and content affordances that are displayed on display 5012 or 5014 are arranged in a different order. In some embodiments, additional application affordances or content affordances not shown in FIGS. 6A-6Y are displayed on display 5012 or display 5014.

Electronic device 5002 (laptop computer) and electronic device 5004 (smartphone) each has input devices through which the user enters one or more inputs to interact with the application and content affordances that are displayed on display 5012 (laptop computer's display) and 5014 (smartphone's display). In the illustrated embodiments, display 5014 is a touch-sensitive display. The user optionally performs a variety of finger inputs over display 5014 to enter user inputs via display 5014 (e.g., a tap gesture over images affordance 5020). Further, electronic device 5002 has an integrated keyboard and a trackpad. The user optionally performs keyboard presses or holds to enter user inputs via the keyboard, or performs gestures (e.g., tap gestures, slide gestures, scroll gestures, drag gestures, pinch gestures, etc.) on the trackpad to enter user inputs via the trackpad. In some embodiments, display 5012 is also a touch-sensitive display. In one or more of such embodiments, the user optionally performs a variety of finger inputs over display 5012 to enter user inputs via display 5012. In some embodiments, electronic device 5002 is also communicatively connected to a mouse or a pointing device. In such embodiments, the user optionally moves the mouse (such as perform mouse movements) to enter user inputs via the mouse or the pointing device. In further embodiments, electronic device 5004 and electronic device 5002 include or are connected to other input devices that allow user to enter additional types of user inputs including, but not limited to, pen stylus inputs, voice inputs, inputs based on eye movements, biometric inputs, as well as other types of user inputs that are entered via the input devices.

Figure 6B:
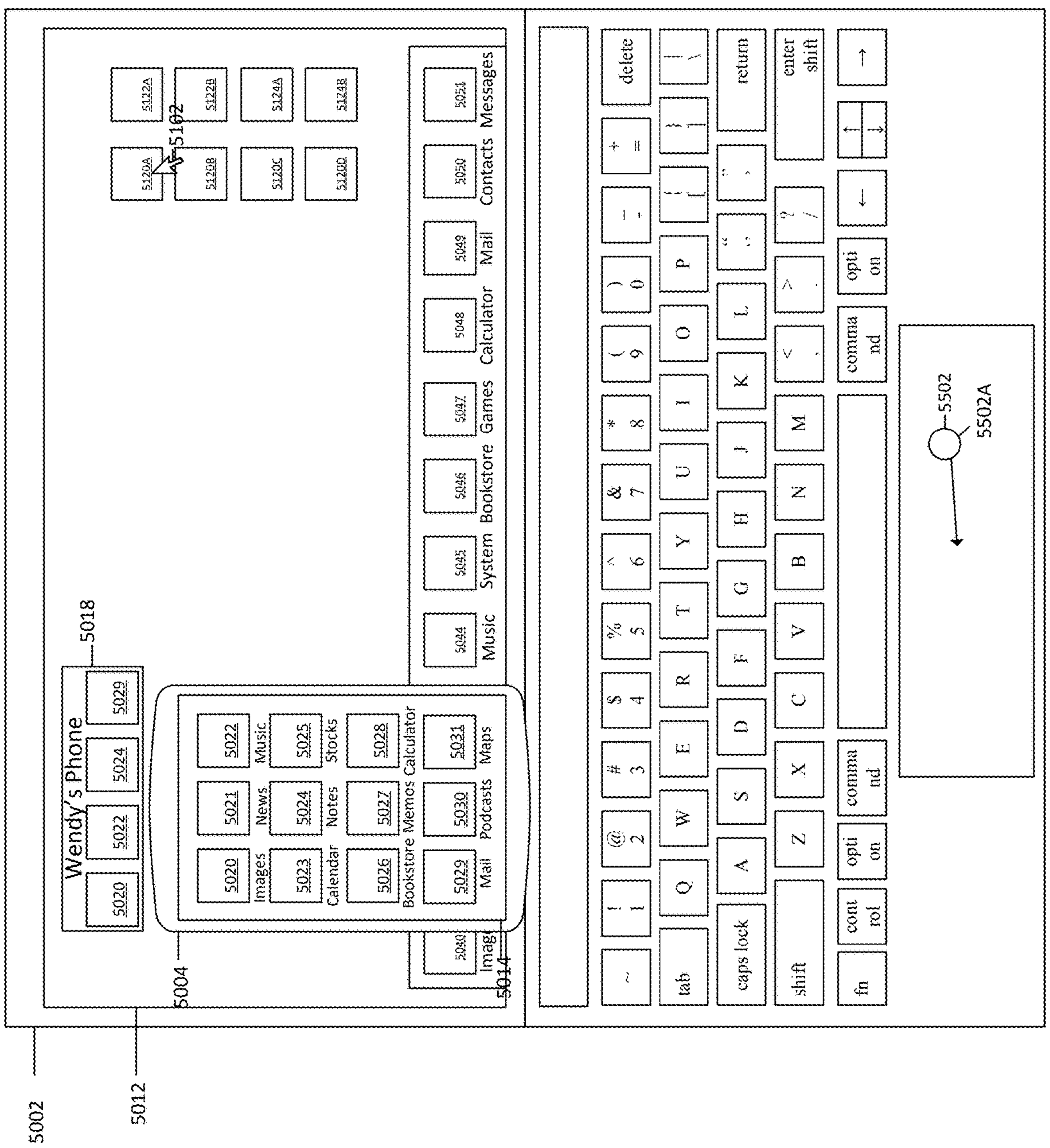
Figure 6B:
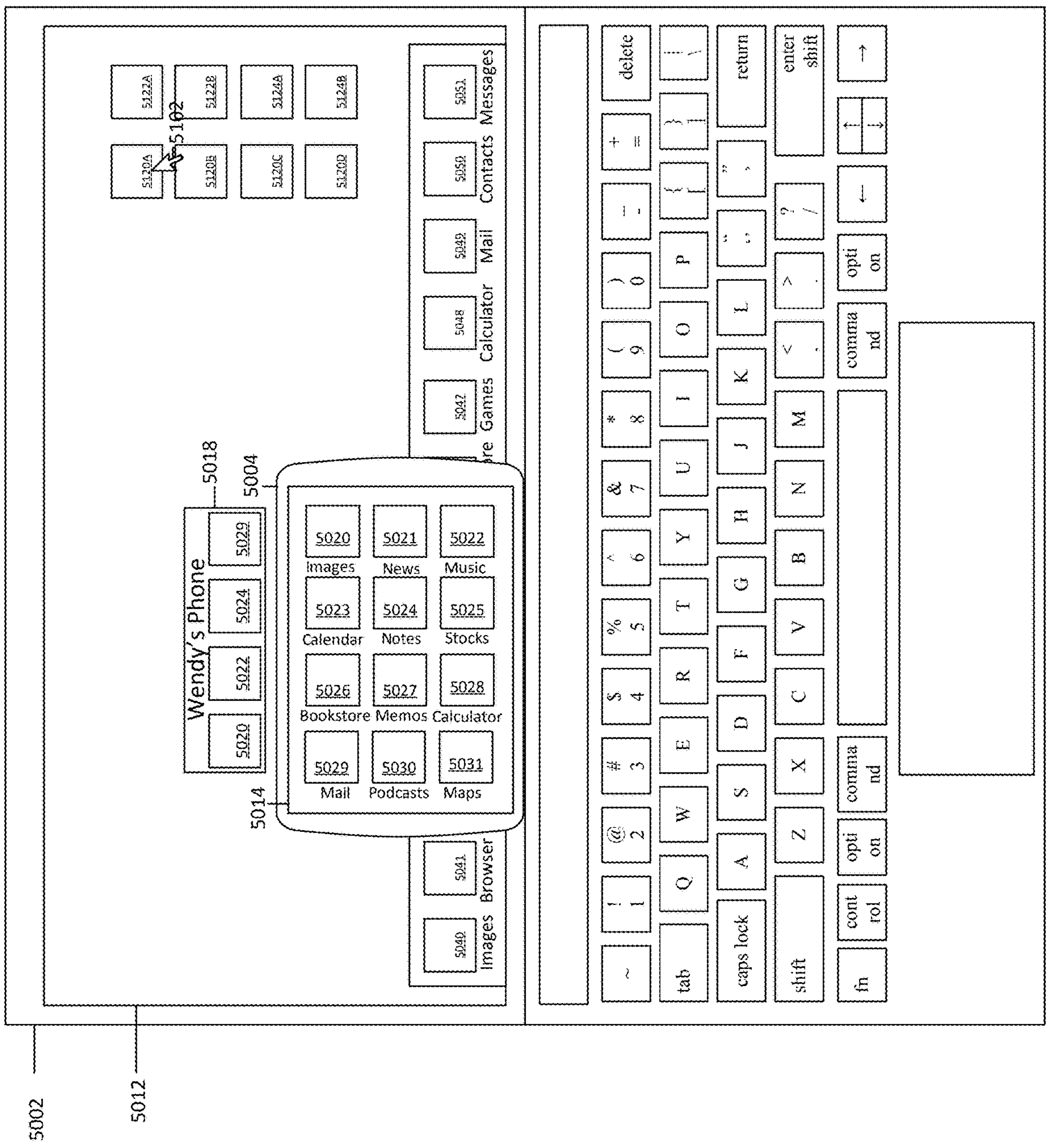

FIG. 6B illustrates electronic device 5004 (smartphone) placed over a region of display 5012 (laptop computer's display). As used herein, an electronic device (e.g., electronic device 5004) is placed over a display (e.g., display 5012, the laptop's display) of another electronic device (e.g., electronic device 5002, the laptop computer) if the electronic device covers a portion of the display of the other electronic device. In some embodiments, an electronic device is placed over a display (e.g., laptop computer's display) if a surface of the electronic device comes in contact with the display of the other device. In one or more embodiments, contact sensors of at least one electronic device of the two electronic devices that are placed over each other (e.g., electronic devices 5002 and 5004) detect whether contact has been made between one electronic device and the display of the other electronic device. In some embodiments, an electronic device is placed over a display of another electronic device if the electronic device is placed within a threshold distance over the display of the other electronic device. In one or more embodiments, at least one electronic device of the two electronic devices that are placed over each other has sensors that determine the proximity of one electronic device with respect to the display of the other electronic device. In some embodiments, at least one electronic device of the two electronic devices that are placed over each other determines the signal strength of signals transmitted by the other device, and determines whether one electronic device is placed over the display of the other electronic device based on the received signal strength. In some embodiments, the electronic devices utilize additional suitable methods to determine whether one electronic device is placed over the display of the other electronic device.

When an electronic device, such as electronic device 5004 (smartphone) is placed over a region of a display (e.g., display 5012, the laptop computer's display) of another electronic device, such as electronic device 5002 (laptop computer), responses to user inputs are displayed on the display (e.g., display 5014, the smartphone's display) of electronic device (e.g., electronic device 5004) or the display (e.g., display 5012) that is partially covered by the electronic device based on whether the user's focus is directed to the electronic device or to the other electronic device. As used herein, the user's focus is directed to an electronic device if the user intends to view a response to a user input or intends to view content associated with the user input on a display of the electronic device. In some embodiments, the user's focus is directed to an electronic device if a cursor (e.g., cursor 5102 of FIGS. 6B-6Y) of a pointing device is displayed on a display of the electronic device. As used herein, "cursor" refers to any symbol or graphical image displayed on a display that illustrates movement of a pointing device. As used herein, a "pointing device" refers to any input interface that allows the user to input spatial data to an electronic device (e.g., electronic device 5002 or electronic device 5004). Examples of pointing devices include mouse, touchpad, stylus pen, or other input interfaces that allow the user to input spatial data to the electronic device. In some embodiments, the user's focus is directed to an electronic device if the user's gaze is directed to the electronic device. In one or more of such embodiments, the user's gaze is directed to an electronic device if the user is looking at the electronic device or if the user is facing the electronic device. In one or more of such embodiments, an electronic device (e.g., electronic device 5002 or electronic device 5004) periodically operates a camera component to determine the user's gaze. In further embodiments, the user's focus is directed to an electronic device if a voice command issued by the user (such as a command by the user to display content on the electronic device) indicates that the user's focus is directed to the electronic device.

In some embodiments, processors of an electronic device (e.g., electronic device 5002) having a display that is partially covered by another electronic device (e.g., electronic device 5004), determine whether focus is directed to the electronic device or to the other electronic device. In one or more embodiments, the processors, in response to detecting user inputs (e.g., the gestures illustrated in FIGS. 6B-6Y) while focus is directed to the electronic device, display responses to the user inputs in a region of the display that is not covered by the other electronic device. In one or more embodiments, the processors, in response to detecting user inputs while focus is directed to the other electronic device, cause the other electronic device to display the responses to the user inputs on the display of the other electronic device. In one or more embodiments, where the electronic device (e.g., electronic device 5002) and the other electronic device (e.g., electronic device 5004) are communicatively connected to each other, the electronic device transmits a request to the other electronic device to respond to the user's input. In one or more of such embodiments, the electronic device provides the other electronic device with data indicative of the user input as well as a location to display the response to the user input. For example, where the electronic device detects a user input to display an image while focus is directed to the other electronic device, the electronic device requests the other electronic device to display the image at a location on the display of the other electronic device. In one or more embodiments, the electronic device is communicatively connected to the display of the other electronic device. In one or more of such embodiments, the electronic device directly displays a response to a user input on the display of the other electronic device.

In some embodiments, after an electronic device (e.g., electronic device 5004) is placed over a display (e.g., display 5012) of another electronic device (e.g., electronic device 5002), a toolbar containing application affordances that run on the electronic device is displayed on the display of the other electronic device. In one or more of such embodiments, the toolbar of the electronic device is displayed on the display of the other electronic device to provide an indication that the electronic device has been placed over the display of the other electronic device. In one or more of such embodiments, application affordances displayed on the toolbar are affordances of recently-accessed applications. In one or more of such embodiments, application affordances displayed on the toolbar are designated by the user. In the embodiment of FIG. 6B, a toolbar 5018 containing images affordance 5020, music affordance 5022, notes affordance 5024, and e-mail affordance 5029 is displayed on a location on display 5012 (laptop computer's display) that is next to the location of electronic device 5004 (smartphone). In the illustrated embodiment, a name associated with electronic device 5004 ("Wendy's Phone") is also displayed in toolbar 5018. FIG. 6B' illustrates an alternative embodiment, where electronic device 5004 is placed in a different orientation relative to the orientation of electronic device 5004 as shown in FIG. 6B. Further, as illustrated in FIG. 6B', electronic device 5004 is also placed over a different region of display 5012 relative to the region of display 5012 electronic device 5004 is placed over in FIG. 6B. Similarly, the location of toolbar 5018 as illustrated in FIG. 6B is also different from the location of toolbar 5018 as illustrated in FIG. 6B'. In some embodiments, the location of toolbar 5018 on display 5012 is based on the location of electronic device 5004 relative to display 5012.

Figure 6C:
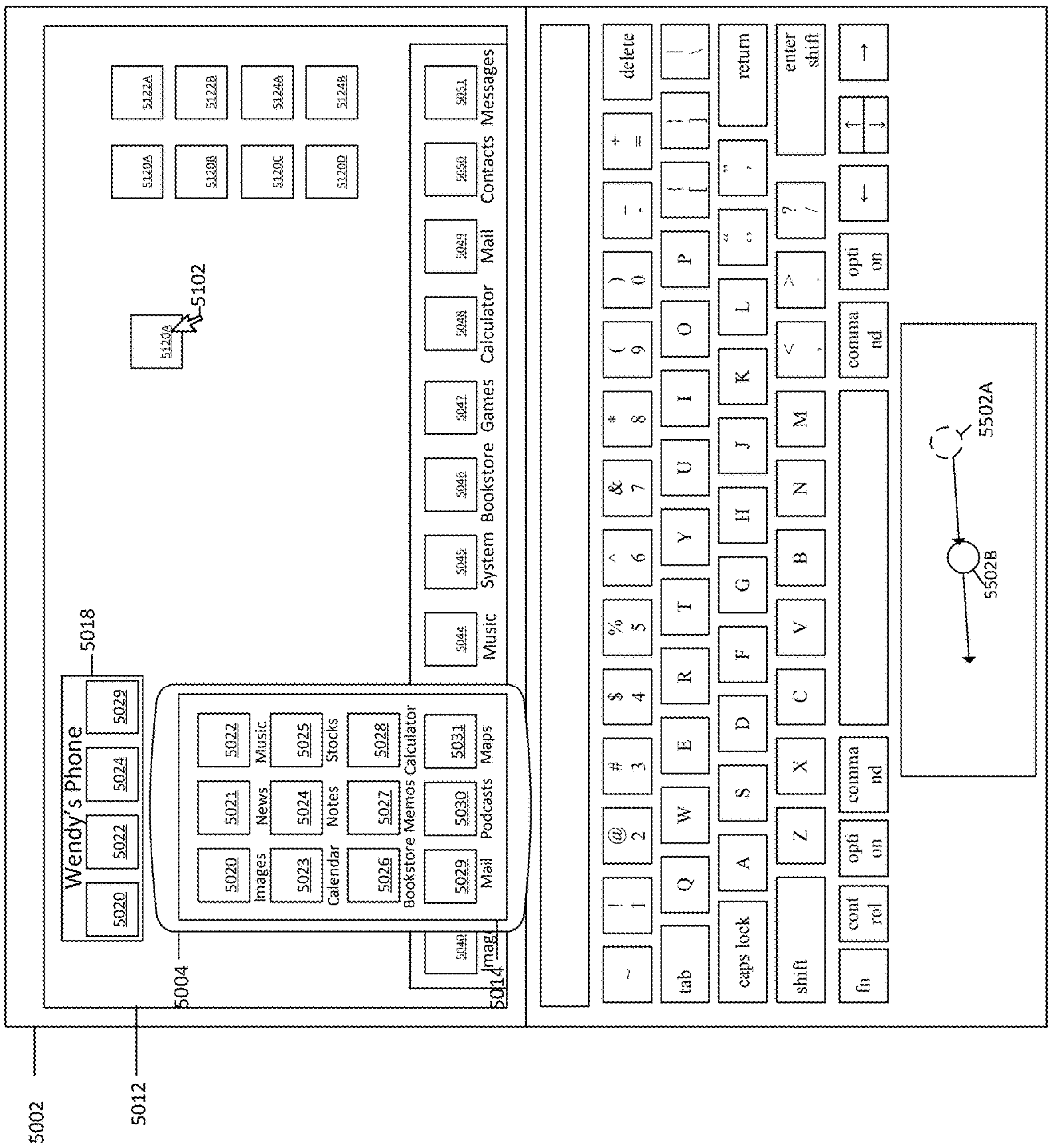

In the embodiment of FIG. 6B, cursor 5102 is displayed on display 5012 (laptop computer's display) and over image affordance 5120A. While cursor 5102 is displayed over image affordance 5120A, the user optionally performs a user input (e.g., a tap gesture to view an image associated with image affordance 5120A, a drag gesture to move image affordance 5120A, etc.) to interact with image affordance 5120A. In that regard, FIGS. 6B-6C illustrate detecting a drag gesture with contact 5502 on the trackpad of electronic device 5002 (laptop computer) from position 5502A to position 5502B, and in response to detecting the drag gesture while cursor 5102 is displayed over image affordance 5120A, displaying movement of cursor 5102 and image affordance 5120A from the location on display 5012 as illustrated in FIG. 6B to the location on display 5012 as illustrated in FIG. 6C. In the illustrated embodiment of FIGS. 6B-6C, electronic device 5002 determines the user's focus based on the location of cursor 5102. As such, while cursor 5102 is displayed in a region of display 5012 that is not covered by electronic device 5004, electronic device 5002 displays movement of image affordance 5120A on display 5012. As the user continues to perform the drag gesture illustrated in FIGS. 6B-6C, electronic device 5002 displays movement of cursor 5102 across display 5012 towards a region of display that is covered by electronic device 5004. Although the descriptions of FIGS. 6B-6Y sometimes describe operations that are performed by electronic device 5002 (e.g., to determine which electronic device the user is focused on, to display movement of cursor 5102 on display 5012, to request electronic device 5004 to display movement of cursor 5102 on display 5014, etc.), in one or more embodiments, the operations are optionally performed by electronic device 5004 (e.g., to determine which electronic device the user is focused on, to display movement of cursor 5102 on display 5014, to request electronic device 5002 to display movement of cursor 5102 on display 5012, etc.), or by another electronic device that is placed over display 5012. In one or more embodiments, the operations are concurrently performed by electronic device 5002 and electronic device 5004.

Figure 6D:
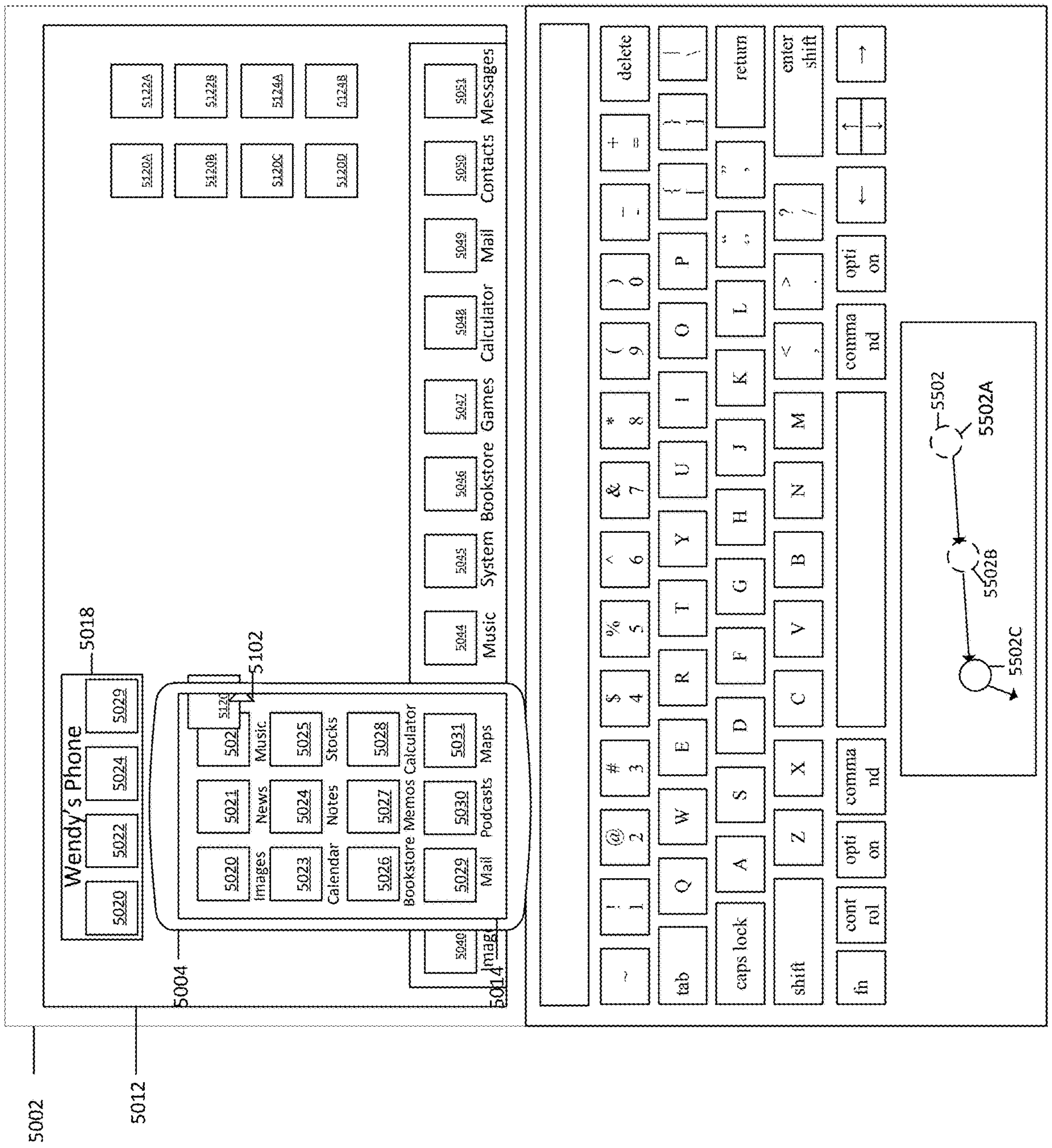

In some embodiments, if the user performs a user input that would move a cursor (e.g., cursor 5102) to a location (a covered location) on a display (e.g., display 5012 of electronic device 5002) that is covered by another electronic device (e.g., electronic device 5004), the cursor 5102 is displayed on a corresponding location of the display of the electronic device (e.g., display 5014 of electronic device 5004) that is placed over the display. As used herein, a covered location refers to a location on a display that is covered by an electronic device. Similarly, a covered region refers to a region on a display that is covered by an electronic device. Further, a corresponding location or a corresponding region refers to a location or a region on a display (e.g., display 5014 of electronic device 5004) of the electronic device that is placed over the partially covered display (e.g., display 5012 of electronic device 5002), where the corresponding location or the corresponding region overlays the covered location or the covered region, respectively. In that regard, FIGS. 6C-6D illustrate a continuation of the drag gesture initiated in FIG. 6B. More particularly, FIGS. 6C-6D illustrate detecting the drag gesture initiated in FIG. 6B with contact 5502 on the trackpad of electronic device 5002 (laptop computer) from position 5502B to position 5502C, and in response to detecting the drag gesture, displaying movement of cursor 5102 and image affordance 5120A from the location of cursor 5102 as illustrated in FIG. 6C to the location of cursor 5102 as illustrated in FIG. 6D. In the illustrated embodiment of FIG. 6D, a portion of cursor 5102 is displayed on display 5012 and a portion of cursor 5102 is displayed on display 5014 (smartphone's display).

In the illustrated embodiment, the gesture illustrated in FIGS. 6C-6D would move cursor 5102 to an area on display 5012 (laptop computer's display) that is partially covered by device 5004 (smartphone). In such embodiments, a portion of cursor 5102 that is over a region of display 5012 that is covered by device 5004 is displayed on display 5014, whereas the remaining portion of cursor 5102 is displayed on display 5012. In the illustrated embodiment of FIG. 6D, electronic device 5002, after determining that the gesture shown in FIGS. 6C-6D would cause a portion of cursor 5102 to move to covered locations on display 5012, requests electronic device 5004 to display the cursor (or movement of the cursor) at corresponding locations on display 5014. Similarly, since the drag gesture illustrated in FIGS. 6C-6D also causes movement of image affordance 5120A, a portion of image affordance 5120A that would be moved to a region of display 5012 that is covered by electronic device 5004 is instead displayed on display 5014, whereas the remaining portion of image affordance 5120A remains displayed on display 5012. In one or more embodiments, if the user performs a user input (e.g., the gestures illustrated in FIGS. 6C-6D) that would move a cursor to a covered location on a display (e.g., laptop computer's display), the cursor (e.g., cursor 5102) is concurrently displayed at the covered location of the partially covered display (e.g., display 5012, the laptop computer's display) and at a corresponding location of the display of the overlaying electronic device (e.g., display 5014, the smartphone's display).

Figure 6E:
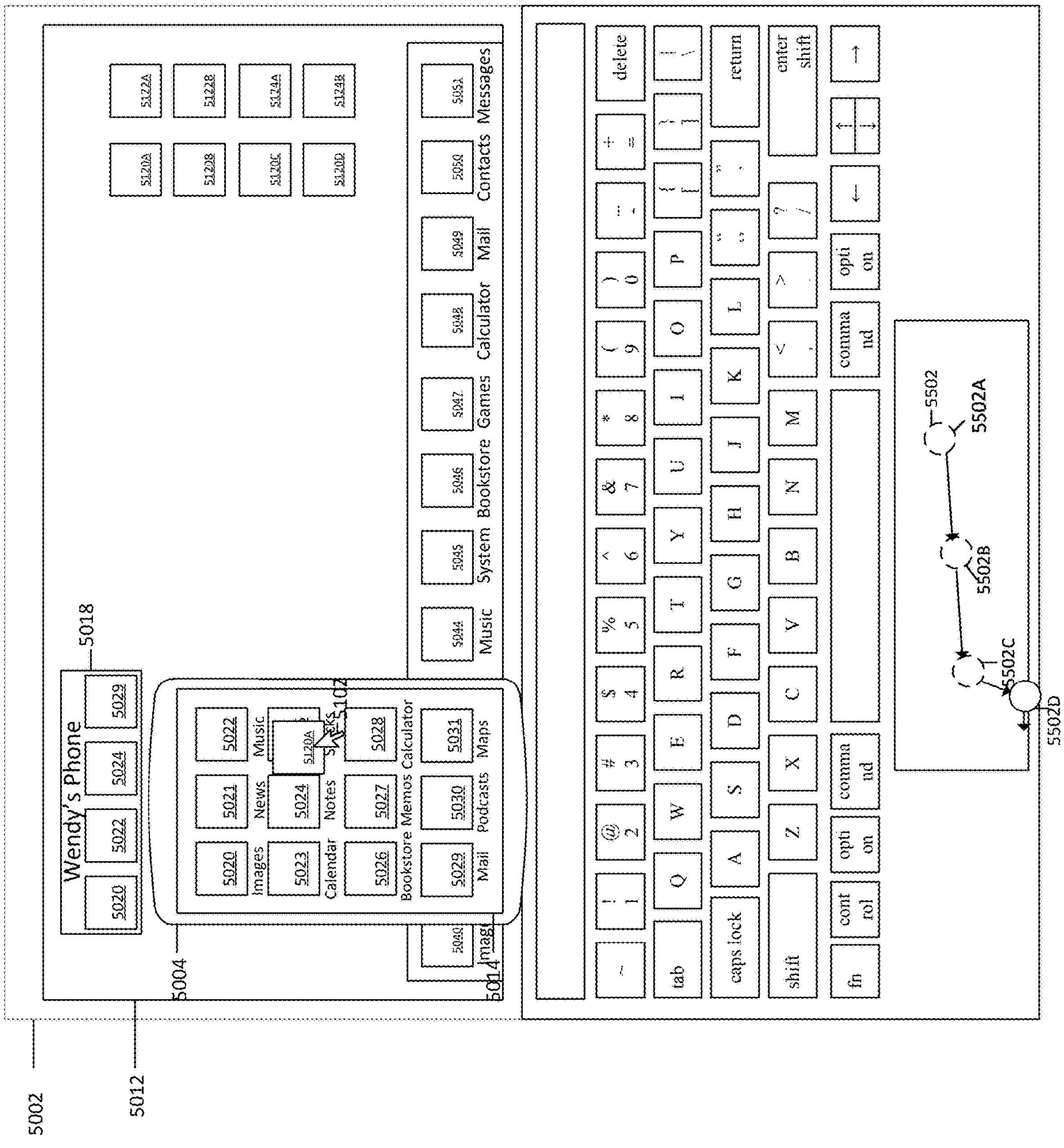

FIGS. 6D-6E illustrate a continuation of the drag gesture illustrated in FIGS. 6B-6D. More particularly, FIGS. 6D-6E illustrate detecting the drag gesture initiated in FIG. 6B with contact 5502 on the trackpad of electronic device 5002 (laptop computer) from position 5502C to position 5502D, and in response to detecting the drag gesture, displaying movement of cursor 5102 and image affordance 5120A from the location of cursor 5102 as illustrated in FIG. 6D to the location of cursor 5102 as illustrated in FIG. 6E. The gesture illustrated in FIGS. 6D-6E would move cursor 5102 and image affordance 5120A to a covered location on display 5012 (laptop computer's display) that is completely covered by electronic device 5004 (smartphone). As such, device 5002 requests device 5004 to display cursor 5102 and image affordance 5120A at a corresponding location on display 5014 (smartphone's display).

Figure 6F:
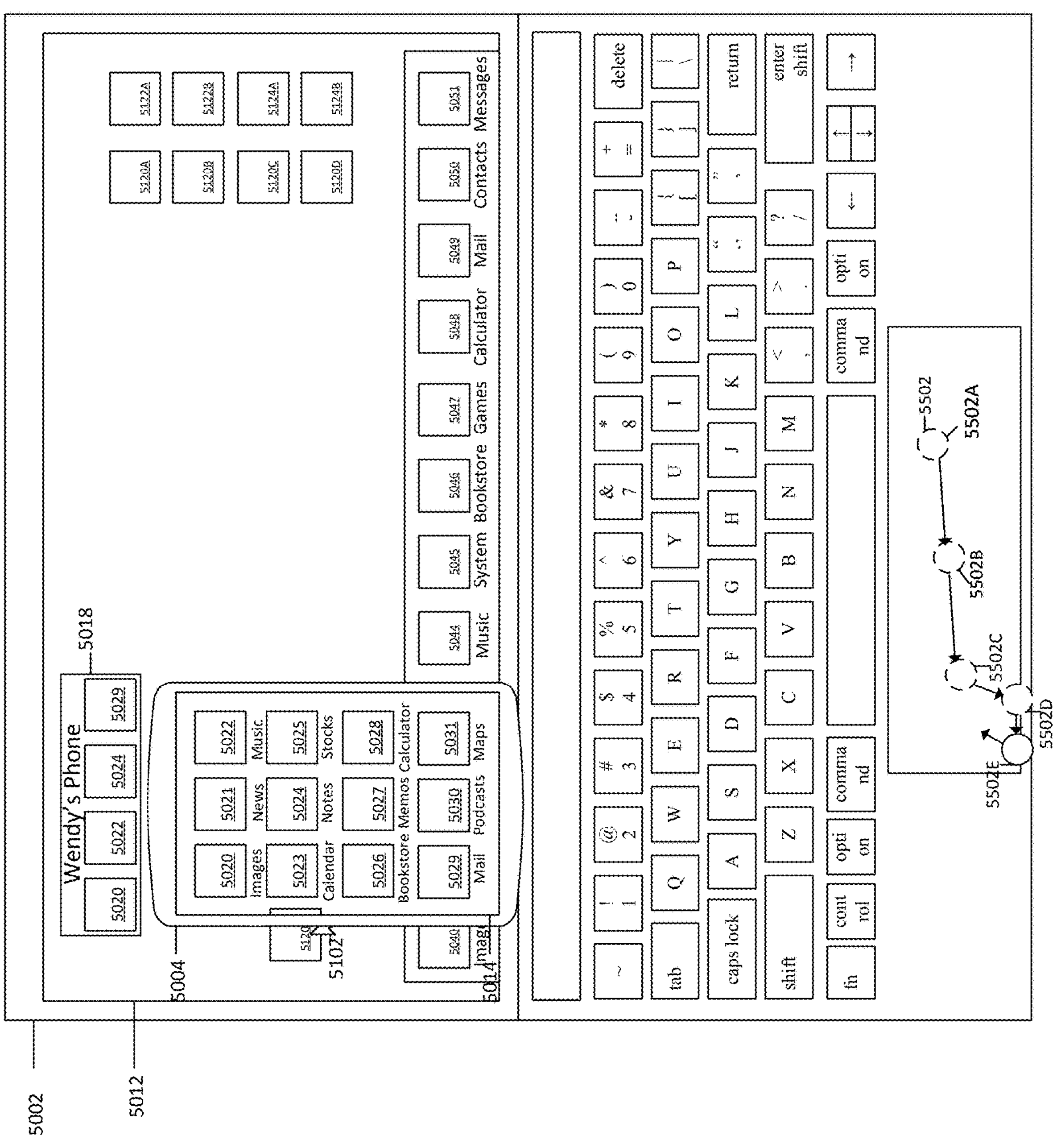

FIGS. 6E-6F illustrate a continuation of the drag gesture initiated in FIGS. 6B-6E. More particularly, FIGS. 6E-6F illustrate detecting the drag gesture initiated in FIG. 6B with contact 5502 on the trackpad of electronic device 5002 (laptop computer) from position 5502D to position 5502E, and in response to detecting the drag gesture, displaying movement of cursor 5102 and image affordance 5120A from the location of cursor 5102 as illustrated in FIG. 6E to the location of cursor 5102 as illustrated in FIG. 6F. In the illustrated embodiment of FIG. 6F, a portion of cursor 5102 is displayed on display 5012 and a portion of cursor 5102 is displayed on display 5014 (smartphone's display).

Figure 6G:
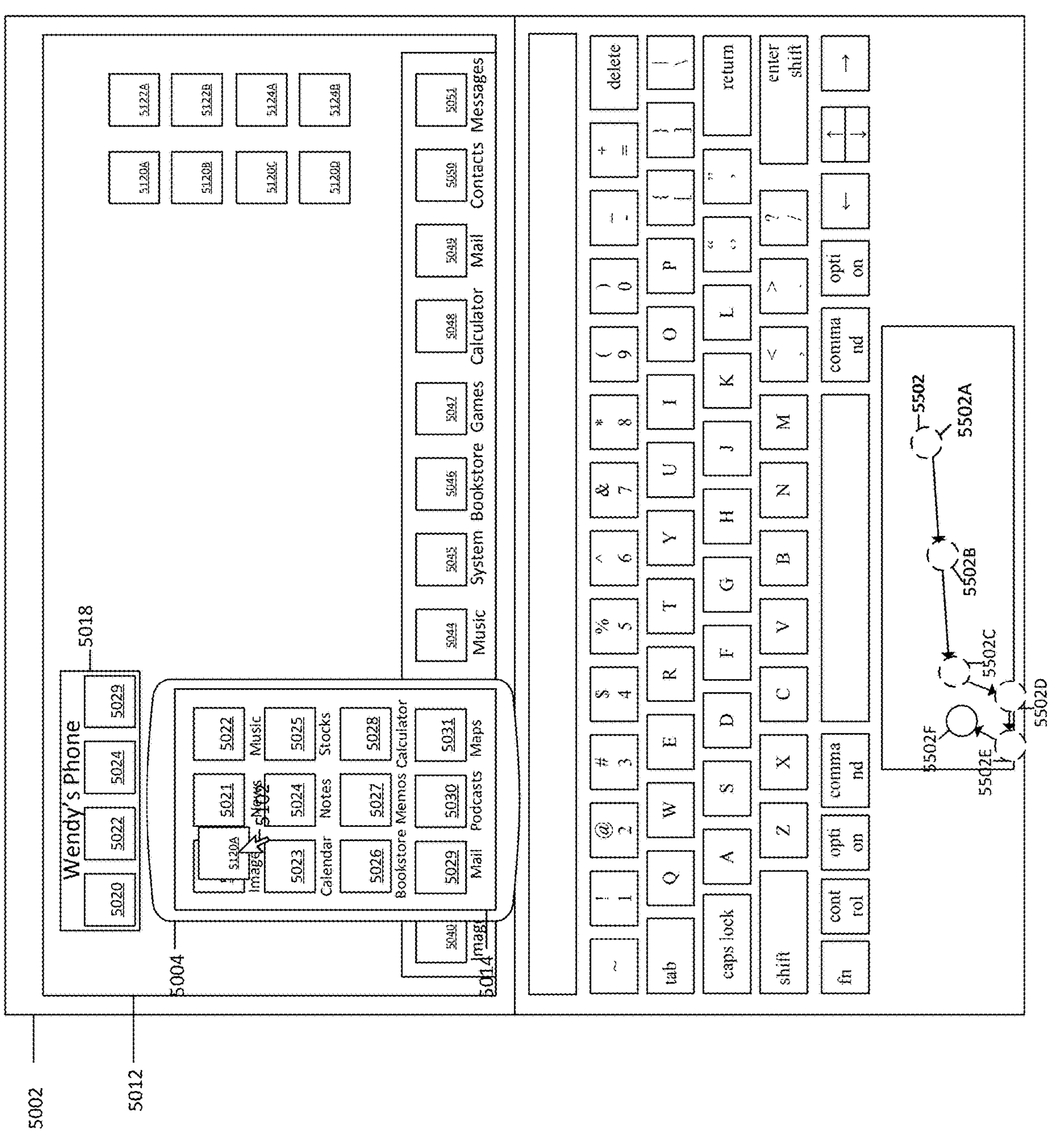

FIGS. 6F-6G illustrate a continuation of the drag gesture illustrated in FIGS. 6B-6E. More particularly, FIGS. 6F-6G illustrate detecting the drag gesture initiated in FIG. 6B with contact 5502 on the trackpad of electronic device 5002 (laptop computer) from position 5502F to position 5502G, and in response to detecting the drag gesture, displaying movement of cursor 5102 and image affordance 5120A from the location of cursor 5102 as illustrated in FIG. 6F to the location of cursor 5102 as illustrated in FIG. 6G. The gesture illustrated in FIGS. 6F-6G would move cursor 5102 to a covered location on display 5012 (laptop computer's display) that is completely covered by electronic device 5004 (smartphone). As such, electronic device 5002 instructs device 5004 to display cursor 5102 and image affordance 5120A at a corresponding location on display 5014 (smartphone's display).

Figure 6H:
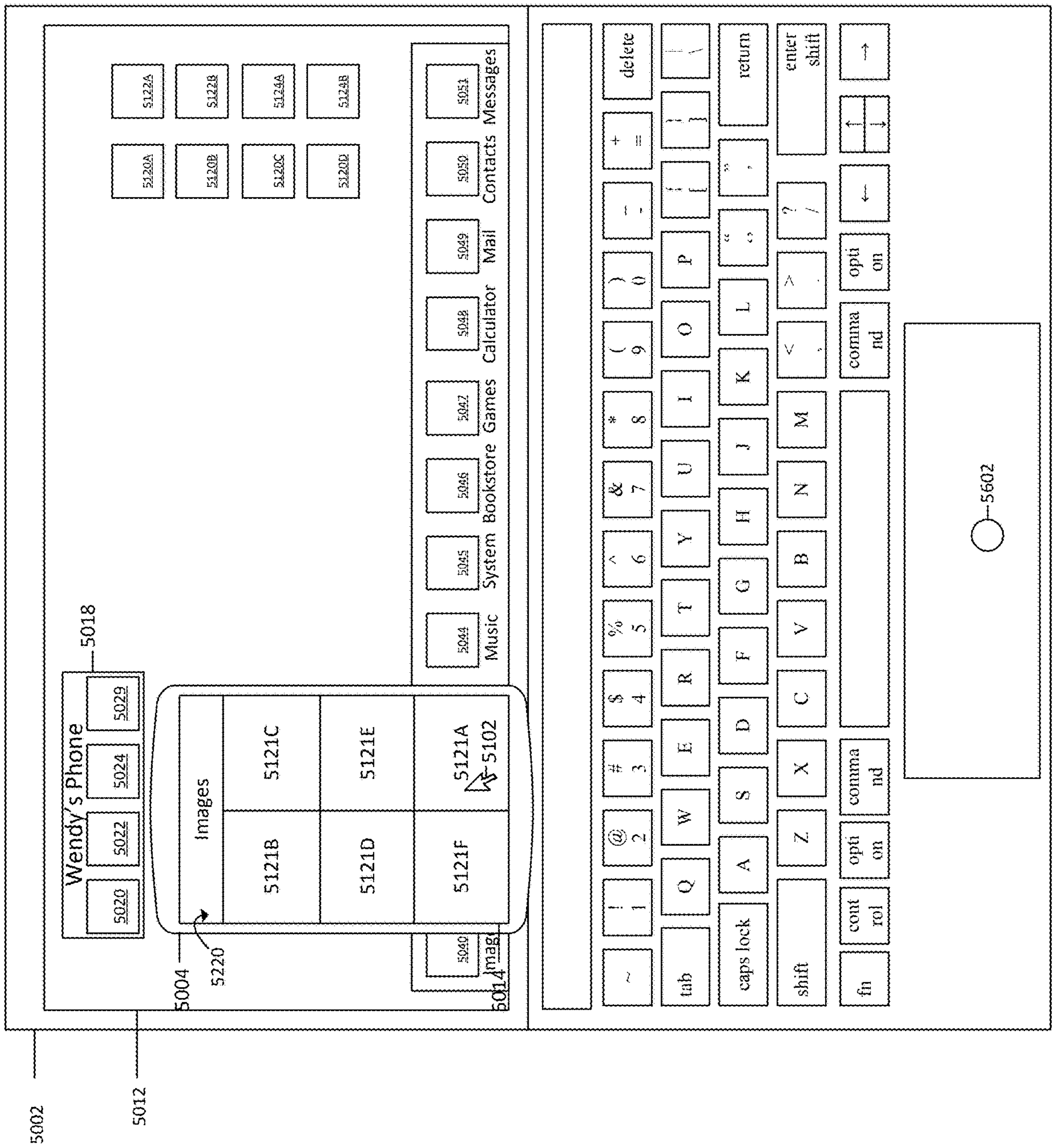

In the illustrated embodiment of FIG. 6G, the user completes the drag gesture illustrated in FIGS. 6B-6G while image affordance 5120A is displayed over images application 5020. In one or more embodiments, the user completes the drag gesture by releasing contact with the trackpad. In that regard, FIGS. 6G-6H illustrate detecting a release of contact 5502 at position 5502F while image affordance 5120A is displayed over images application 5020, and in response to detecting the release of contact 5502, displaying a preview of image 5121A, which is associated with image affordance 5120A in images user interface 5220. In the illustrated embodiment of FIG. 6H, previews of six images 5121A-5121F, including the preview of image 5121A are displayed in images user interface 5220. In one or more embodiments, the user optionally selects any of images 5121A-5121F by scrolling cursor 5102 over the respective image and by performing a tap gesture on the trackpad of electronic device 5002.

Figure 6I:
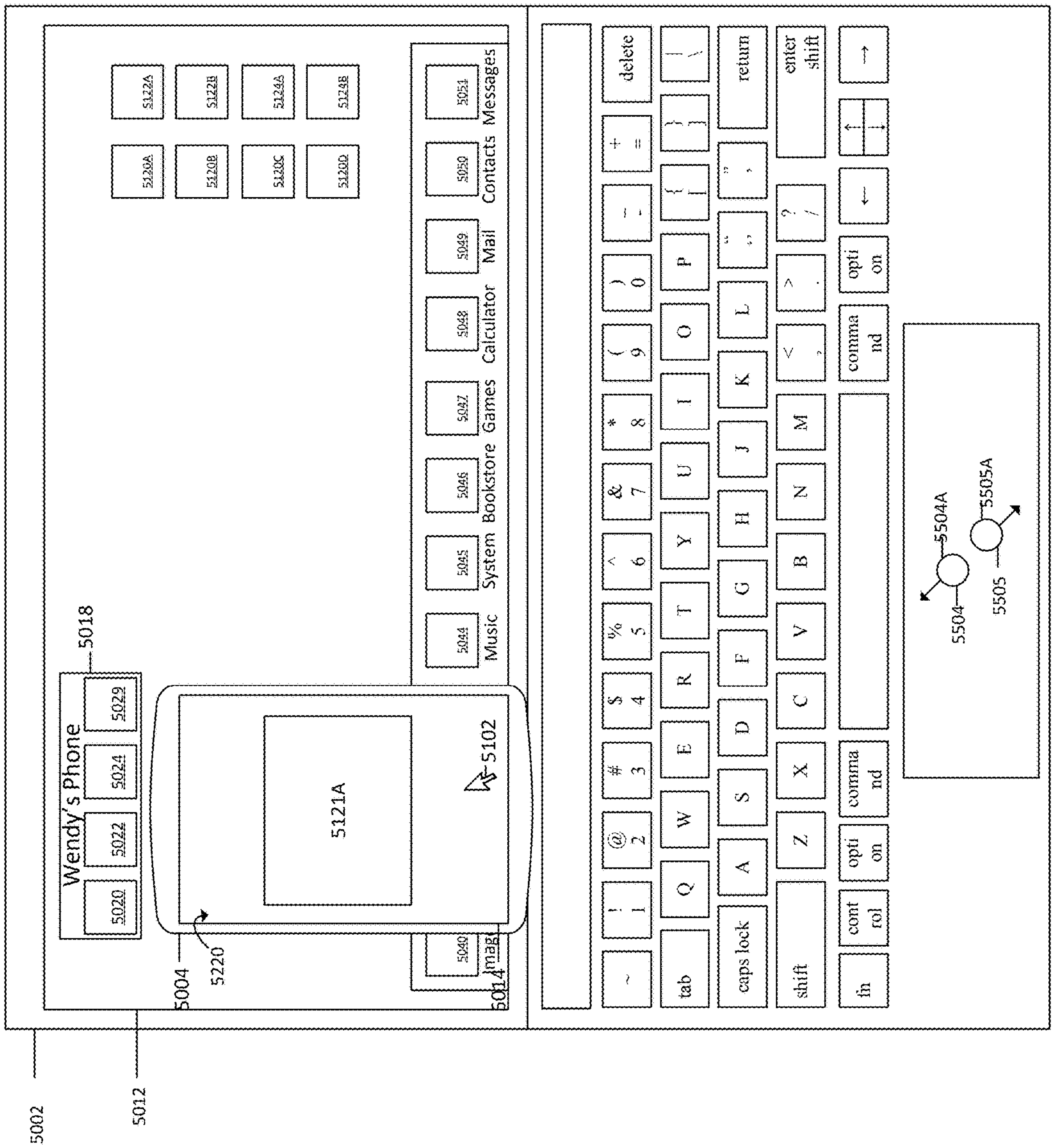

FIGS. 6H-6I illustrate detecting a tap gesture with contact 5602 on the trackpad of electronic device 5002 (laptop computer) while cursor 5102 is displayed on display 5014 (smartphone's display) and over image 5121A, and in response to detecting the tap gesture, displaying image 5121A in images user interface 5220. In the illustrated embodiment of FIG. 6I, the user's focus (as indicated by the position of cursor 5102) is directed to electronic device 5004 (smartphone). As such, electronic device 5002 requests electronic device 5004 to display image 5121A in images user interface 5220 and on display 5014. In some embodiments, where focus is directed to electronic device 5002 or another electronic device (not shown) while the gesture illustrated in FIGS. 6H-6I are performed, user interface 5220 would be displayed on the display of the electronic device the user's focus is directed to. In some embodiments, while user interface 5220 is displayed on display 5014, the user optionally performs additional gestures to interact with image 5121A. In one or more embodiments, the user performs another drag gesture while cursor 5102 is displayed over image 5121A to move image 5121A from the region on display 5014 as illustrated in FIG. 6H to a region on display 5012. In one or more embodiments, electronic device 5002, in response to detecting the drag gesture, displays movement of image 5121A based on the movement of the drag gesture, and after the completion of the drag gesture, displays image 5121A in an images user interface of an images application that runs on electronic device 5002. In one or more embodiments, the default display dimensions of image 5121A is greater if image 5121A is displayed on display 5012 due to the greater screen size of display 5012. In some embodiments, the location of the images user interface that is displayed on display 5012 relative to the boundaries of display 5012 is based on the location the images user interface (e.g., images user interface 5220 of FIG. 6H) that is displayed on display 5014 relative to the boundaries of display 5014.

In some embodiments, while an electronic device (e.g., electronic device 5004) is placed over a display (e.g., display 5012, the laptop computer's display) of another electronic device (e.g., laptop computer), responses to user inputs and user interactions with content displayed on the electronic device are displayed on the display of the other electronic device (e.g., laptop computer). In one or more of such embodiments, electronic device 5002, in response to detecting the tap gesture illustrated in FIG. 6H, or a similar tap gesture on another preview displayed in images user interface 5220, displays the corresponding image on display 5012. In one or more embodiments, electronic device 5002 also instructs electronic device 5004 to display, on display 5014, an indication that the corresponding image is displayed on display 5012 to help the user determine the display location of the corresponding image. In some embodiments, while an electronic device (e.g., electronic device 5004) is placed over a display (e.g., display 5012, the laptop computer's display) of another electronic device (e.g., laptop computer), responses to user inputs and user interactions with content displayed on the electronic device are concurrently displayed on displays of both electronic devices. In one or more of such embodiments, electronic device 5002, in response to detecting the tap gesture illustrated in FIG. 6H, or a similar tap gesture on another preview displayed in images user interface 5220, displays the corresponding image on display 5012 and instructs electronic device 5004 to concurrently display the corresponding image on display 5014.

Figure 6J:
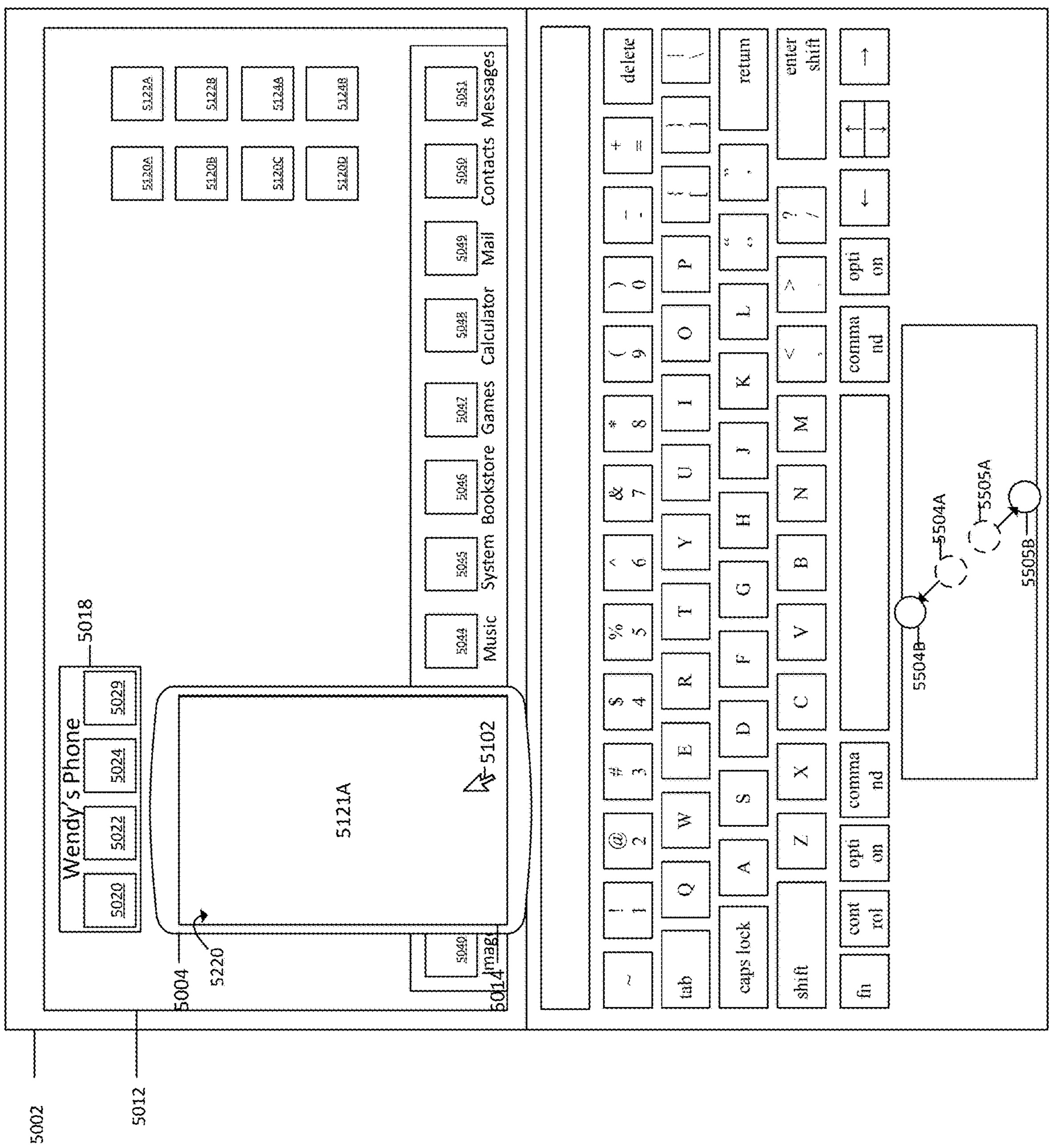

FIGS. 6I-6J illustrate detecting a pinch gesture with contacts 5504 and 5505 from positions 5504A to 5504B and from 5505A to 5505B on the trackpad of electronic device 5002 (laptop computer), and in response to the pinch gesture while cursor 5102 is displayed on display 5014 (smartphone's display), increasing the display size of image 5121A on display 5014. In some embodiments, the user optionally performs another pinch gesture to reduce the display size of image 5121A, or performs other gestures to interact with image 5121A. In some embodiments, the user performs a drag gesture on the trackpad of electronic device 5002 while cursor 5102 is displayed on display 5014 to select image 5121A and to drag image 5121A. In one or more of such embodiments, where the drag gesture concludes while cursor 5102 has moved from the location shown in FIG. 6J to a location on display 5012 (laptop computer's display) that is not covered by electronic device 5004, electronic device 5002 displays image 5121A in an image user interface that is displayed on display 5012.

Figure 6K:
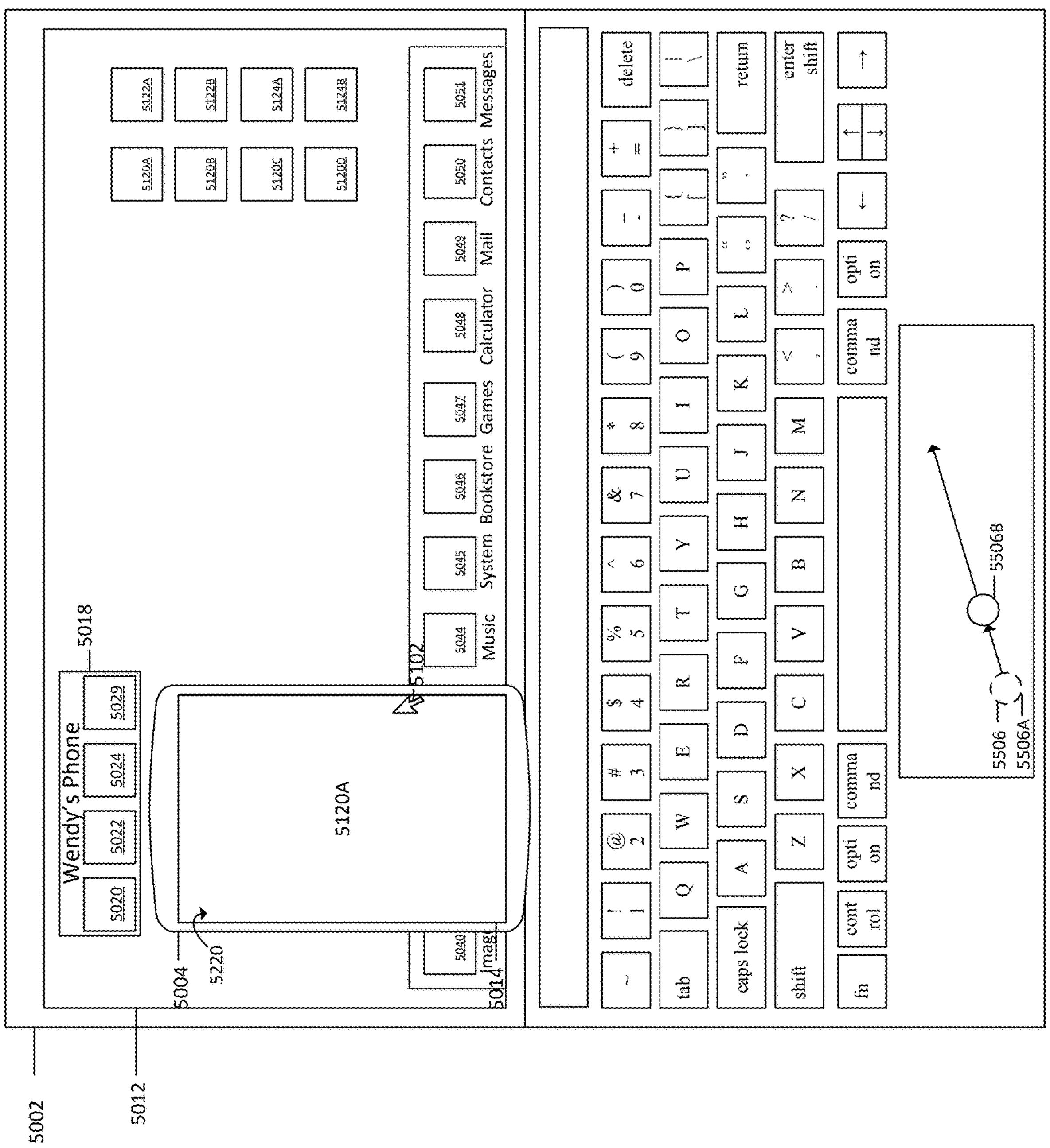
Figure 6L:
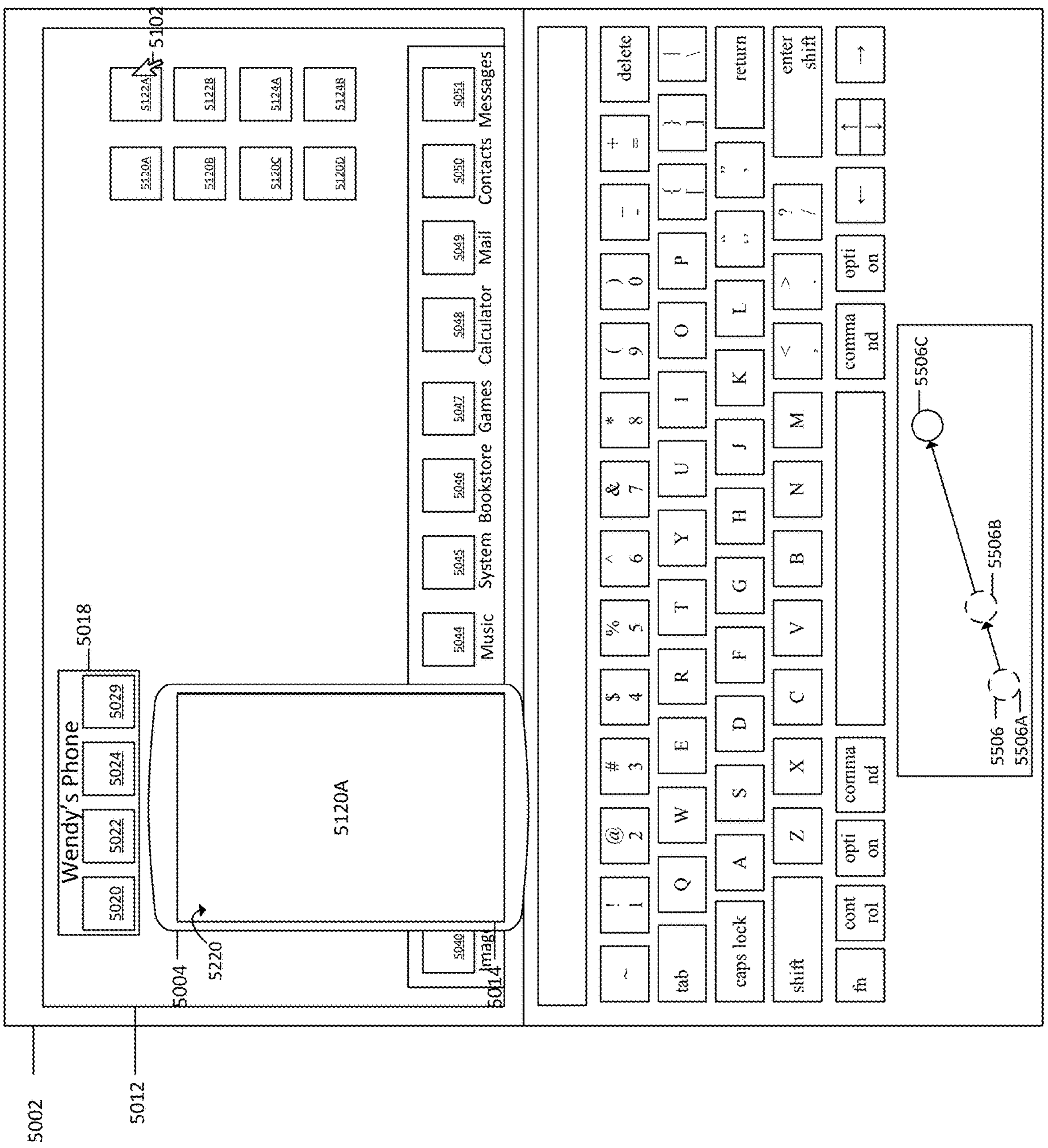

In some embodiments, the user, after interacting with image 5121A, performs other user inputs to interact with other application affordances or content affordances that are displayed on electronic device 5002 (laptop computer) or electronic device 5004 (smartphone). FIGS. 6K-6L illustrate detecting a slide gesture with contact 5506 on the trackpad of electronic device 5002 from position 5506A to position 5506C, and in response to slide gesture, displaying movement of cursor from the location on display 5014 (smartphone's display) as shown in FIG. 6K to the location on display 5012 (laptop computer's display) as shown in FIG. 6L. In the embodiment of FIG. 6K, the cursor 5102 is displayed over notes affordance 5122A, which is an affordance of the user's notes on a trip to Australia.

Figure 6M:
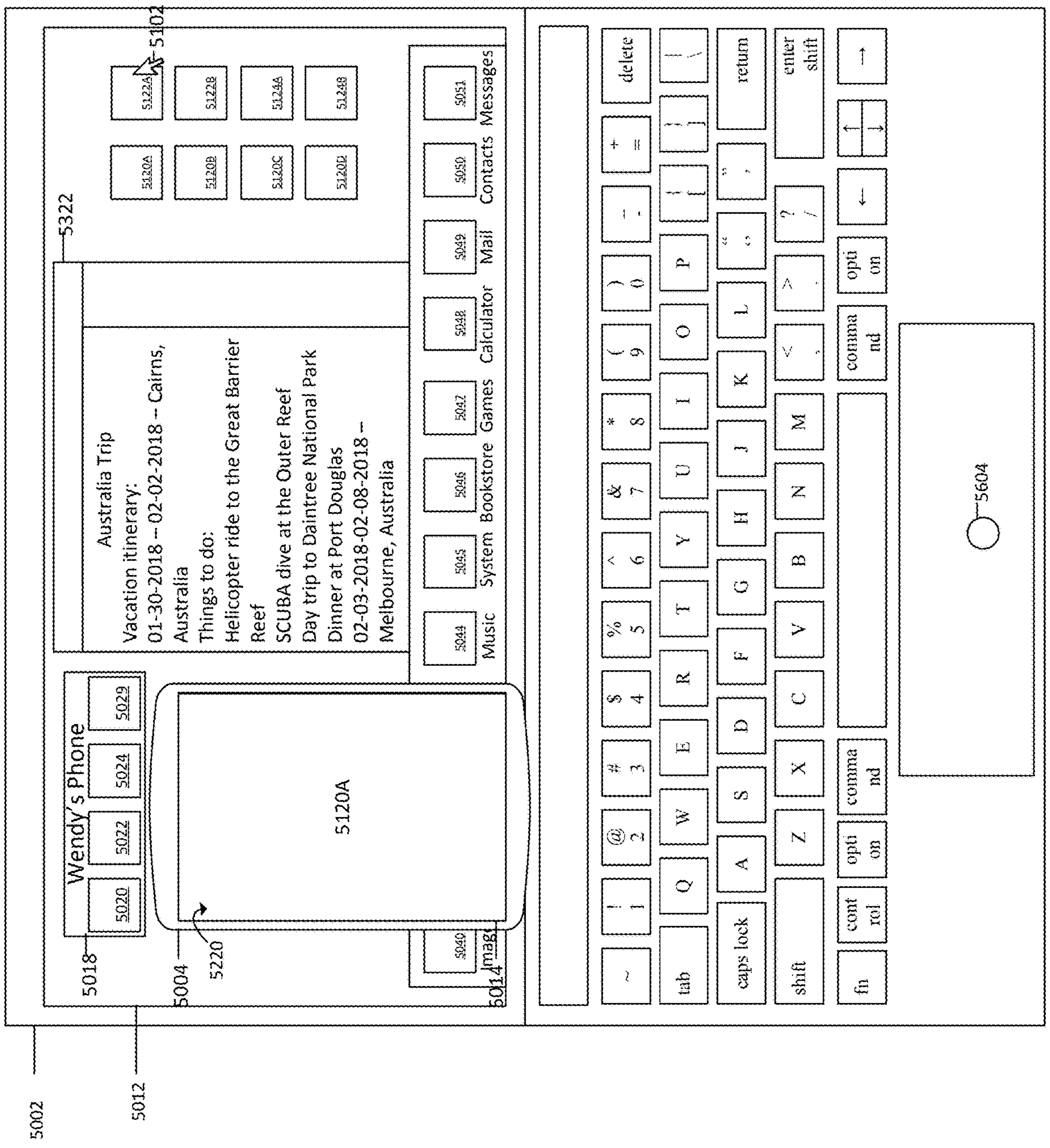

FIG. 6M illustrates detecting a tap gesture with contact 5604 on the trackpad of electronic device 5002 (laptop computer) while cursor 5102 is displayed over notes affordance 5122A, and in response to detecting the tap gesture, displaying the user's notes on the trip to Australia in notes user interface 5322. In the illustrated embodiment, electronic device 5002 displays the user interface on display 5012 (laptop computer's display) while cursor 5102 is displayed on display 5012. In one or more embodiments, where cursor 5102 is displayed on display 5014 (smartphone's display) at the time electronic device 5002 detects the user's input to view the notes on the trip to Australia, electronic device 5002 would instruct electronic device 5004 to display the user's notes on the trip to Australia on display 5014.

Figure 6N:
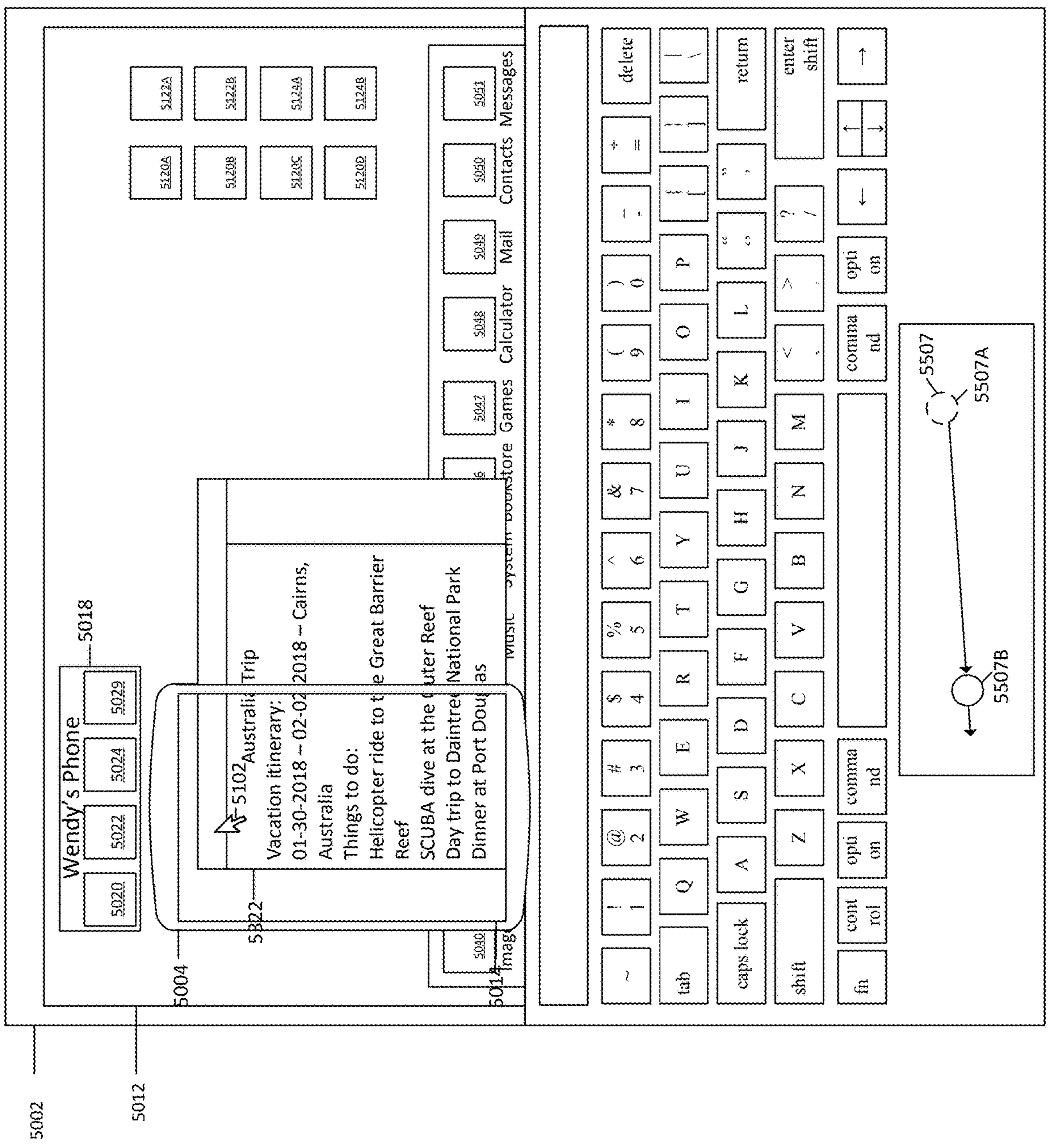

While notes user interface 5322 containing the user's notes on the trip to Australia is displayed on display 5012 (laptop computer's display), the user optionally enters one or more user inputs to move the display location of notes user interface 5322. In that regard, FIG. 6N illustrates detecting a drag gesture with contact 5507 on trackpad of electronic device 5002 (laptop computer) from position 5507A to position 5507B, and in response to detecting the drag gesture while cursor 5102 is displayed over a frame of notes user interface 5322, displaying movement of notes user interface 5322 from the location as illustrated in FIG. 6M to the location as illustrated in FIG. 6N. In the illustrated embodiment, device 5002 displays movement of notes user interface 5322 based on the movement of the drag gesture shown in FIG. 6N. As the user continues to perform the drag gesture shown in FIG. 6N, electronic device 5002 displays movement of notes user interface 5322 towards a region of display 5014 that is covered by electronic device 5004 (smartphone). Electronic device 5002, in response to a determination that the user's drag gesture would cause a portion of notes user interface 5322 to be moved to a covered region that is covered by electronic device 5004, instructs electronic device 5004 to display the portion of notes user interface 5322 that would be moved to the covered region on a corresponding region of display 5014 (smartphone's display). In the illustrated embodiment, electronic device 5002 displays on display 5012 (laptop computer's display) a remaining portion of notes user interface 5322 that has yet been moved to the covered region.

Figure 6O:
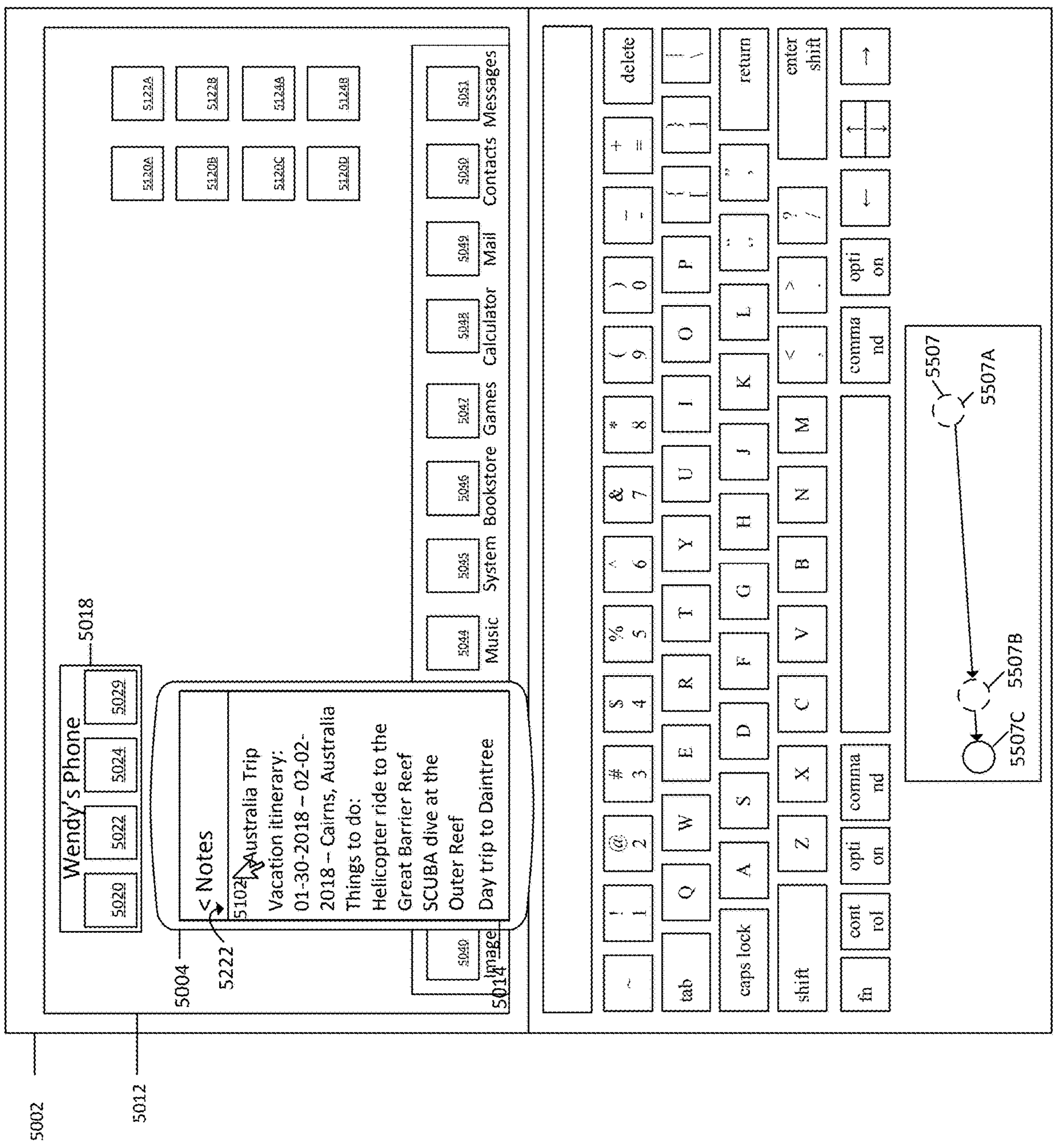

FIGS. 6N-6O illustrate detecting the drag gesture initiated in FIG. 6N with contact 5507 on the trackpad of electronic device 5002 (laptop computer) from position 5507B to position 5507C, and in response to detecting the drag gesture while cursor 5102 is displayed over the frame of notes user interface 5322, displaying movement of cursor 5102 from the location illustrated in FIG. 6N to the location illustrated in FIG. 6O. Further, after the completion of the drag gesture, and while cursor 5102 is displayed on display 5014, electronic device 5002 instructs electronic device 5004 to display the user's notes on the trip to Australia on display 5014 (smartphone's display). In the illustrated embodiment of FIG. 6N, the user's notes on the trip to Australia are displayed in notes user interface 5222, which is a user interface of a notes application that runs on device 5004 (smartphone).

Figure 6P:
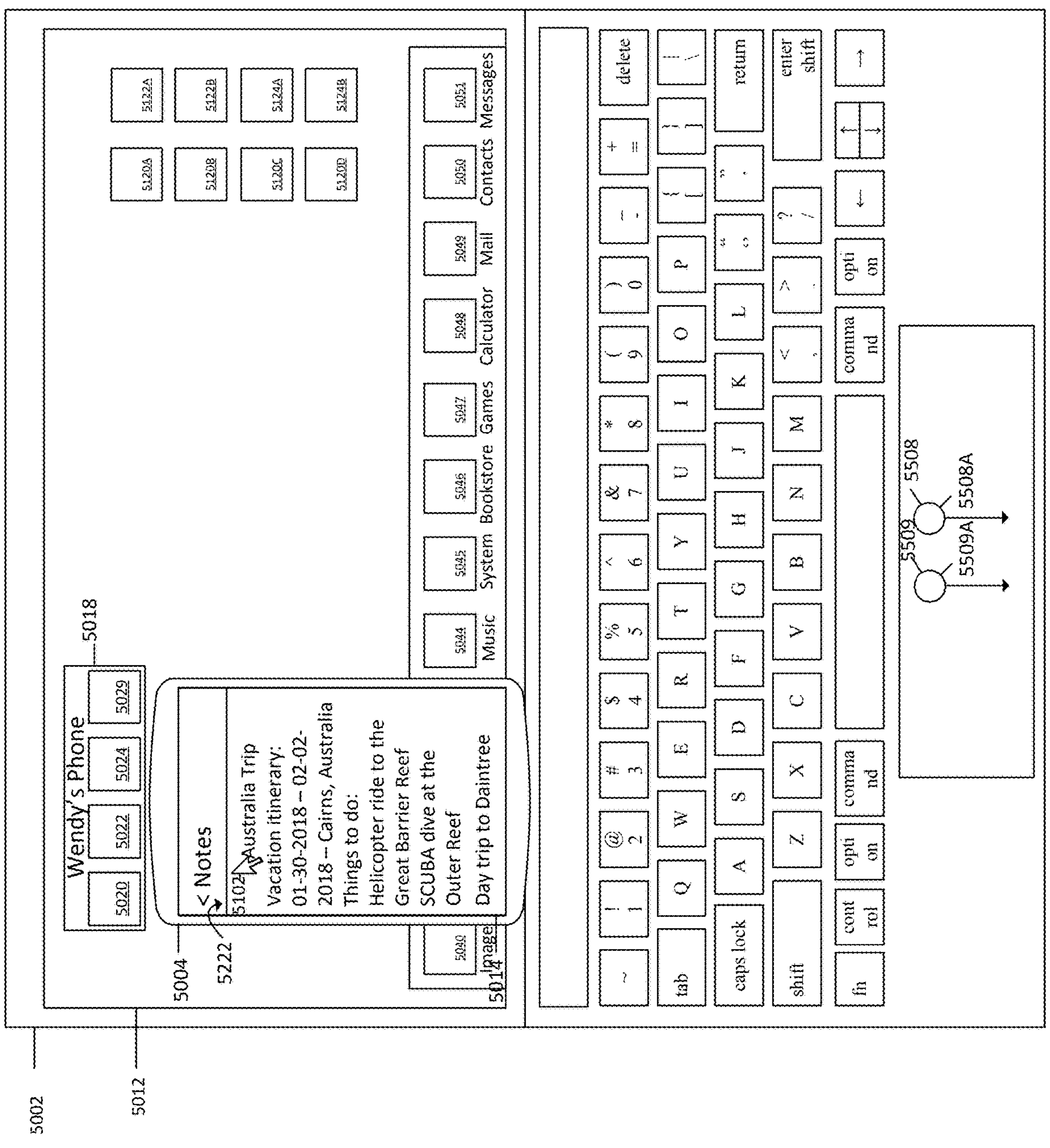
Figure 6Q:
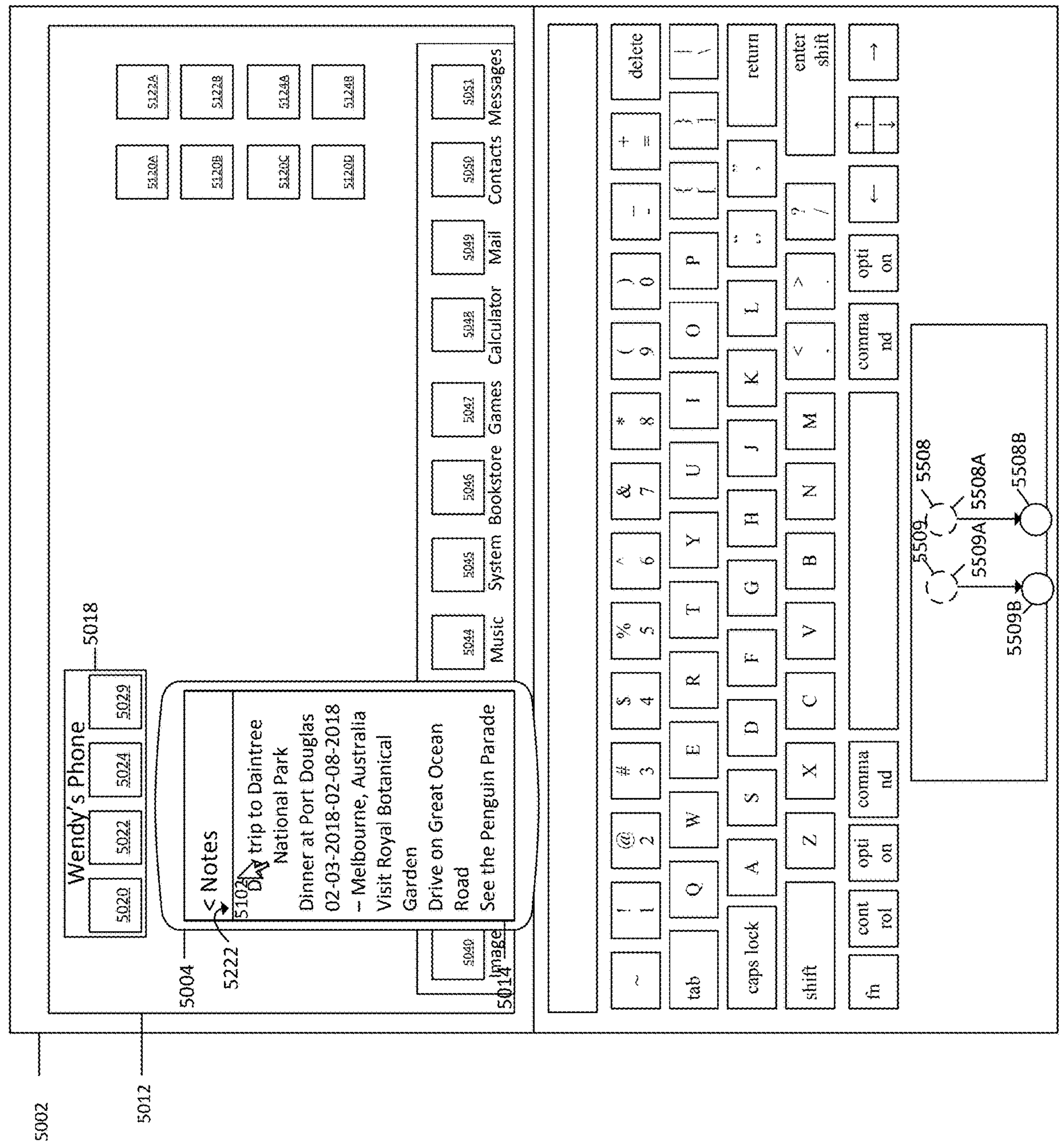

FIGS. 6P-6Q illustrate detecting a scroll gesture with contacts 5508 and 5509 on the trackpad of electronic device 5002 from positions 5508A and 5509A to positions 5508B and 5509B, and in response to detecting the swipe gesture while cursor 5102 is displayed over notes user interface 5222, scrolling the user's notes to display additional content on the user's trip to Australia. In the illustrated embodiment of FIG. 6Q, additional content on a day trip to Daintree National Park, as well as information about a trip to Melbourne, Australia are displayed on display 5014 (the smartphone's display). In some embodiments, the user optionally performs additional gestures to interact with the user's notes on the trip to Australia. In one or more of such embodiments, the user performs a drag gesture similar to the gestures shown in FIGS. 6N-6O to drag the user's notes on the trip to Australia from display 5014 to display 5012 (the laptop computer's display) to view the user's notes on a larger display. In one or more of such embodiments, device 5002, in response to detecting the drag gesture, displays movement of cursor 5102 and notes user interface 5222 across display 5014 and display 5012. Electronic device 5002 determines a current location of cursor 5102 at the completion of the drag gesture, and displays the user's notes on the trip to Australia on display 5012 if cursor 5102 is displayed on a region of display 5012 that is not covered by electronic device 5004 at the completion of the drag gesture. In one or more of such embodiments, electronic device 5002 displays the user's notes on the trip to Australia in notes user interface 5322, which is a user interface of a notes application that runs on electronic device 5002.

Figure 6R:
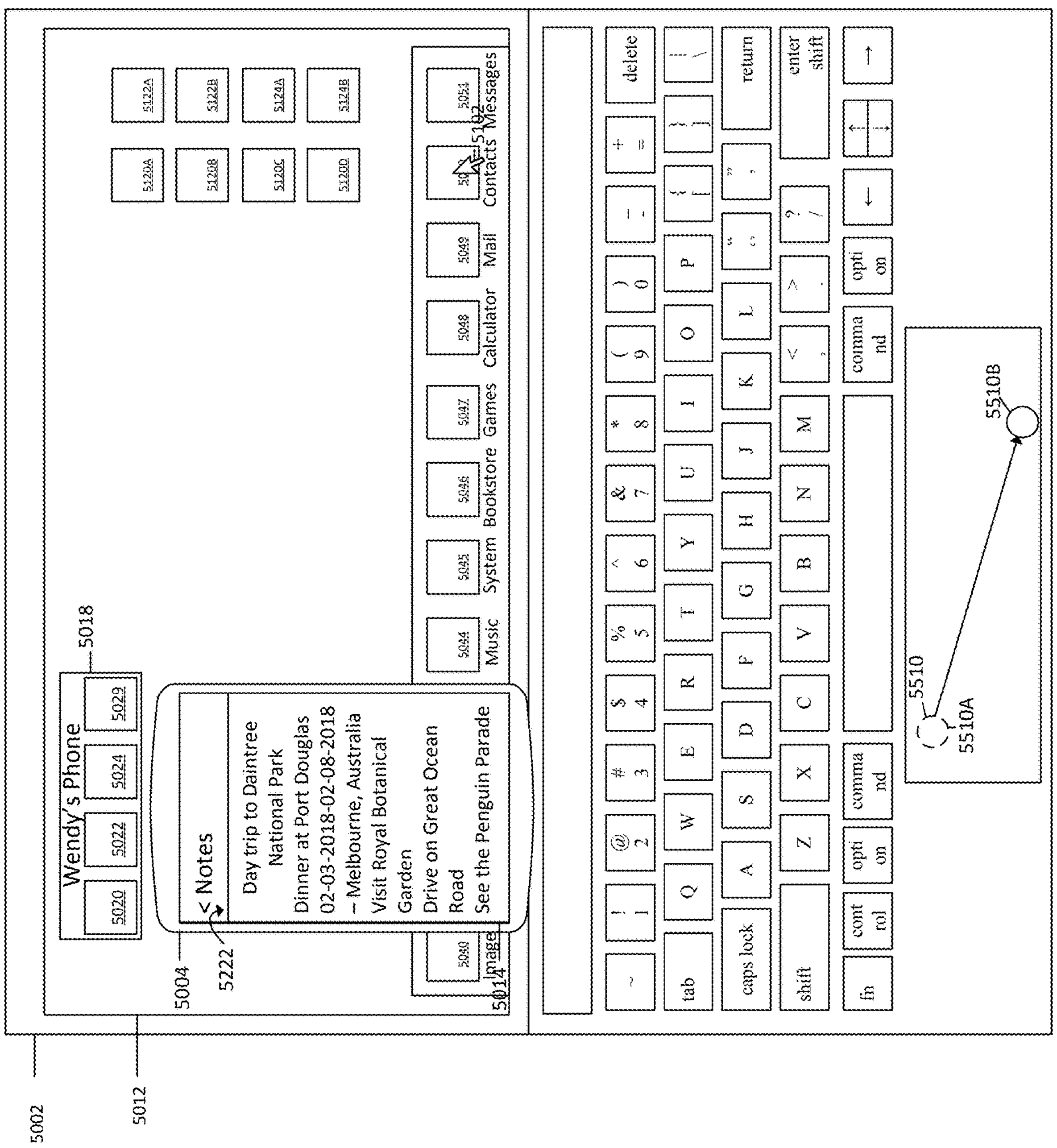
Figure 6S:
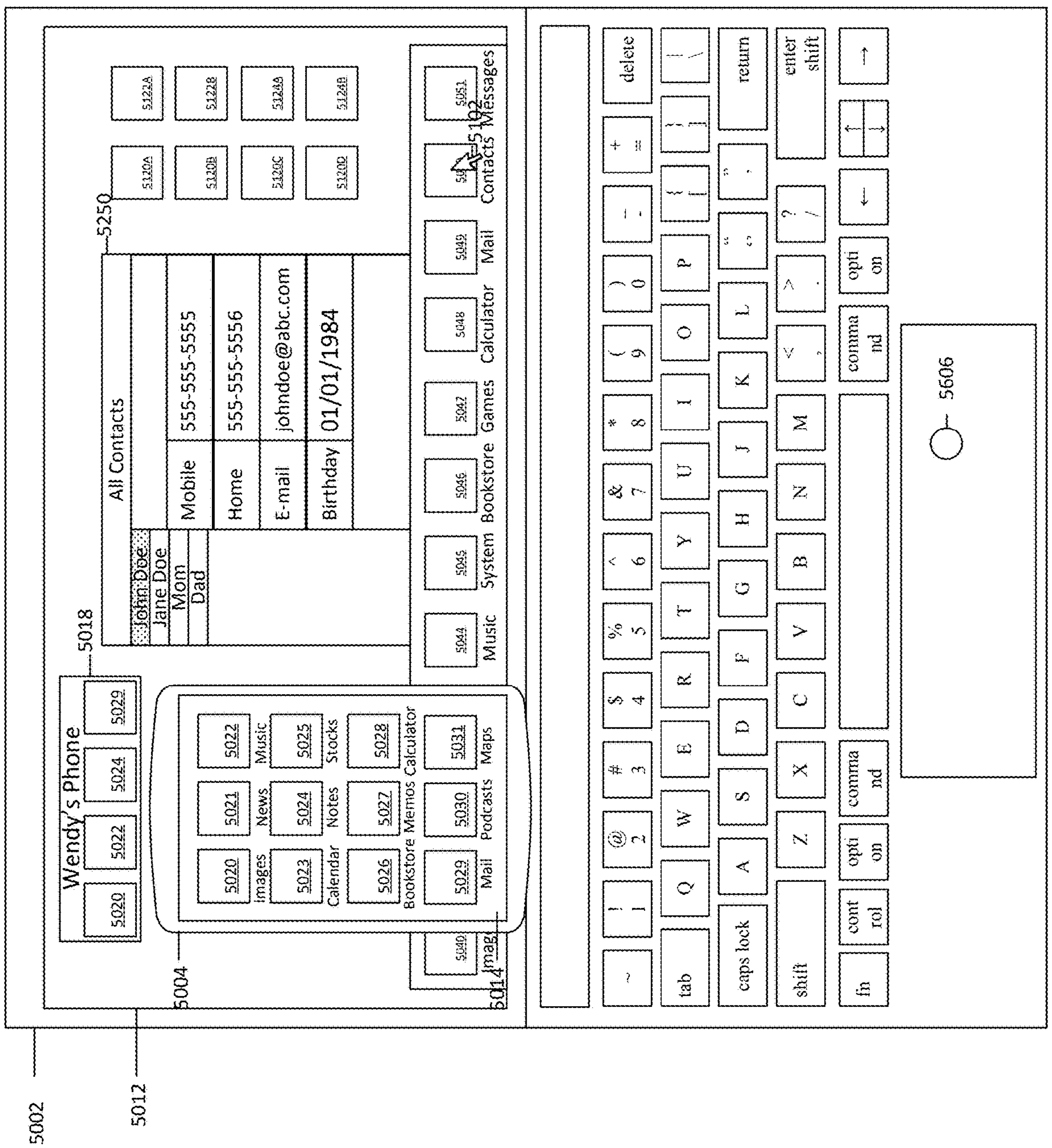

FIGS. 6R-6S illustrate detecting a slide gesture with contact 5510 on the trackpad of electronic device 5002 (laptop computer) from position 5510A to position 5510B, and in response to detecting the slide gesture, displaying movement of cursor 5102 from the location illustrated in FIG. 6R to the location illustrated in FIG. 6S. As shown in FIG. 6S, cursor 5102 is displayed over contacts affordance 5050. FIG. 6S also illustrates detecting a tap gesture with contact 5606 on the trackpad of electronic device 5002, and in response to detecting the tap gesture while cursor 5102 is displayed over contacts affordance 5050, displaying contacts user interface 5250 on display 5012 (laptop computer's display). In the illustrated embodiment of FIG. 6S, John Doe's contact information is displayed on contacts user interface 5250. The user optionally selects another contact (e.g., Jane Doe, Mom, or Dad) to view contact information of the selected contact in contacts user interface 5250. In some embodiments, the user enters one or more user inputs to interact with the user's contacts (e.g., to inspect existing contacts, to add new contacts, etc.). Electronic device 5002, in response to detecting the user inputs while cursor 5102 is displayed on display 5012, displays responses to the user inputs on display 5012. For example, where the user optionally provides a voice command to edit John Doe's telephone number (e.g., "change John Doe's telephone number to 666-666-6666"), device 5002, in response to detecting the voice command, updates John Doe's telephone number to 666-666-6666 and displays the updated telephone number in contacts user interface 5250.

Figure 6T:
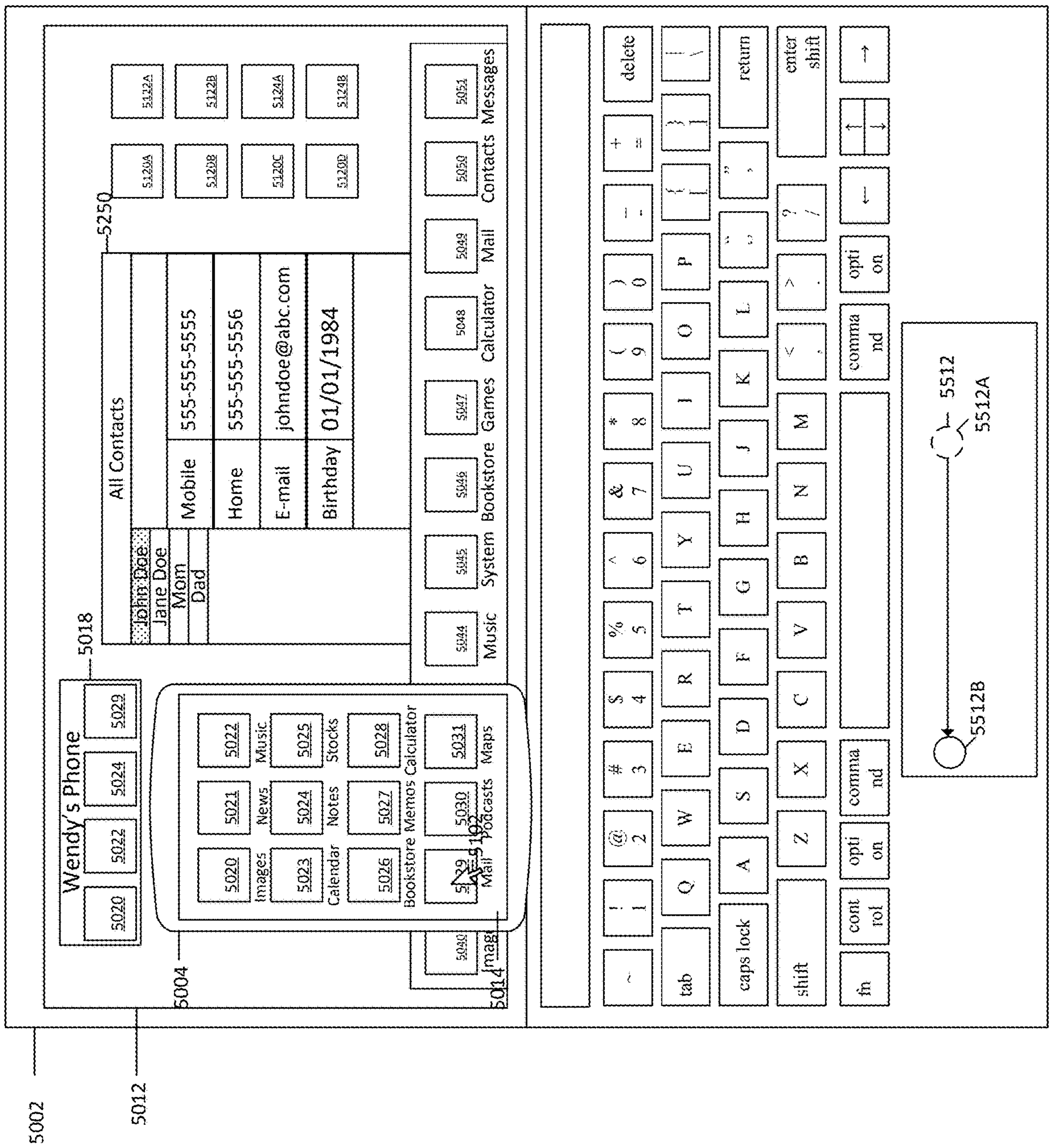

FIG. 6T illustrates detecting a slide gesture with contact 5512 on the trackpad of electronic device 5002 from position 5512A to position 5512B, and in response to detecting the slide gesture, displaying movement of cursor 5102 from the location illustrated in FIG. 6S, across display 5012 (laptop computer's display) and display 5014 (smartphone's display), and to the location illustrated in FIG. 6T. In the illustrated embodiment of FIG. 6T, cursor 5102 is displayed over e-mail affordance 5029, which is an affordance of an electronic mail application. In some embodiments, the user optionally performs a tap gesture on the trackpad of electronic device 5002 while cursor 5102 is displayed over e-mail affordance 5029, and electronic device 5002, in response to detecting the tap gesture, instructs electronic device 5004 to display a user interface of the electronic mail application on display 5014.

Figure 6U:
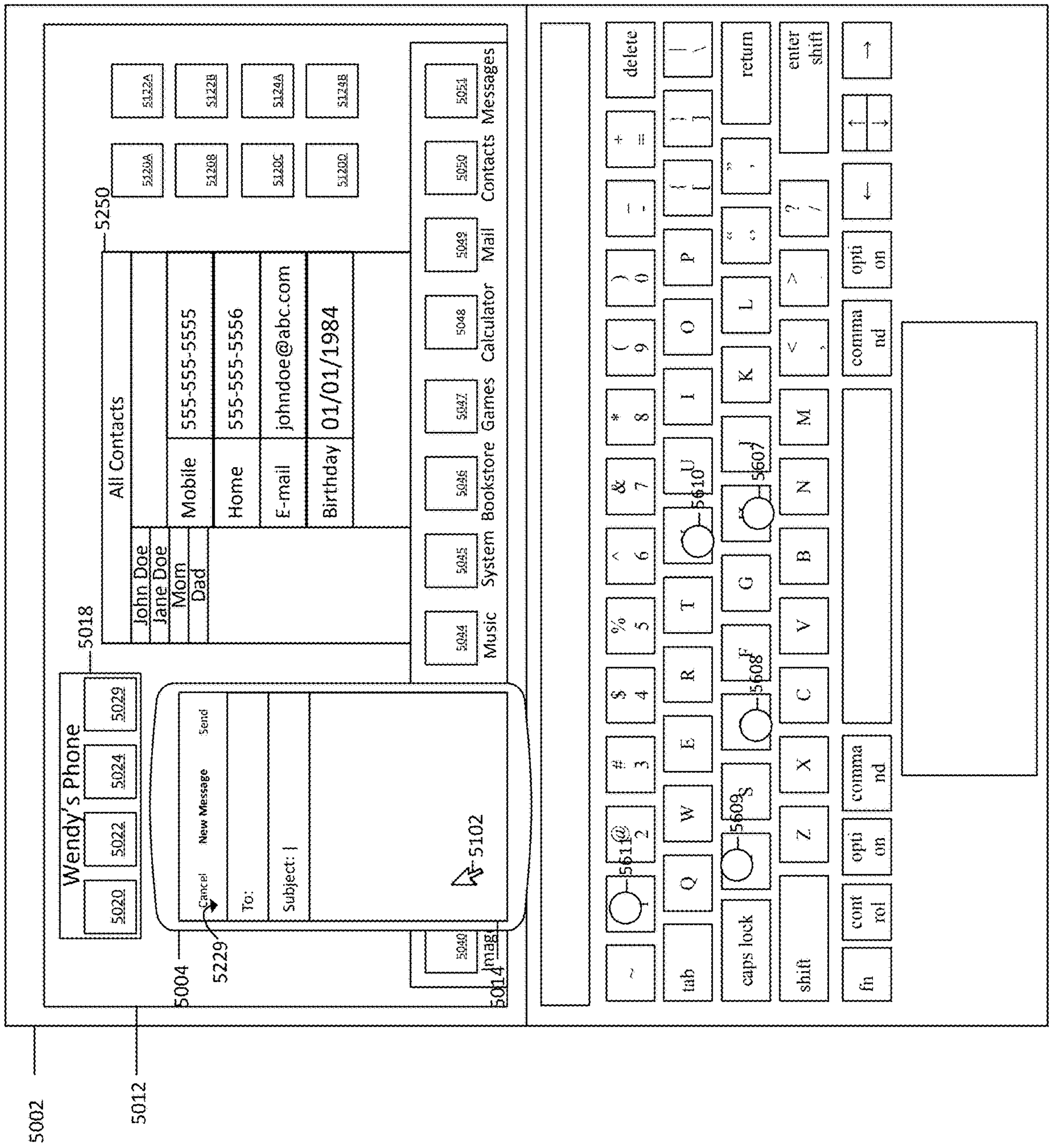
Figure 6V:
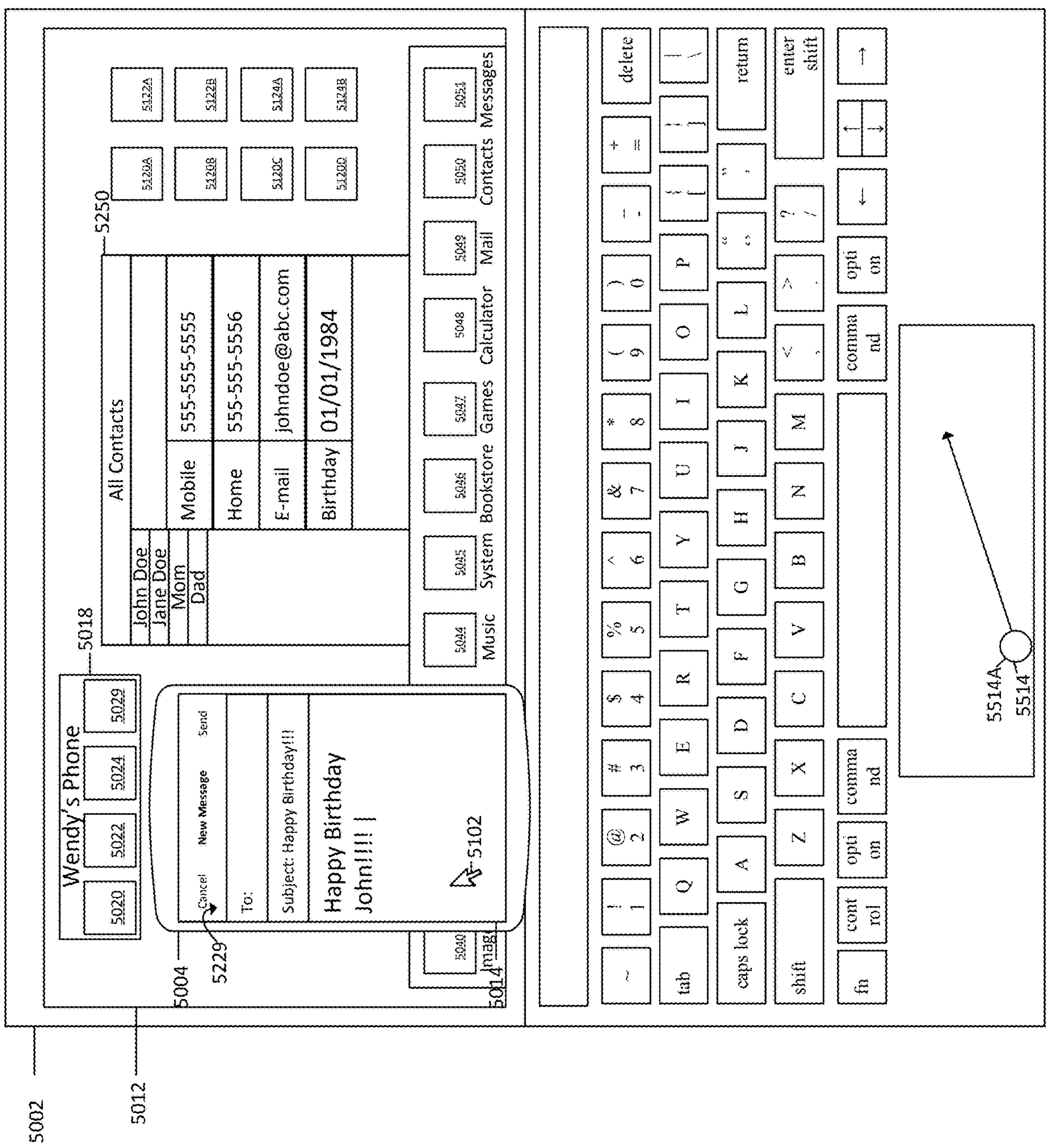

FIG. 6U illustrates an e-mail user interface 5229 displayed on display 5014 (smartphone's display), while contacts user interface 5250 containing John Doe's contact information is displayed on display 5012 (laptop computer's display). In the illustrated embodiment of FIG. 6U, a blinking cursor is displayed in the subject field of e-mail user interface 5229. The user optionally enters a subject of an e-mail message while the blinking cursor is displayed in the subject field. In that regard, FIGS. 6U-6V illustrate detecting tap gestures with contacts 5607-5611 over the keyboard of electronic device 5002 (laptop computer), and in response to detecting the tap gestures, displaying content in the subject field and the content field of e-mail user interface 5229. More particularly, electronic device 5002, in response to detecting the tap gestures illustrated in FIG. 6U, instructs electronic device 5004 to display "Happy Birthday!!!" in the subject field and "Happy Birthday John!!!" in the content field of e-mail user interface 5229.

Figure 6W:
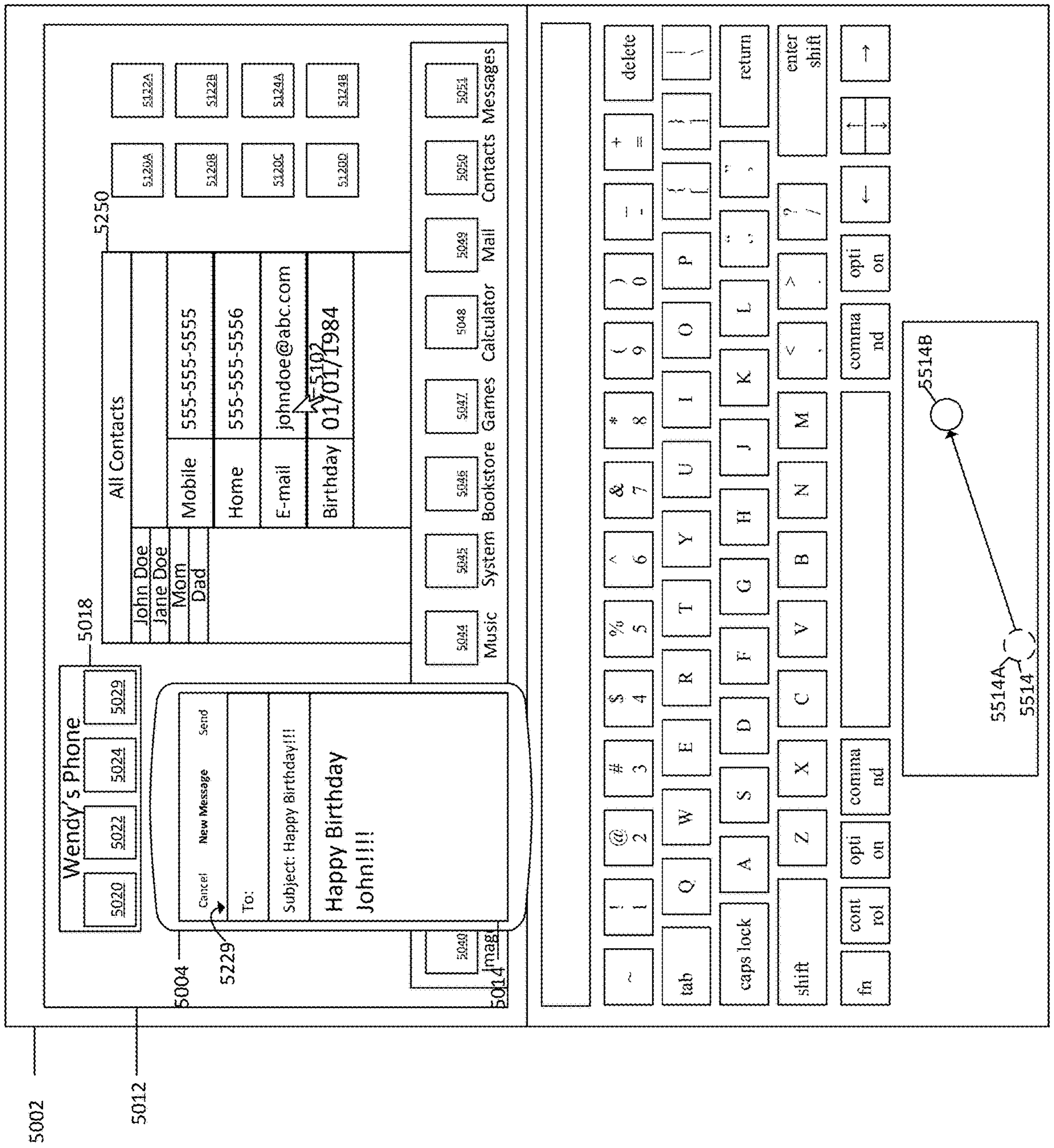
Figure 6X:
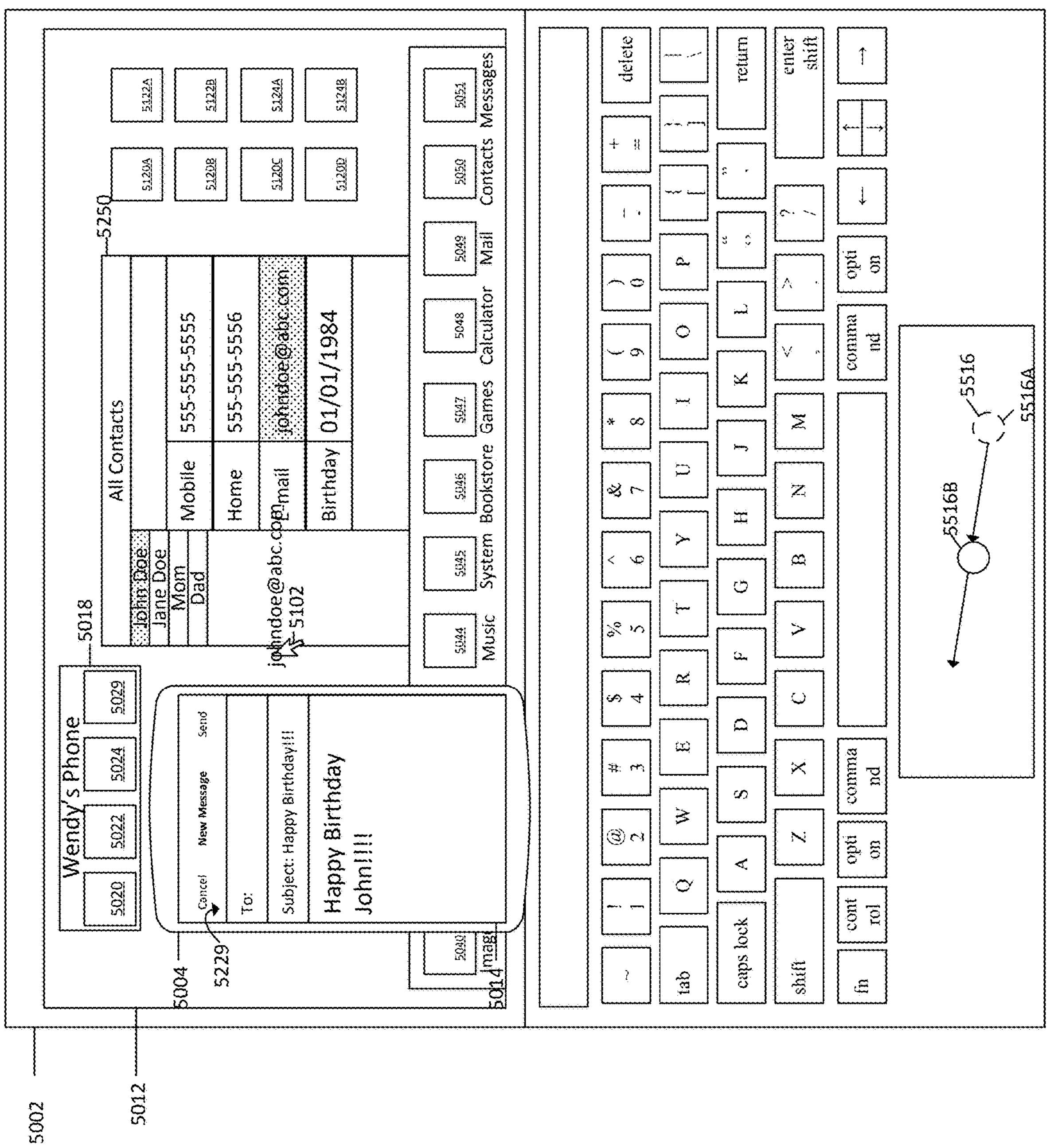
Figure 6Y:
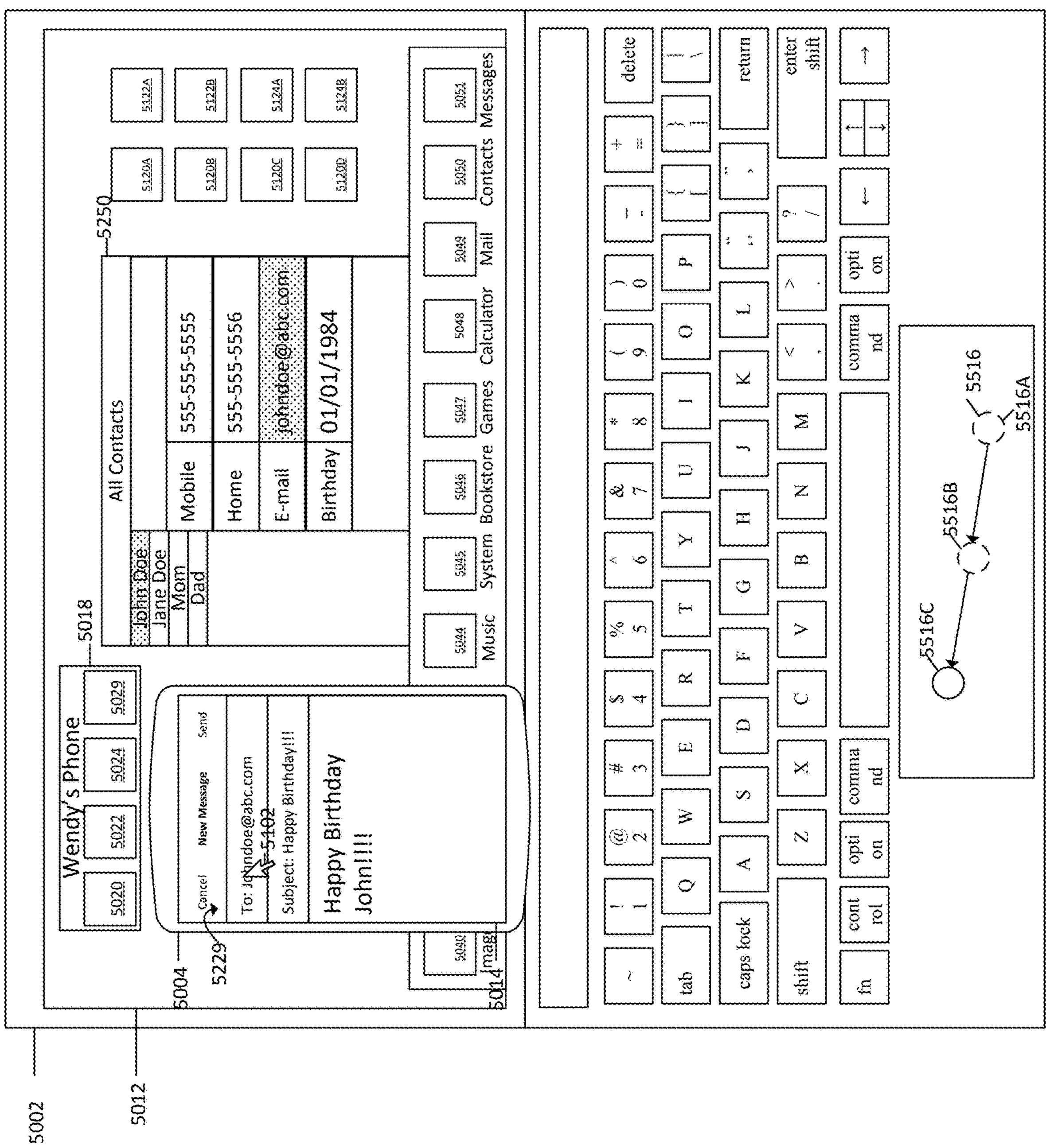
Figure 7A:
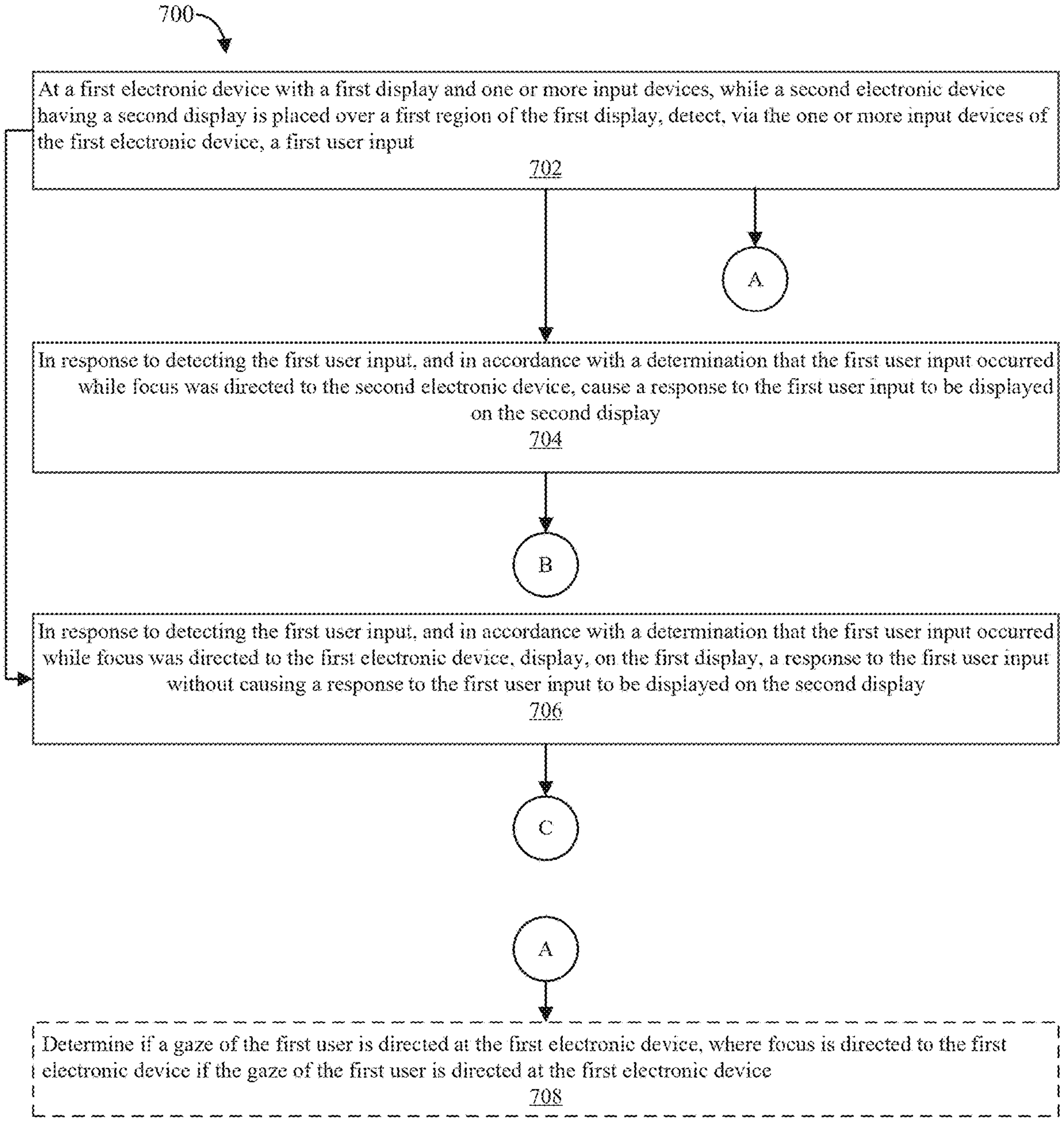
Figure 7B:
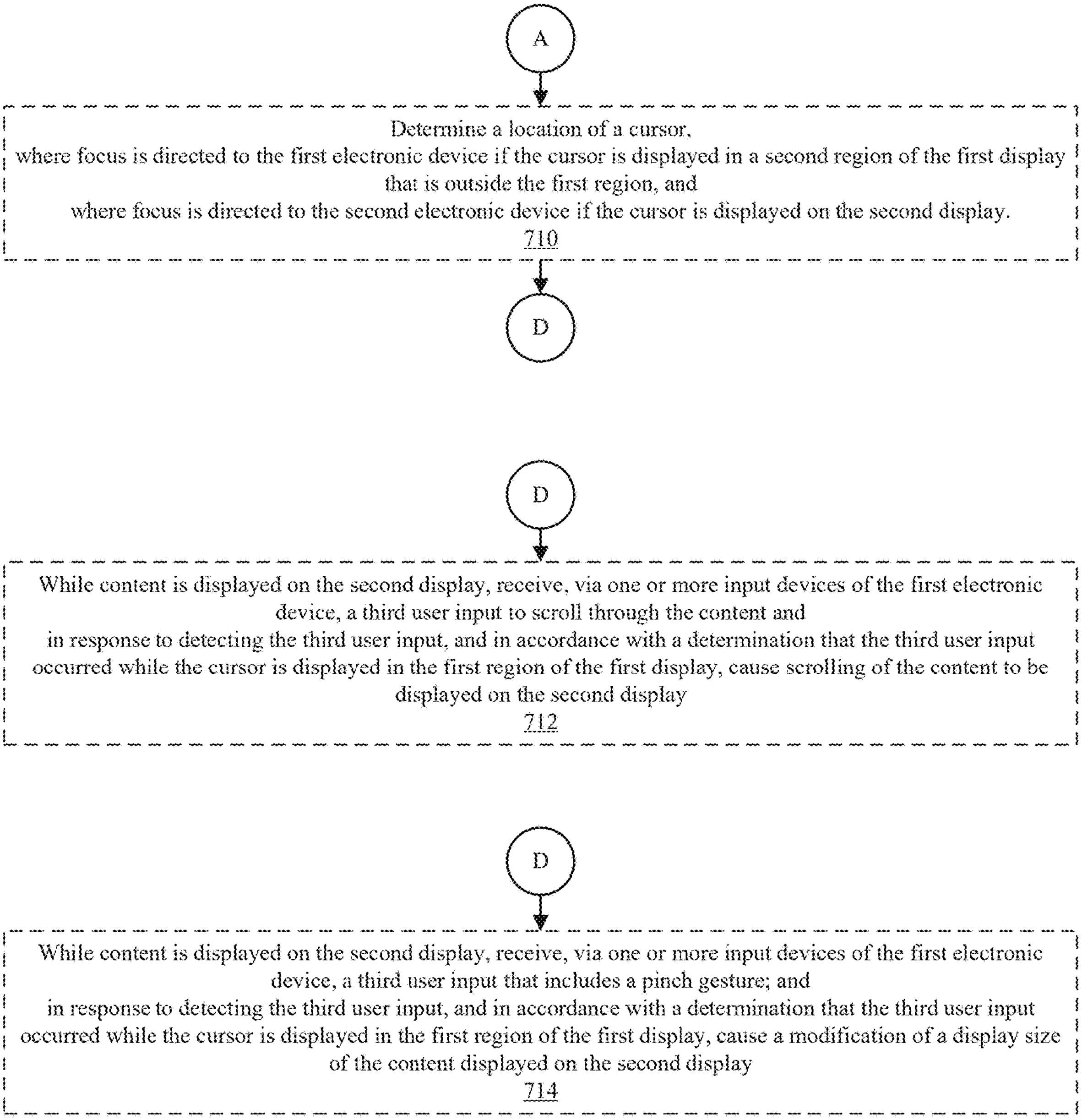
Figure 7E:
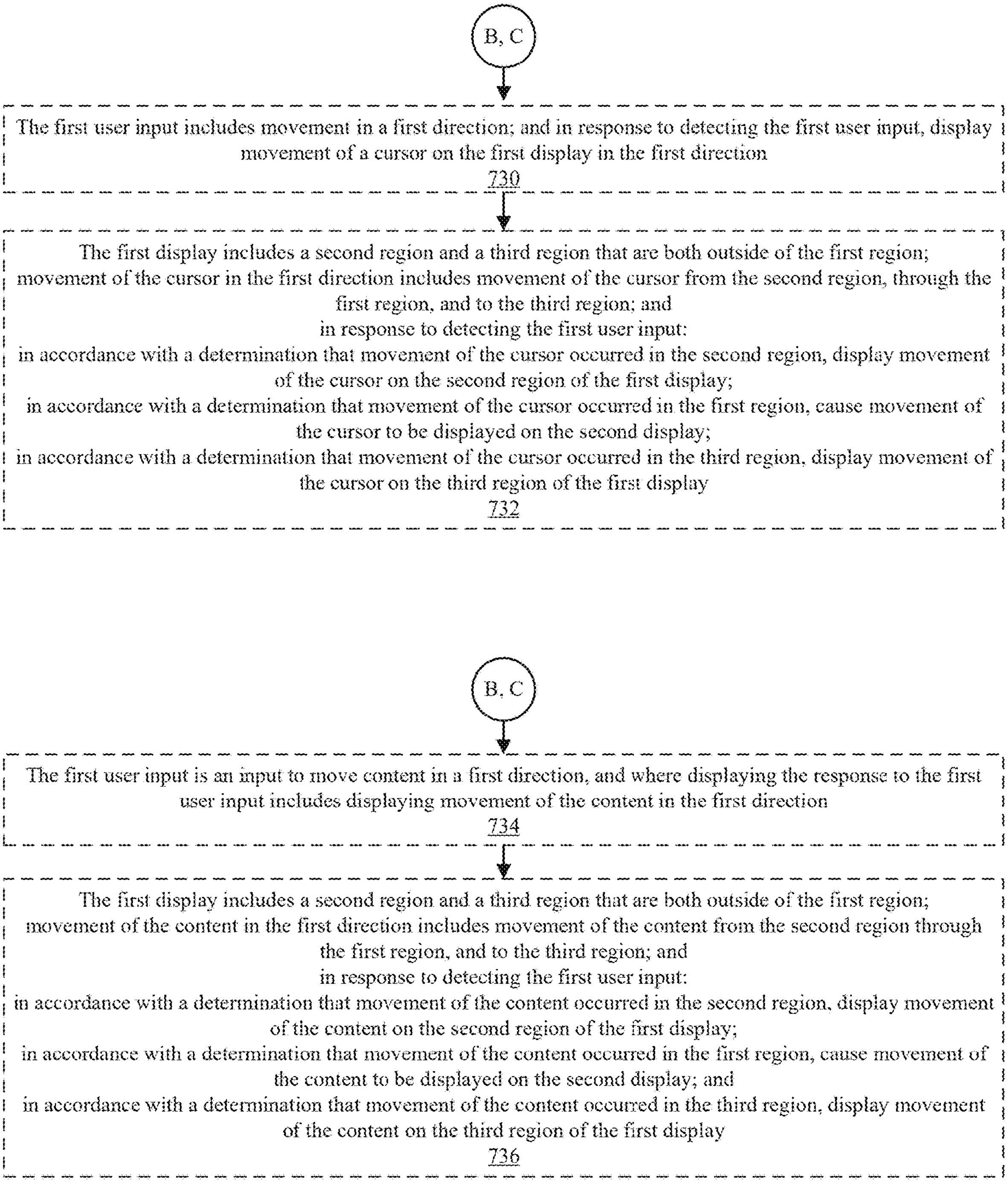
Figure 7F:
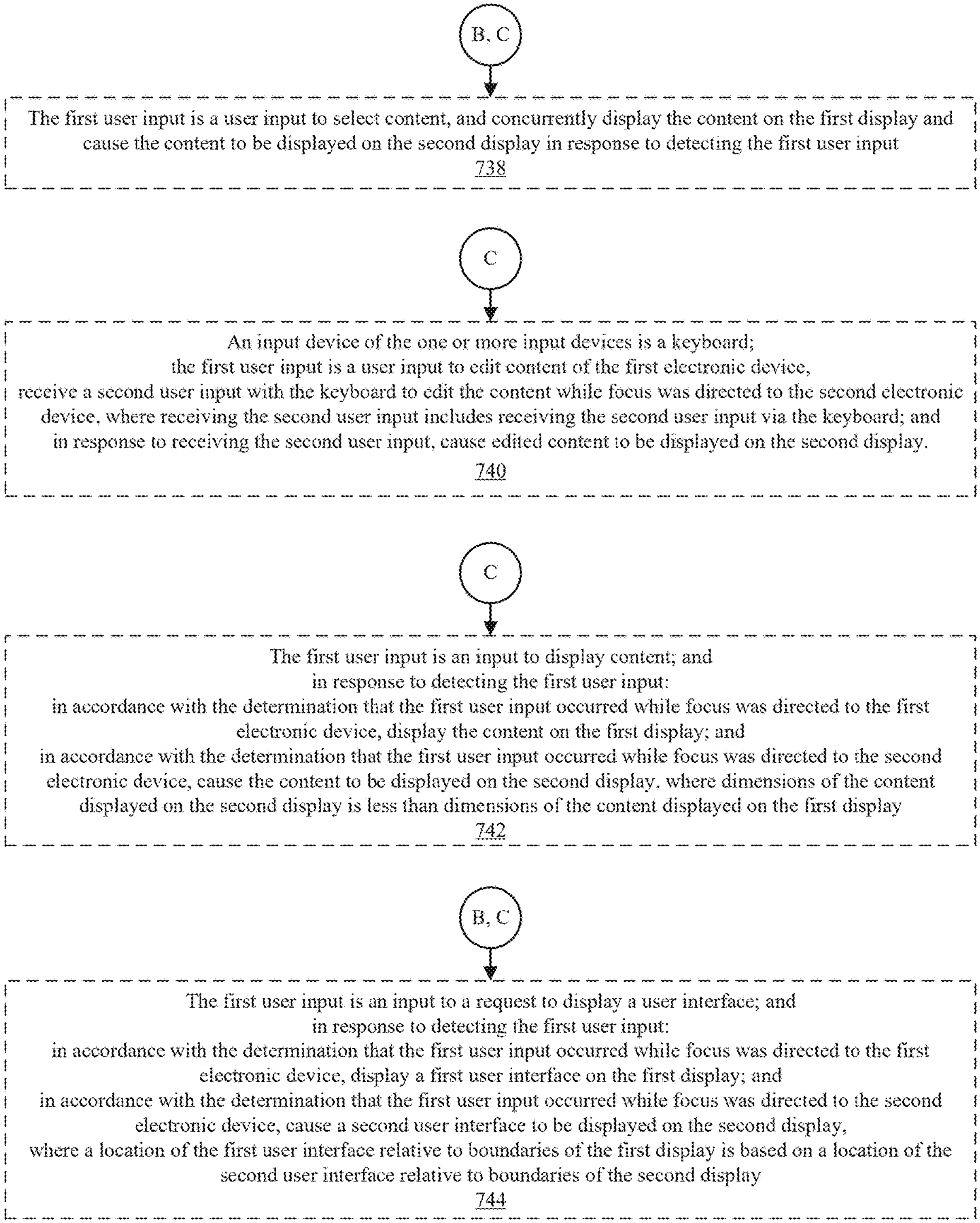

FIGS. 6V-6W illustrate detecting a slide gesture with contact 5514 on the trackpad of electronic device 5002 (laptop computer) from position 5514A to position 5514B, and in response to detecting the slide gesture, displaying movement of cursor 5102 from the location illustrated in FIG. 6V, across display 5014 (smartphone's display) and display 5012 (laptop computer's display), to the location illustrated in FIG. 6W. As shown in FIG. 6W, cursor 5102 is displayed over John Doe's e-mail address. FIG. 6X illustrates detecting a drag gesture with contact 5516 on the trackpad of electronic device 5002 from position 5516A to position 5516B, and in response to detecting the drag gesture while cursor 5102 is displayed over John Doe's e-mail address, displaying movement of cursor 5102 and text containing John Doe's e-mail address from the location illustrated in FIG. 6W to the location illustrated in FIG. 6X. Further, FIGS. 6X-6Y illustrate detecting the drag gesture initiated in FIG. 6X with contact 5516 on the trackpad of electronic device 5002 from position 5516B to position 5516C, and in response to detecting the drag gesture while cursor 5102 is displayed over the text of John Doe's e-mail address, displaying movement of cursor 5102 and the text of John Doe's e-mail address from the location illustrated in FIG. 6X to the location illustrated in FIG. 6Y. In the illustrated embodiment of FIG. 6Y, cursor 5102 is displayed above the "To" field. Further, after the completion of the drag gesture, and while cursor 5102 is displayed over the "To" field, electronic device 5002 instructs electronic device 5004 to display John Doe's e-mail address in the "To" field. The user optionally enters additional user inputs (e.g., type of the keyboard of electronic device 5002) to edit the e-mail message to John Doe, or to transmit the e-mail message to John Doc.

FIGS. 7A-7F are flow diagrams illustrating various embodiments of a method for engaging in cross device interactions. More particularly, FIGS. 7A-7F are flow diagrams illustrating a method for engaging in cross device interactions, using, for example, the user interfaces of FIGS. 6A-6Y. As described in reference to FIGS. 6A-6Y, method 700 can be utilized to engage in cross device interactions. Method 700 is performed at a device (e.g., electronic device 5002 or 5004, which optionally, represents any of devices 100, 300, and 500 as illustrated in FIGS. 1, 3, and 5A, respectively) with a display and one or more input devices. In one of such embodiments, the display is a touch screen display and the touch-sensitive surface is on or integrated with the display. In some embodiments, the display is separate from the touch-sensitive surface. In other embodiments, the processes described herein may be implemented with devices having physical user-interfaces, voice interfaces, or other suitable interfaces. Some operations in method 700 are, optionally, combined and/or the order of some operations is, optionally, changed.

As described below, method 700 provides an intuitive way to engage in cross device interactions. The first electronic device of method 700 is represented by electronic device 5002 (laptop computer) in the illustrated embodiments of FIGS. 6A-6Y, whereas the second electronic device of method 700 is represented by electronic device 5004 (smartphone) in the illustrated embodiments of FIGS. 6A-6Y. Further, the first display of method 700 is represented by display 5012 (laptop computer's display) in the illustrated embodiments of FIGS. 6A-6Y, whereas the second display of method 700 is represented by display 5014 (smartphone's display) in the illustrated embodiments of FIGS. 6A-6Y. Method 700 allows the user to utilize input devices of the first electronic device (e.g., electronic device 5002) to interact with content displayed on the first electronic device or on the second electronic device (e.g., electronic device 5004) that is placed over the first electronic device. While the user's focus is directed to the first electronic device, method 700 allows the user to view responses to the user's inputs on the display of the first electronic device, thereby reducing the user's cognitive burden and creating a more efficient human-machine interface. While the user's focus is directed to the second electronic device, method 700 allows the user to view responses to the user's inputs on the display of the second electronic device, thereby reducing the user's cognitive burden and creating a more efficient human-machine interface. For battery-operated computing devices, enabling a user to view responses to the user's input on the display of the electronic device the user is focused on faster and more efficiently conserves power and increases the time between battery charges.

A first electronic device (e.g., electronic device 5002) with a first display and one or more input devices, while a second electronic device (e.g., electronic device 5004) having a second display is placed over a first region of the first display, detects (702), via the one or more input devices of the first electronic device, a first user input. FIG. 6B, for example, illustrates electronic device 5004 (smartphone) placed over a region of electronic device 5002 (laptop computer). FIG. 6B also illustrates displaying a drag gesture with contact 5502 on the trackpad of electronic device 5002.

The first electronic device (e.g., electronic device 5002), in response to detecting the first user input, and in accordance with a determination that the first user input occurred while focus was directed to the second electronic device (e.g., electronic device 5004), causes (704) a response to the first user input to be displayed on the second display. FIGS. 6H-6I, for example, illustrate displaying a tap gesture with contact 5502 on the trackpad of electronic device 5002 (laptop computer) while cursor 5102 is displayed in display 5014 (smartphone's display) to select a preview of image 5121A, and in response to detecting the tap gesture, displaying (or causing electronic device 5004 to display) image 5121A on display 5014.

The first electronic device (e.g., electronic device 5002), in accordance with a determination that the first user input occurred while focus was directed to the first electronic device, displays (706), on the first display, a response to the first user input without causing a response to the first user input to be displayed on the second display. FIGS. 6B-6C, for example, illustrate displaying a drag gesture with contact 5502A on the trackpad of electronic device 5002 (laptop computer) from position 5502A to position 5502B to move an image affordance 5120A of image 5121A (as shown in FIGS. 6H-6J) across display 5012 (display of the laptop computer), and in response to detecting the drag gesture while cursor 5102 is displayed on display 5012, displaying movement of cursor 5102 and image affordance 5120A across display 5012. Further, as shown in FIGS. 6B-6C, the movement of cursor 5102 and image affordance 5120A is only displayed on display 5012.

In some embodiments, the first electronic device (e.g., electronic device 5002) determines (708) if a gaze of the first user is directed at the first electronic device, where focus is directed to the first electronic device if the gaze of the first user is directed at the first electronic device 5002. FIGS. 6H-6I, for example, illustrate displaying image 5121A on display 5014 (smartphone's display) based on a location of cursor 5102. In some embodiments, device 5002 (laptop computer) is operable to determine whether the user's gaze is on the electronic device 5002 or electronic device 5004 (smartphone). In one or more of such embodiments, image 5121A is displayed on display 5012 (laptop computer's display) if the user's gaze is on the electronic device 5002. Alternatively, image 5121A is displayed on display 5014 if the user's gaze is on electronic device 5004 (smartphone). Determining whether the user is focused on a particular electronic device of multiple electronic devices placed over each other based on the user's gaze allows the user to select the respective electronic device without entering user inputs, such as typing on a keyboard, thereby reducing the cognitive burden on the user. The foregoing also allows an electronic device (e.g., electronic device 5002) to determine which electronic device of multiple electronic devices that are placed over each other the user is focused on without receiving certain user inputs, such as typing on a keyboard, thereby creating a more efficient human-machine interface. For battery-operated computing devices, enabling a user to designate focus on an electronic device faster and more efficiently conserves power and increases the time between battery charges.

In some embodiments, the first electronic device (e.g., electronic device 5002) determines (710) a location of a cursor, where focus is directed to the first electronic device if the cursor is displayed in a second region of the first display that is outside the first region, and where focus is directed to the second electronic device (e.g., electronic device 5004) if the cursor is displayed on the second display. FIGS. 6B-6C, for example, illustrate displaying cursor 5102 in a region of display 5012 (laptop computer's display) that is not covered by electronic device 5004 (smartphone). In the illustrated embodiment of FIGS. 6B-6C, focus is directed to electronic device 5002. Further, FIGS. 6E and 6G, for example, illustrate displaying cursor 5102 on display 5014 (smartphone's display). In the illustrated embodiments of FIGS. 6E and 6G, focus is directed to electronic device 5004. Determining whether the user is focused on a particular electronic device of multiple electronic devices placed over each based on the location of a cursor allows the user to select the respective electronic device without entering certain user inputs, such as typing on a keyboard, thereby reducing the cognitive burden on the user. The foregoing also allows an electronic device to determine which electronic device of multiple electronic devices that are placed over each other the user is focused on without receiving certain user inputs, such as typing on a keyboard, thereby creating a more efficient human-machine interface. For battery-operated computing devices, enabling a user to designate focus on an electronic device faster and more efficiently conserves power and increases the time between battery charges.

In some embodiments, while content is displayed on the second display, the first electronic device (e.g., electronic device 5002), receives (712), via one or more input devices of the first electronic device, a third user input to scroll through the content. In some embodiments, in response to detecting the third user input, and in accordance with a determination that the third user input occurred while the cursor is displayed in the first region of the first display, the first electronic device causes (712) scrolling of the content to be displayed on the second display. FIGS. 6Q-6R, for example, illustrate detecting a double swipe gesture with contacts 5508 and 5509 on the trackpad of electronic device 5002 (laptop computer) from positions 5508A and 5509A to positions 5508B and 5509B, and in response to detecting the double swipe gesture while cursor 5102 is displayed over notes user interface 5222, scrolling content displayed on display 5014 (smartphone's display). While a second electronic device is placed over a first electronic device, allowing the user to use input devices of the first electronic device, which is more ergonomic and more accessible to the user relative to the input devices of the second electronic device, allows the user to enter the user's inputs more efficiently, thereby reducing the cognitive burden on the user. Further, causing a scrolling of content displayed on the display of the second electronic device in response to detecting the user inputs on the first electronic device allows the user to interact with the content displayed on the display of the second electronic device by entering user inputs via the input devices of the first electronic device, thereby creating a more efficient human-machine interface. For battery-operated computing devices, enabling a user to interact with content displayed on an electronic device with input devices of another electronic device faster and more efficiently conserves power and increases the time between battery charges.

In some embodiments, while content is displayed on the second display, the first electronic device (e.g., electronic device 5002) receives (714), via one or more input devices of the first electronic device, a third user input that includes a pinch gesture. In some embodiments, in response to detecting the third user input, and in accordance with a determination that the third user input occurred while the cursor is displayed in the first region of the first display, the first electronic device causes (714) a modification of a display size of the content displayed on the second display. FIGS. 6I-6J, for example, illustrate displaying a pinch gesture with contacts 5504 and 5505 on the trackpad of electronic device 5002 (laptop computer) from positions 5504A and 5505A to positions 5504B and 5505B, and in response to detecting the pinch gesture while cursor 5102 is displayed on display 5014 (smartphone's display), increasing the display size of image 5121A on display 5014. While a second electronic device is placed over a first electronic device, allowing the user to use input devices of the first electronic device, which is more ergonomic and more accessible to the user relative to the input devices of the second electronic device, allows the user to enter the user's inputs more efficiently, thereby reducing the cognitive burden on the user. Further, causing content displayed on the display of the second electronic device to zoom in or zoom out in response to detecting the user inputs on the first electronic device allows the user to interact with the content displayed on the display of the second electronic device by entering user inputs via the input devices of the first electronic device, thereby creating a more efficient human-machine interface. For battery-operated computing devices, enabling a user to interact with content displayed on an electronic device with input devices of another electronic device faster and more efficiently conserves power and increases the time between battery charges.

In some embodiments, while content is displayed on the first display, the first electronic device (e.g., electronic device 5002) receives (716), via one or more input devices of the second electronic device (e.g., electronic device 5004), a second user input where the second user input is a voice command input to edit the content. In some embodiments, in response to detecting the second user input, and in accordance with a determination that the second user input was received while the cursor is displayed in the second region of the first display, the first electronic device displays (716) edited content on the first display. FIG. 6S, for example, illustrates displaying contacts user interface 5250 of a contacts application containing the user's contacts. Further, FIG. 6S illustrates displaying John Doe's contact information in contacts user interface 5250. In some embodiments, the user optionally enters inputs to edit John Doe's contact information or the contact information of the user's other contacts. In one or more embodiments, the user provides a voice command to edit content displayed in contacts user interface 5250 (e.g., "change John Doe's telephone number to 666-666-6666"). In one or more embodiments, the voice command is detected by input devices of electronic device 5004 (smartphone) and is provided to electronic device 5002 (laptop computer). Further, while a second electronic device is placed over a first electronic device, allowing the user to use input devices of the second electronic device, which in some instances, are more accessible to the user relative to the input devices of the second electronic device, allows the user to enter the user's inputs more efficiently, thereby reducing the cognitive burden on the user. Further, editing content displayed on the display of the first electronic device in response to receiving the user inputs on the second electronic device allows the user to interact with the content displayed on the display of the first electronic device by entering user inputs via the input devices of the second electronic device, thereby creating a more efficient human-machine interface. For battery-operated computing devices, enabling a user to modify content displayed on an electronic device with input devices of another electronic device faster and more efficiently conserves power and increases the time between battery charges.

In some embodiments, the first electronic device (e.g., electronic device 5002), in response to detecting the first user input, and in accordance with a determination that the cursor is displayed in the first region, causes (718) the user interface to be displayed on the second display (e.g., display 5014). FIG. 6O, for example, illustrates displaying the user's notes on a trip to Australia in notes user interface 5222. In the illustrated embodiment, the first region of display 5012 (laptop computer's display) includes an area that electronic device 5004 (smartphone) is placed over. In the illustrated embodiment, cursor 5102 is displayed on display 5014 (smartphone's display), which is placed over the first region of display 5012. In some embodiments, cursor 5102 is also displayed in a corresponding location in the first region of display 5012.

In some embodiments, the first electronic device (e.g., electronic device 5002), in response to detecting the first user input and in accordance with a determination that the cursor is displayed in the second region, displays (718) the user interface on the first display (e.g., display 5012). FIG. 6M, for example, illustrates displaying the user's notes on a trip to Australia in notes user interface 5322. In the illustrated embodiment, cursor 5102 is displayed in a second region of display 5012 that is not covered by electronic device 5004 (smartphone). Determining whether a user interface should be displayed on a first display of a first electronic device or a second display of a second electronic device that are placed over each other based on the location of a cursor allows the content to be displayed on the respective display without requiring entering certain user inputs, such as typing on a keyboard, to designate where to display the user interface, thereby reducing the cognitive burden on the user and creating a more efficient human-machine interface. The foregoing also allows the first electronic device to determine where to display the user interface without receiving certain user inputs, such as typing on a keyboard, thereby creating a more efficient human-machine interface. For battery-operated computing devices, displaying user interface faster and more efficiently conserves power and increases the time between battery charges.

In some embodiments, where the first user input is an input to display content, the first electronic device (e.g., electronic device 5002), in response to detecting the first user input, and in accordance with a determination that the cursor is displayed in the first region, causes (720) the content to be displayed in a first user interface, where the first user interface is displayed on the second display (e.g., display 5014). FIGS. 6H-6I, for example, illustrate detecting a tap gesture with contact 5602 on the trackpad of electronic device 5002 (laptop computer) to select a preview of image 5121A, and in response to detecting the tap gesture, displaying an image in images user interface 5220, which is displayed on display 5014 (smartphone's display). In the illustrated embodiment, cursor 5102 is displayed on display 5014 of electronic device 5004 (smartphone), which is placed over the first region of display 5012 (laptop computer's display).

In some embodiments, where the first user input is an input to display content, the first electronic device (e.g., electronic device 5002), in response to detecting the first user input, and in accordance with a determination that the cursor is displayed in the second region, displays (720) the content in a second user interface, where the second user interface is displayed on the first display (e.g., display 5012). FIG. 6M, for example, illustrates detecting a tap gesture with contact 5604 on the trackpad of electronic device 5002 to select notes affordance 5122A, and in response to detecting the tap gesture while cursor 5102 is displayed on display 5014 (the laptop computer's display), displaying the user's notes on a trip to Australia in notes user interface 5322. In the illustrated embodiment, cursor 5102 is displayed in a second region of display 5012 that is not covered by electronic device 5004 (smartphone). Determining whether content should be displayed on a first display of a first electronic device or a second display of a second electronic device that are placed over each other based on the location of a cursor allows the content to be displayed on the respective display without requiring entering certain user inputs, such as typing on a keyboard, to designate where to display the content, thereby reducing the cognitive burden on the user and creating a more efficient human-machine interface. The foregoing also allows the first electronic device to determine where to display the content without receiving certain user inputs, such as typing on a keyboard, thereby creating a more efficient human-machine interface. For battery-operated computing devices, displaying content faster and more efficiently conserves power and increases the time between battery charges.

In some embodiments, while the content is displayed in the first user interface, the first electronic device (e.g., electronic device 5002) detects (722) a second user input to move the content to the second region. In some embodiments, the first electronic device in response to detecting the second user input, displays (722) the content in the second user interface. In some embodiments, including the embodiment illustrated in FIG. 6Q, the first region of display 5012 (laptop computer's display) is an area of display 5012 that electronic device 5004 is placed over, and the second region of display 5012 is an area that electronic device 5004 is not placed over. FIG. 6Q, for example, illustrates displaying the user's notes on a trip to Australia in notes user interface 5222, which is displayed on device 5004 (smartphone). In some embodiments, the user performs another drag gesture on the trackpad of electronic device 5002 to view the user's notes in the second region, and electronic device 5002, in response to detecting the drag gesture, displays the user's notes in a notes user interface, such as notes user interface 5322 of FIG. 6M.

In some embodiments, while the content is displayed in the second user interface, first electronic device detects (722) a third user input including a third user input to move the content to the first region. In some embodiments, the first electronic device (e.g., electronic device 5002), in response to detecting the third user input, causes (722) the content to be displayed in the first user interface. In some embodiments, including the embodiment illustrated in FIGS. 6M-6O, the first region of display 5012 (laptop computer's display) is an area of display 5012 that electronic device 5004 is placed over, and the second region of display 5012 is an area that electronic device 5004 is not placed over. FIG. 6M, for example, illustrates displaying the user's notes on a trip to Australia in notes user interface 5322, which is displayed in the second region (e.g., a region that is not covered by electronic device 5004) of display 5012. Further, FIGS. 6N-6O, illustrate displaying a drag gesture with contact 5507 on the trackpad of electronic device 5002 (laptop computer) from position 5507A to position 5507B to move the user's notes, and in response to detecting the drag gesture, displaying the user's notes in user interface 5322, which is displayed on display 5014 (smartphone's display). Displaying content in different user interfaces that are displayed on a first display of a first electronic device and a second display of a second electronic device that are placed over each other based on user inputs to move the content to different regions of the display of the first electronic device allows the user to designate where to display the content by moving the content into different regions of the first display, thereby reducing the cognitive burden on the user and creating a more efficient human-machine interface. For battery-operated computing devices, displaying content faster and more efficiently conserves power and increases the time between battery charges.

In some embodiments, the first electronic device (e.g., electronic device 5002), in response to a determination that the cursor is displayed in the second region, displays (724), on the first display, content of the second electronic device (e.g., electronic device 5004) while an indication that the content is displayed on the first display is displayed on the second display. FIG. 6H, for example, illustrates displaying previews of images 5121A-5121F. In the illustrated embodiment, images 5121B-5121F are content of electronic device 5004 (smartphone). In some embodiments, electronic device 5002, in response to a determination that the user selected the preview of image 5121B, displays image 5121B in the second region of display 5012 (laptop computer's display) and displays, on display 5014 (smartphone's display), an indication that image 5121B is being displayed on display 5012. Providing an indication on a second display of a second electronic device that the content is displayed on a first display of the first electronic device allows the user to quickly determine where the content is displayed, thereby reducing the cognitive burden on the user and creating a more efficient human-machine interface. For battery-operated computing devices, allowing the user to determine the location of the content faster and more efficiently conserves power and increases the time between battery charges.

In some embodiments, the first electronic device (e.g., electronic device 5002), in response to detecting the first user input and in accordance with a determination that the cursor is displayed in the first region, causes (726) a first user interface of the application to be displayed on the second display. In some embodiments, including the embodiment illustrated in FIG. 6O, the first region of display 5012 (laptop computer's display) is an area of display 5012 that electronic device 5004 (smartphone) is placed over. In that regard, FIGS. 6N-6O illustrate displaying a drag gesture with contact 5507 on the trackpad of electronic device 5002 (laptop computer) from position 5507A to position 5507B to move the user's notes, and in response to the drag gesture, displaying the user's notes in user interface 5322 while cursor 5102 is displayed on display 5014 (smartphone's display). In some embodiments, the first electronic device, in response to detecting the first user input and in accordance with a determination that the cursor is displayed in the second region, displays (726) a second user interface of the application on the first display. FIG. 6M, for example, illustrates displaying the user's notes on a trip to Australia in notes user interface 5322, which is displayed on display 5012. In the illustrated embodiment, cursor 5102 is displayed in a second region of display 5012. Displaying a first user interface on a first display of a first electronic device or causing a second electronic device to display a second user interface on a second display of the second electronic device based on the location of the cursor allows the user to designate whether the user would like to display the first user interface on the first display or the second user interface on the second display by moving the cursor, thereby reducing the cognitive burden on the user and creating a more efficient human-machine interface. For battery-operated computing devices, allowing the user to designate a display to display a user interface faster and more efficiently conserves power and increases the time between battery charges.

In some embodiments, while the cursor is displayed in the second region, the first electronic device (e.g., electronic device 5002) receives (728), via the one or more input devices, a second user input indicative of a movement in a first direction from a first location inside the second region to a second location inside of the first region of the first display. In some embodiments, the first electronic device, in response to detecting the second user input, displays (728) a movement of the cursor from the first location to the second location, where the movement of the cursor is displayed on the first display while the movement of the cursor occurs in the second region, and where movement of the cursor is displayed on the second display while the movement of the cursor occurs in the first region. FIGS. 6B-6E, for example, illustrate detecting a drag gesture with contact 5502 on the trackpad of electronic device 5002 from position 5502A to position 5502D, and in response to the drag gesture, displaying movement of cursor 5102 from a location on display 5012 (laptop computer's display) as illustrated in FIG. 6B, to another location on display 5012 as illustrated in FIG. 6C, and to locations on display 5014 (smartphone's display) as illustrated in FIGS. 6D and 6E. In the illustrated embodiment, cursor 5102 is displayed on display 5014 if the drag gesture would cause cursor 5102 to be displayed in the first region, and is displayed in the second region if the drag gesture would cause cursor 5102 to be displayed in the second region.

In some embodiments, while the cursor is displayed at the second location, the first electronic device (e.g., electronic device 5002) receives (728), via the one or more input devices, a third user input that includes a user selection of an affordance displayed in a second user interface of the second display at the second location. In some embodiments, the first electronic device, in response to detecting the third user input, displays in the second region of the first display a user interface of an application associated with the affordance and stored on the second electronic device. FIGS. 6H-6I, for example, illustrate displaying a tap gesture with contact 5502 on the trackpad of electronic device 5002 (laptop computer) while cursor 5102 is displayed in display 5014 (smartphone's display) to select a preview of image 5121A, and in response to detecting the tap gesture, displaying (or causing electronic device 5004 to display) image 5121A on display 5014. In some embodiments, electronic device 5002, in response to detecting the tap gesture, displays image 5121A in an images user interface in the second region of display 5012 (laptop computer's display). Displaying a movement of a cursor on a first display of a first electronic device while the cursor is moving within a second region of the first display allows the user to determine the current location of the cursor, thereby reducing the cognitive burden on the user and creating a more efficient human-machine interface. Causing a second electronic device that is placed over the first electronic device to display a movement of the cursor on a second display of the second electronic device while the cursor is moving within a first region of the first display allows the user to determine the current location of the cursor and also allows the user to interact with user elements displayed on the second display with the cursor, thereby reducing the cognitive burden on the user and creating a more efficient human-machine interface. Displaying, on the first display, an application associated with an affordance that is displayed on the second display in response to detecting a user input to select the affordance allows the user to view the application associated with the affordance on the first display, which has a larger screen size than the screen size of the second display. The foregoing allows user interfaces of the application to be displayed at a greater display size while displayed on the first display relative to the display size of the user interfaces of the application if the application was displayed on the second display, thereby reducing the cognitive burden on the user, and creating a more efficient human-machine interface. For battery-operated computing devices, allowing the user to determine a current location of the cursor faster and more efficiently, and utilizing a larger display to display content to allow the user to view the content more efficiently conserves power and increases the time between battery charges.

In some embodiments, the first user input includes movement in a first direction (730). In some embodiments, the first electronic device (e.g., electronic device 5002), in response to detecting the first user input, displays (730)

movement of a cursor on the first display in the first direction. FIGS. 6B-6E, for example, illustrate detecting a drag gesture with contact 5502 on the trackpad of electronic device 5002 from position 5502A to position 5502D, and in response to the drag gesture, displaying movement of cursor 5102 from a location on display 5012 (laptop computer's display) as illustrated in FIG. 6B, to another location on display 5012 as illustrated in FIG. 6C, and to locations on display 5014 (smartphone's display) as illustrated in FIGS. 6D and 6E. Displaying the movement of a cursor allows the user to determine a current location of the cursor, thereby reducing the cognitive burden on the user and creating a more efficient human-machine interface. For battery-operated computing devices, allowing the user to determine a current location of the cursor faster and more efficiently conserves power and increases the time between battery charges.

In some embodiments, the first display includes a second region and a third region that are both outside of the first region (732). In some embodiments, movement of the cursor in the first direction includes movement of the cursor from the second region, through the first region, and to the third region (732). In some embodiments, the first electronic device (e.g., electronic device 5002), in response to detecting the first user input and in accordance with a determination that movement of the cursor occurred in the second region, displays (732) movement of the cursor in the second region of the first display. In some embodiments, the first electronic device, in response to detecting the first user input and in accordance with a determination that movement of the cursor occurred in the first region, causes (732) movement of the cursor to be displayed on the second display. In some embodiments, the first electronic device, in response to detecting the first user input and in accordance with a determination that movement of the cursor occurred in the third region, displays (732) movement of the cursor on the third region of the first display. FIGS. 6B-6F, for example, illustrate detecting a drag gesture with contact 5502 on the trackpad of electronic device 5002 from position 5502A to position 5502E, and in response to the drag gesture, displaying movement of cursor 5102 from a location on display 5012 (a location in the second region of the laptop computer's display) as illustrated in FIG. 6B, through a location on display 5014 (a location on smartphone's display that is over the first region of the laptop computer's display) as illustrated in FIG. 6E, and to another location on display 5012 (a location in the third region of the laptop computer's display) as illustrated in FIG. 6F. Displaying movement of a cursor allows the user to determine a current location of the cursor, thereby reducing the cognitive burden on the user and creating a more efficient human-machine interface. Moreover, displaying a current location of the cursor on a first display of a first electronic device or causing a second electronic device that is placed over the first electronic device to display the cursor on a second display of the second electronic device based on a current location of the cursor allows the user to determine whether to interact with user elements that are displayed on the first display or user elements that are displayed on the second display, thereby reducing the cognitive burden on the user and creating a more efficient human-machine interface. For battery-operated computing devices, allowing the user to determine a current location of the cursor faster and more efficiently, and allowing the user to interact with user elements displayed on the first display or the second display more efficiently conserves power and increases the time between battery charges.

In some embodiments, the first user input is an input to move content in a first direction, and displaying the response to the first user input includes displaying movement of the content in the first direction (734). FIGS. 6N-6O, for example, illustrate displaying a drag gesture with contact 5507 on the trackpad of electronic device 5002 (laptop computer) from position 5507A to position 5507C to move the user's notes, and in response to detecting the drag gesture, displaying movement of the user's notes in the direction corresponding to the direction of the drag gesture. Displaying movement of content allows the user to determine a current region of a display that is displaying the content, thereby reducing the cognitive burden on the user and creating a more efficient human-machine interface. For battery-operated computing devices, allowing the user to determine a current region of the display that is displaying the content faster and more efficiently conserves power and increases the time between battery charges.

In some embodiments, the first display includes a second region and a third region that are both outside of the first region (736). In some embodiments, movement of the content in the first direction includes movement of the content from the second region through the first region, and to the third region (736). In some embodiments, the first electronic device (e.g., electronic device 5002), in response to detecting the first user input and in accordance with a determination that movement of the content occurred in the second region, displays (736) movement of the content in the second region of the first display. In some embodiments, the first electronic device, in response to detecting the first user input and in accordance with a determination that movement of the content occurred in the first region, causes (736) movement of the content to be displayed on the second display. In some embodiments, the first electronic device, in response to detecting the first user input and in accordance with a determination that movement of the content occurred in the third region, displays (736) movement of the content on the third region of the first display. FIGS. 6X-6Y, for example, illustrate displaying a drag gesture with contact 5516 on the trackpad of electronic device 5002 (laptop computer) from position 5516B to position 5516C to move John Doe's e-mail address from a location on display 5012 (a location in the second region of display 5012) as illustrated in FIG. 6X to a location on display 5014 (a location on smartphone's display that is over the first region of the laptop computer's display) as shown in FIG. 6Y, and in response to detecting the drag gesture, displaying movement of John Doe's e-mail address from the location illustrated in FIG. 6X to the location illustrated in FIG. 6Y. In some embodiments, the user continues performing the drag gesture illustrated in FIGS. 6X-6Y to move John Doe's e-mail address across display 5014 and to the other side of display 5012 (e.g., the third region). In such embodiments, electronic device 5002, in response to detecting the continuation of the drag gesture, displays (or instructs electronic device 5004 (smartphone) to display) movement of John Doe's e-mail address from the location illustrated in FIG. 6Y, across display 5014, and to the other side of display 5012. Displaying movement of content allows the user to determine a current region of a display that is displaying the content, thereby reducing the cognitive burden on the user and creating a more efficient human-machine interface. For battery-operated computing devices, allowing the user to determine a current location of the content faster and more efficiently conserves power and increases the time between battery charges.

In some embodiments, the first user input is a user input to select content (738). In some embodiments, the first electronic device (e.g., electronic device 5002) concurrently displays (738) the content on the first display and causes the content to be displayed on the second display in response to detecting the first user input. FIG. 6M, for example, illustrates detecting a tap gesture with contact 5604 on the trackpad of electronic device 5002 to select notes affordance 5122A, and in response to detecting the tap gesture, displaying the user's notes on a trip to Australia in notes user interface 5322. In some embodiments, electronic device 5002, in response to detecting the tap gesture illustrated in FIG. 6M, also causes electronic device 5004 to display the user's notes, such as in notes user interface 5322 as illustrated in FIG. 6O. Concurrently displaying content on a first display of a first electronic device and causing a second electronic device that is placed over the first electronic device to display the content on a second display of the second electronic device allows the user to view the content on either display, thereby reducing the cognitive burden on the user and creating a more efficient human-machine interface. For battery-operated computer devices, allowing the user to view content faster and more efficiently conserves power and increases the time between battery charges.

In some embodiments, an input device of the one or more input devices (of the first electronic device) is a keyboard (740). In some embodiments, the first user input is a user input to edit content of the first electronic device (e.g., electronic device 5002) (740). In some embodiments, the first electronic device receives (740) a second user input with the keyboard to edit the content while focus was directed to the second electronic device, where receiving the second user input includes receiving the second user input via the keyboard. In some embodiments, the first electronic device, in response to receiving the second user input, causes (740) edited content to be displayed on the second display. FIGS. 6U-6V, for example, illustrate detecting tap gestures 5607-5611 on the keyboard of device 5002, and in response to detecting the tap gestures, displaying "Happy Birthday!!!" in the subject field and "Happy Birthday John!!!" in the content field of e-mail user interface 5229, which is displayed on display 5014 (smartphone's display). In some embodiments, the user optionally performs tap gestures on the keyboard to edit the content of the e-mail. Allowing the user to edit content by entering inputs via a keyboard of a first electronic device if focus is directed to the first electronic device allows the user to use a widely available input device (keyboard) to edit content, thereby reducing the cognitive burden on the user and creating a more efficient human-machine interface. Further, while focus is on a second electronic device that is placed over the first electronic device, allowing the user to edit content displayed on a second display of the second electronic device by entering inputs via the keyboard also reduces the cognitive burden on the user and creates a more efficient human-machine interface. For battery-operated computer devices, allowing the user to edit content and view the edited content faster and more efficiently conserves power and increases the time between battery charges.

In some embodiments, the first user input is an input to display content (742). In some embodiments, the first electronic device (e.g., electronic device 5002), in response to detecting the first user input and in accordance with the determination that the first user input occurred while focus was directed to the first electronic device, displays (742) the content on the first display. In some embodiments, the first electronic device, in response to detecting the first user input and in accordance with the determination that the first user input occurred while focus was directed to the second electronic device (e.g., electronic device 5004), causes (742) the content to be displayed on the second display, where dimensions of the content displayed on the second display is less than dimensions of the content displayed on the first display. In the embodiment of FIG. 6J, the user's focus is indicated by the location of cursor 5102. FIG. 6J, for example, illustrates displaying image 5121A on display 5014 (smartphone's display) while cursor 5102 is displayed on display 5014. In some embodiments, image 5121A would be displayed on display 5012 (laptop computer's display) if focus is directed to electronic device 5002 (e.g., if cursor 5102 is displayed on display 5012). In one or more of such embodiments, the display size of image 5121A, if the image is displayed on display 5012, is greater than the display size of image 5121A, if the image is displayed on display 5014. Displaying content on a first display of a first electronic device or on a second display of a second electronic device based on the user's focus allows the user to view the content on the first display or on the second display without entering certain user inputs to designate where to display the content, thereby reducing the cognitive burden on the user and creating a more efficient human-machine interface. Further, increasing the display size of content if the content is displayed on a display having a larger screen size allows the user to view the content is greater detail, thereby also reducing the cognitive burden of the user. For battery-operated computer devices, allowing the user to view content faster and more efficiently conserves power and increases the time between battery charges.

In some embodiments, the first user input is an input to a request to display a user interface (744). In some embodiments, the first electronic device (e.g., electronic device 5002), in response to detecting the first user input and in accordance with the determination that the first user input occurred while focus was directed to the first electronic device, displays (744) a first user interface on the first display. In some embodiments, the first electronic device, in response to detecting the first user input and in accordance with the determination that the first user input occurred while focus was directed to the second electronic device (e.g., electronic device 5004), causes (744) a second user interface to be displayed on the second display. In some embodiments, a location of the first user interface relative to boundaries of the first display is based on a location of the second user interface relative to boundaries of the second display (744). In some embodiments, including the embodiment illustrated in FIGS. 6H-6I, focus is directed to an electronic device (e.g., electronic device 5004) if a cursor, such as cursor 5102, is displayed on a display (e.g. display 5014) of the electronic device. FIGS. 6H-6I, for example, illustrate detecting a tap gesture with contact 5602 on the trackpad of electronic device 5002, and in response to detecting the tap gesture while cursor 5102 is displayed over a preview of image 5121A, displaying image 5121A in images user interface 5220, which is displayed on display 5014 (smartphone's display). In some embodiments, where the user performed a similar tap gesture while cursor 5102 is displayed on display 5012 (e.g., over the location of image affordance 5120A, which is displayed on device 5002 in the embodiment of FIG. 6H), image 5121A would be displayed in an images user interface that is displayed on display 5012 (laptop computer's display). In some embodiments, the location of the images user interface that is displayed on display 5012 relative to the boundaries of display 5012 is based on the location of the images user interface (e.g., images user interface 5220 of FIGS. 6H-6M) that is displayed on display 5014 relative to the boundaries of display 5014. Displaying a first user interface on a first display of a first electronic device or displaying a second user interface on a second display of a second electronic device based on the user's focus allows the user to view the first user interface or the second user interface on the first display or on the second display without entering certain user inputs to designate where to display the first user interface or the second user interface, thereby reducing the cognitive burden on the user and creating a more efficient human-machine interface. Further, displaying the first user interface or the second user interface at similar locations relative to the boundaries of the first display or the second display, respectively, allows the user to view the first and the second user interfaces in corresponding regions of the first display and the second display, thereby also reducing the cognitive burden on the user and creating a more efficient human-machine interface. For battery-operated computer devices, allowing the user to view user interfaces faster and more efficiently conserves power and increases the time between battery charges.

The particular order in which the operations in FIGS. 7A-7F have been described is merely exemplary and is not intended to indicate that the described order is the only order in which the operations could be performed. One of ordinary skill in the art would recognize various ways to reorder the operations described herein. Additionally, details of the processes described above with respect to method 700 (e.g., FIGS. 7A-7F) are also applicable in an analogous manner to the methods described below. For example, method 900 optionally includes one or more of the characteristics of the various methods described above with reference to method 700. For example, the methods for engaging in cross device interactions described above with reference to 700 are optionally used by method 900 for interacting with content and user interface elements displayed on a display of an electronic device when the electronic device is placed over a display of another electronic device and when the electronic device is removed from the display of the other electronic device. For brevity, these details are not repeated below.

FIGS. 8A-8L illustrate exemplary user interfaces for interacting with content and user interface elements displayed on a display of an electronic device when the electronic device is placed over a display of another electronic device and when the electronic device is removed from the display of the other electronic device in accordance with some embodiments. The user interfaces in these figures are used to illustrate the processes described below, including the processes in FIGS. 9A-9D. More particularly, FIGS. 8A-8L illustrate electronic device 5004 (smartphone) sometimes placed over a region of display 5012 (laptop computer's display) of electronic device 5002 (laptop computer). While electronic device 5004 is placed over display 5012, the user interacts with input devices of electronic device 5002, and responses to input devices are optionally displayed on display 5014 (smartphone's display). The user optionally removes electronic device 5004 from display 5012. While electronic device 5004 is removed from display 5012, a content creation user interface (defined below) is displayed on display 5014. The user optionally interacts with the content creation user interface to enter user inputs and to interact with content that is displayed on display 5014. In the illustrated embodiments of FIGS. 8A-8L, electronic device 5002 is a laptop computer and electronic device 5004 is a smartphone. Electronic devices 5002 and 5004 are optionally any of device 100, 300, or 500 illustrated in FIG. 1, 3, or 5A. In the illustrated embodiments FIGS. 8A-8L, display 5012 is a display of electronic device 5002, and display 5014 is a display of electronic device 5004. Displays 5012 and 5014 represent displays that are similar or identical to display 112 of device 100, 300, or 500. Although some of the examples that follow will be given with reference to inputs on a touch-screen display (where the touch-sensitive surface and the display are combined) such as touch-sensitive display 5014, in some embodiments, the device detects inputs on a touch-sensitive surface 451 that is separate from the display 450, as shown in FIG. 4B. In other embodiments, the processes described herein may be implemented with devices having physical user-interfaces, voice interfaces, or other suitable interfaces. For convenience of explanation, the embodiments described below will be discussed with reference to operations performed on a device with a touch-sensitive display system 5012 or 5014. In such embodiments, a focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 5012 or 5014. However, analogous operations are, optionally, performed on a device with a display 450 and a separate touch-sensitive surface 451 in response to detecting the contacts on the touch-sensitive surface 451 while displaying the user interfaces discussed below, along with a focus selector.

Figure 8A:
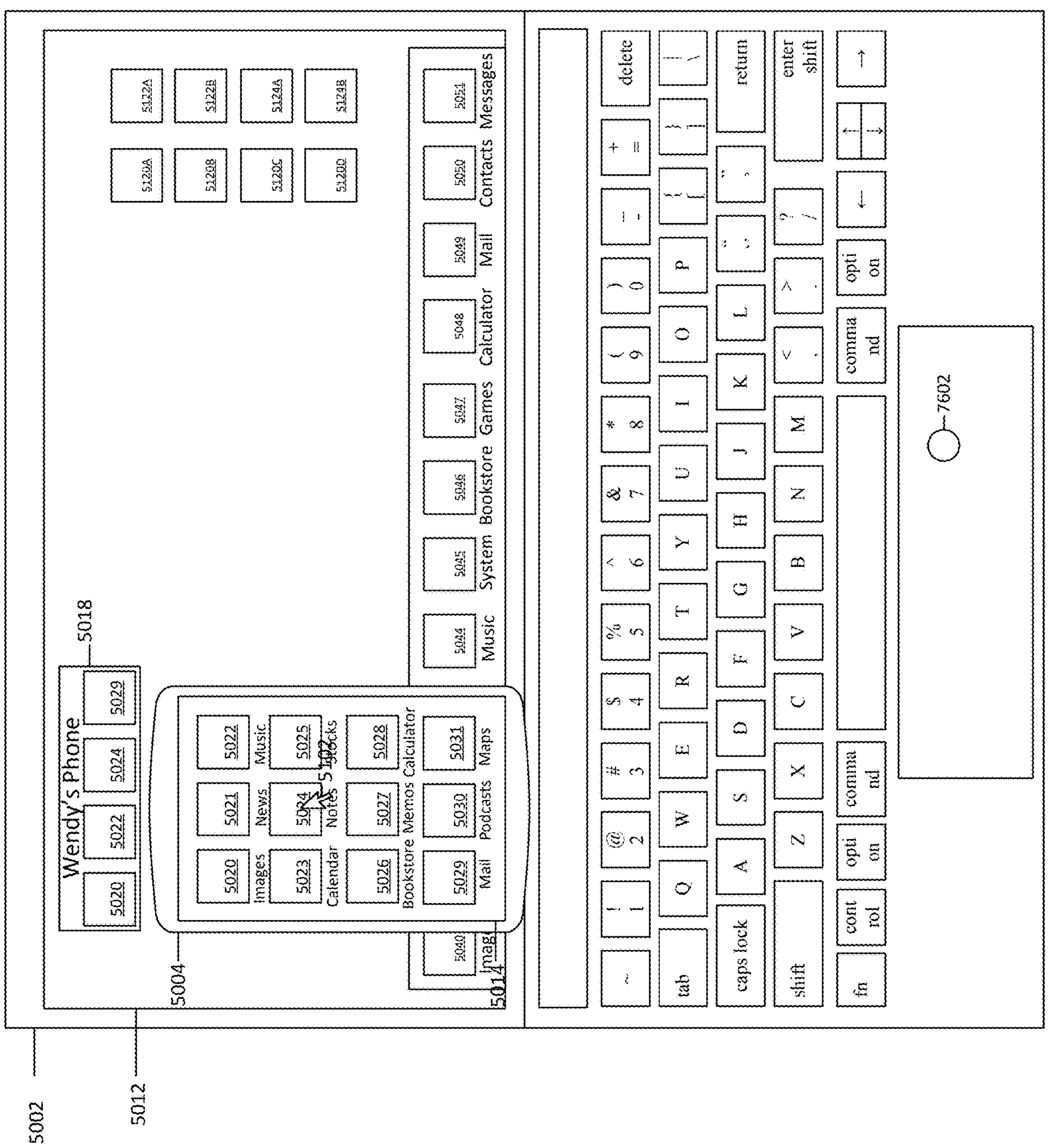
FIGS. 8A-8L illustrate exemplary user interfaces for interacting with content and user interface elements displayed on a display of an electronic device when the electronic device is placed over a display of another electronic device and when the electronic device is removed from the display of the other electronic device in accordance with some embodiments.

FIG. 8A illustrates electronic device 5004 (smartphone) placed over a region of display 5012 (laptop computer's display) of electronic device 5002 (laptop computer). In the illustrated embodiment of FIG. 8A, application affordances 5020-5031 and 5040-5051 are displayed on displays 5014 (smartphone's display) and 5012, respectively. Further, content affordances 5120A-5120D, 5122A-5122B, and 5124A-5124B are also displayed on display 5012. Further, toolbar 5018 containing images affordance 5020, music affordance 5022, notes affordance 5024, and e-mail affordance 5029 is displayed in a region of display 5012 that is near a region of display 5012 that is covered by electronic device 5004. While electronic device 5004 is placed over electronic device 5002, the user optionally enters inputs via one or more input devices of electronic device 5002 (e.g., the trackpad of electronic device 5002, the keyboard of electronic device 5002, a mouse communicatively connected to electronic device 5002 (not shown), etc.). In one or more embodiments, electronic device 5002, after detecting the user's inputs, provides data indicative of the user's inputs to electronic device 5004. In some embodiments, electronic device 5004 is communicatively connected to the input devices of electronic device 5002. In one or more of such embodiments, electronic device 5004 detects the user's inputs through the input devices of electronic device 5002 that are communicatively connected to electronic device 5004. In some embodiments, electronic device 5004, in response to receiving (or detecting) the user's inputs, also determines where to display a response to the user's inputs. For example, if the user's input is to select an application affordance (e.g., news affordance 5021) that is displayed on display 5014 while focus is directed to electronic device 5004 (e.g., a cursor such as cursor 5102 of FIG. 8A is displayed on display 5014), then electronic device 5004, in response to receiving (or detecting the input), displays a news user interface on display 5014. In some embodiments, where the user enters an input while focus is directed to electronic device 5002, electronic device 5004, in response to receiving (or detecting) the gesture, requests electronic device 5002 to display the response to the user input on display 5012. Although the descriptions of FIGS. 8A-8L describe operations performed by electronic device 5004 (e.g., to display movement of cursor 5102 on display 5014, to request electronic device 5002 to display movement of cursor 5102 on display 5012, etc.), in one or more embodiments, the operations are optionally performed by electronic device 5002 (e.g., to display movement of cursor 5102 on display 5012, to request electronic device 5004 to display movement of cursor 5102 on display 5014, etc.), or are concurrently performed by electronic device 5002 and electronic device 5004.

Figure 8B:
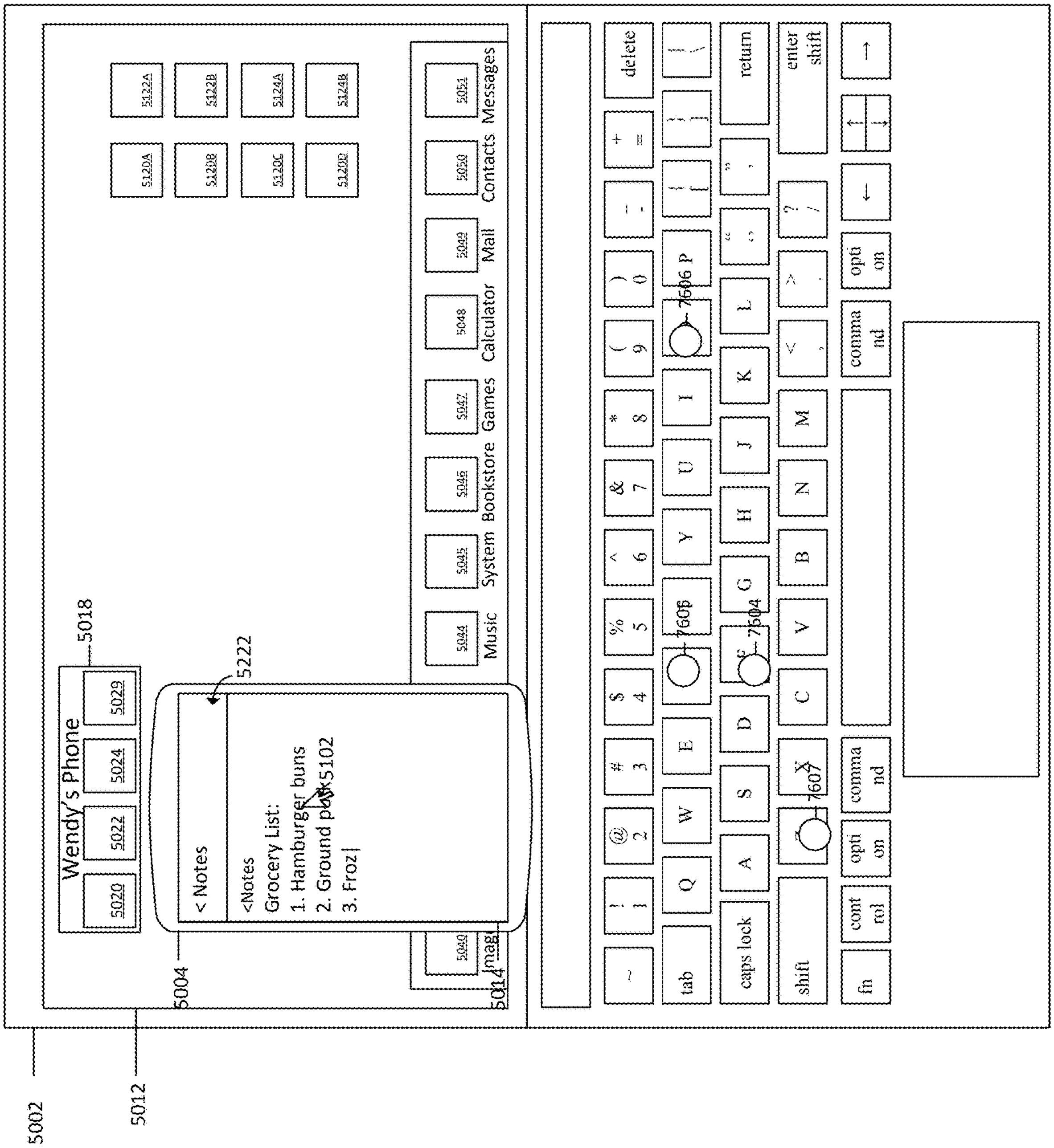

FIGS. 8A-8B illustrate detecting a tap gesture with contact 7602 on the trackpad of electronic device 5002 (laptop computer), and in response to detecting the tap gesture while cursor 5102 is displayed over notes affordance 5024, which is displayed on display 5014 (smartphone's display), displaying the user's grocery list on notes user interface 5222, which is displayed on display 5014. In some embodiments, while electronic device 5004 is placed over display 5012, a third electronic device (not shown) having a third display is also placed over display 5012. In one or more of such embodiments, electronic device 5004, in response to receiving the user's tap gesture shown in FIG. 8A to display the user's grocery list, determines whether the user's focus is on electronic device 5002, electronic device 5004, or the third electronic device. More particularly, electronic device 5004 displays the user's grocery list on display 5014 if focus is on electronic device 5004. Alternatively, electronic device 5004, upon determining that the user's focus is on electronic device 5002 or the third electronic device, instructs the respective electronic device to display the user's grocery list on the display of the respective electronic device.

In the embodiment of FIG. 8B, the user's grocery list at the time the gesture illustrated in FIG. 8A was performed included hamburger buns and ground pork. FIG. 8B also illustrates detecting tap gestures with contacts 7604-7607 on the keyboard of electronic device 5002, and in response to detecting the tap gestures while cursor 5102 is displayed on display 5014, displaying a partially typed third item that includes "Froz" in notes user interface 5222. The user optionally performs other user inputs via the keyboard of electronic device 5002. Electronic device 5004, in response to receiving (or detecting) the user's inputs to update the user's grocery list while cursor 5102 is displayed on display 5014, updates the user's grocery list and displays the updated grocery list on display 5014. In some embodiments, electronic device 5004, in response to detecting the tap gesture illustrated in FIG. 8A, instructs electronic device 5002 to display the user's grocery list on display 5012. In one or more embodiments, electronic device 5004, in response to detecting the tap gesture illustrated in FIG. 8A, displays the user's grocery list on display 5014, and instructs electronic device 5002 to concurrently display the user's grocery list on display 5012.

In some embodiments, the user, after placing an electronic device (e.g., electronic device 5004, the smartphone) over a display (e.g., display 5012, the laptop computer's display) of another electronic device (e.g., electronic device 5002, the laptop computer), subsequently removes the electronic device from the display of the other electronic device. In one or more embodiments, an electronic device (e.g., electronic device 5004) is not communicatively connected to the input devices of the other electronic device (e.g., electronic device 5002) or does not receive user inputs entered through the input devices of the other electronic device if the electronic device is not placed over the display of the other electronic device. In one or more embodiments, an electronic device, after detecting that it has been removed from the display of another electronic device (e.g., electronic device 5002), displays a content creation user interface on its display (e.g., display 5014, smartphone's display) to allow the user to enter additional user inputs while the electronic device is no longer placed on the display of the other electronic device. As used herein, a content creation user interface refers to any user interface that allows the user to enter one or more user inputs through the content creation user interface. In the embodiments illustrated in FIGS. 8C-8E, the content creation user interface is a soft keyboard 5016 that is displayed on display 5014. In one or more embodiments, another suitable content creation user interface is displayed on display 5014 to allow the user to enter user inputs through the content creation user interface if the electronic device is not placed on the display of the other electronic device.

Figure 8C:
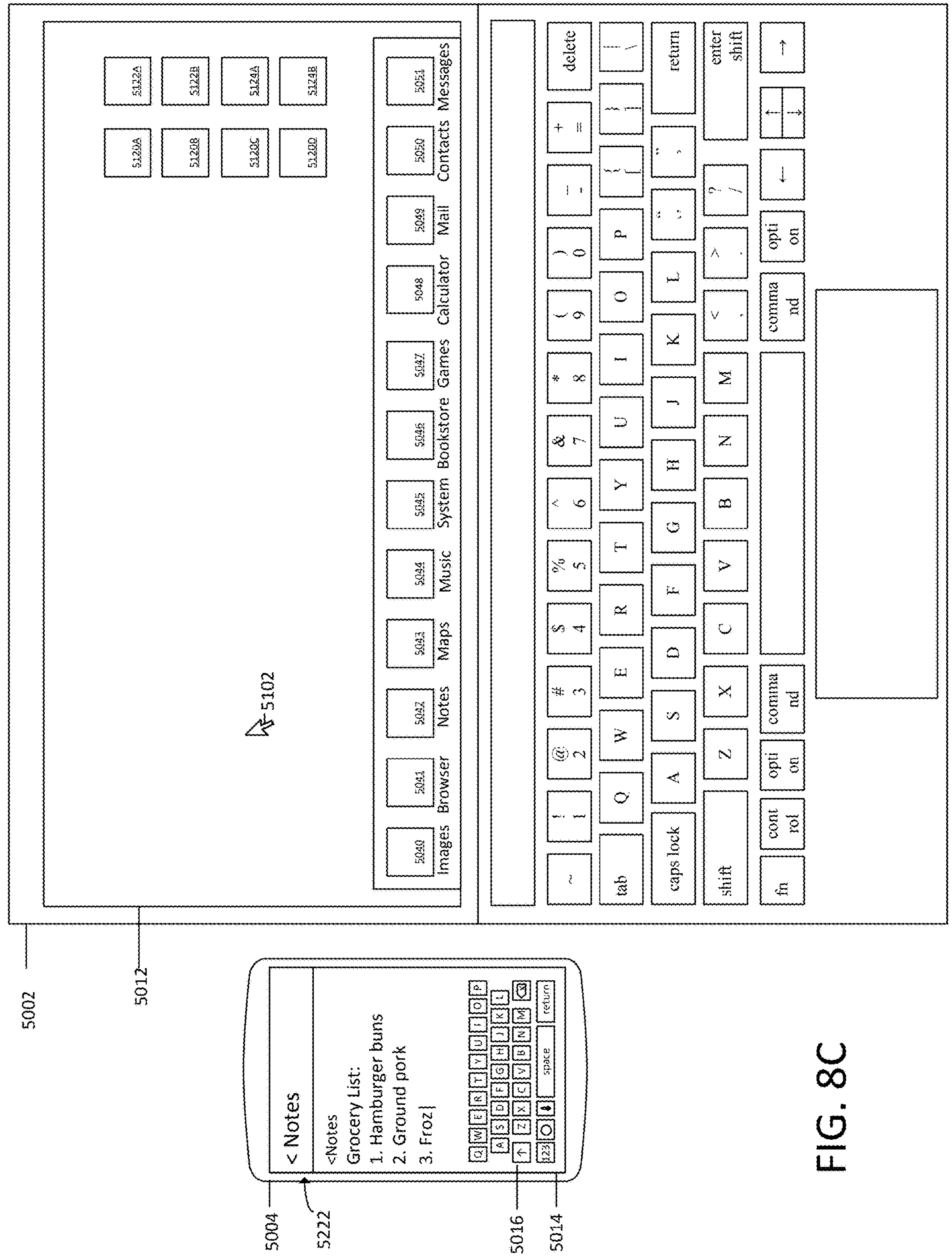
Figure 8D:
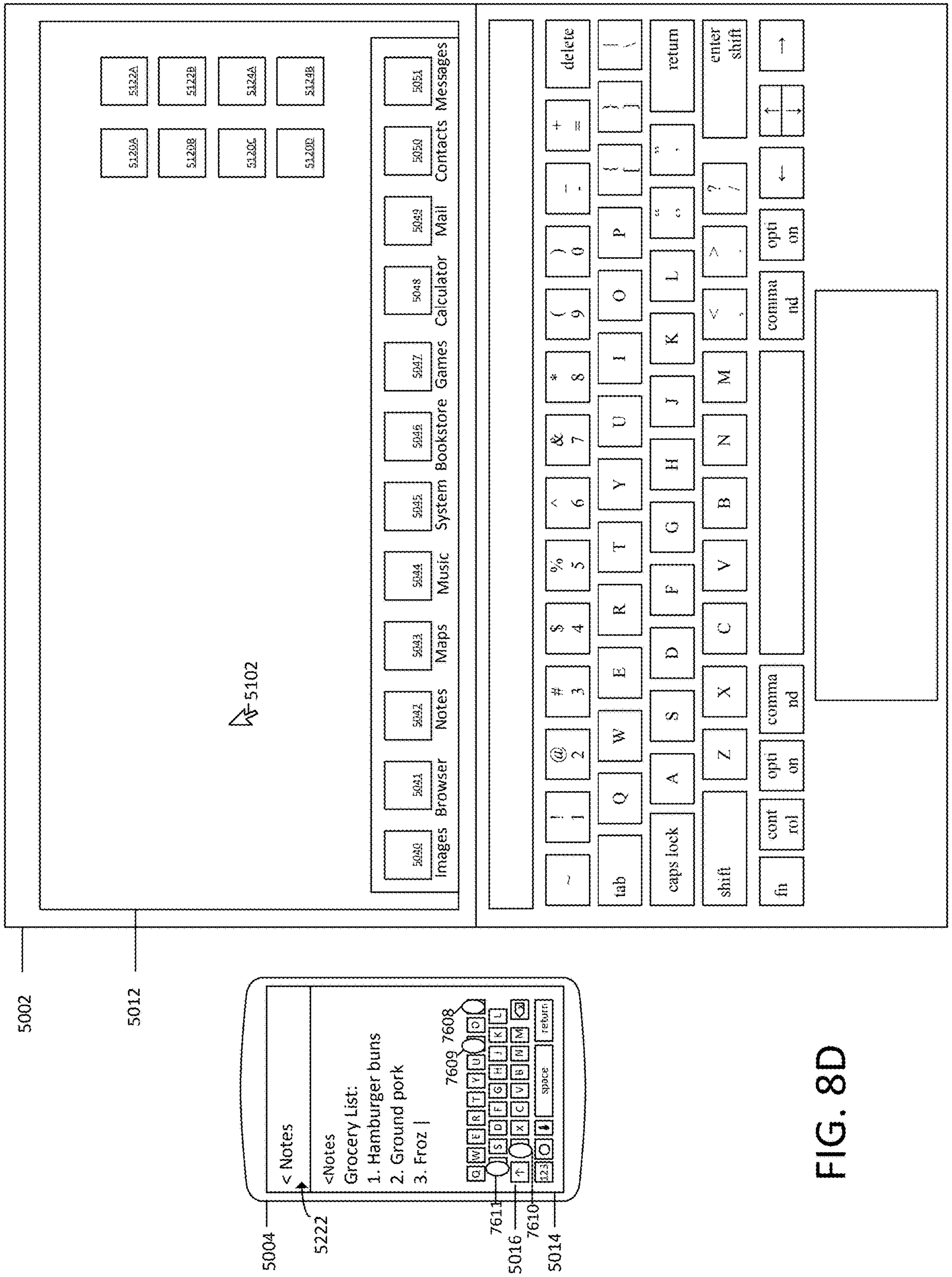
Figure 8E:
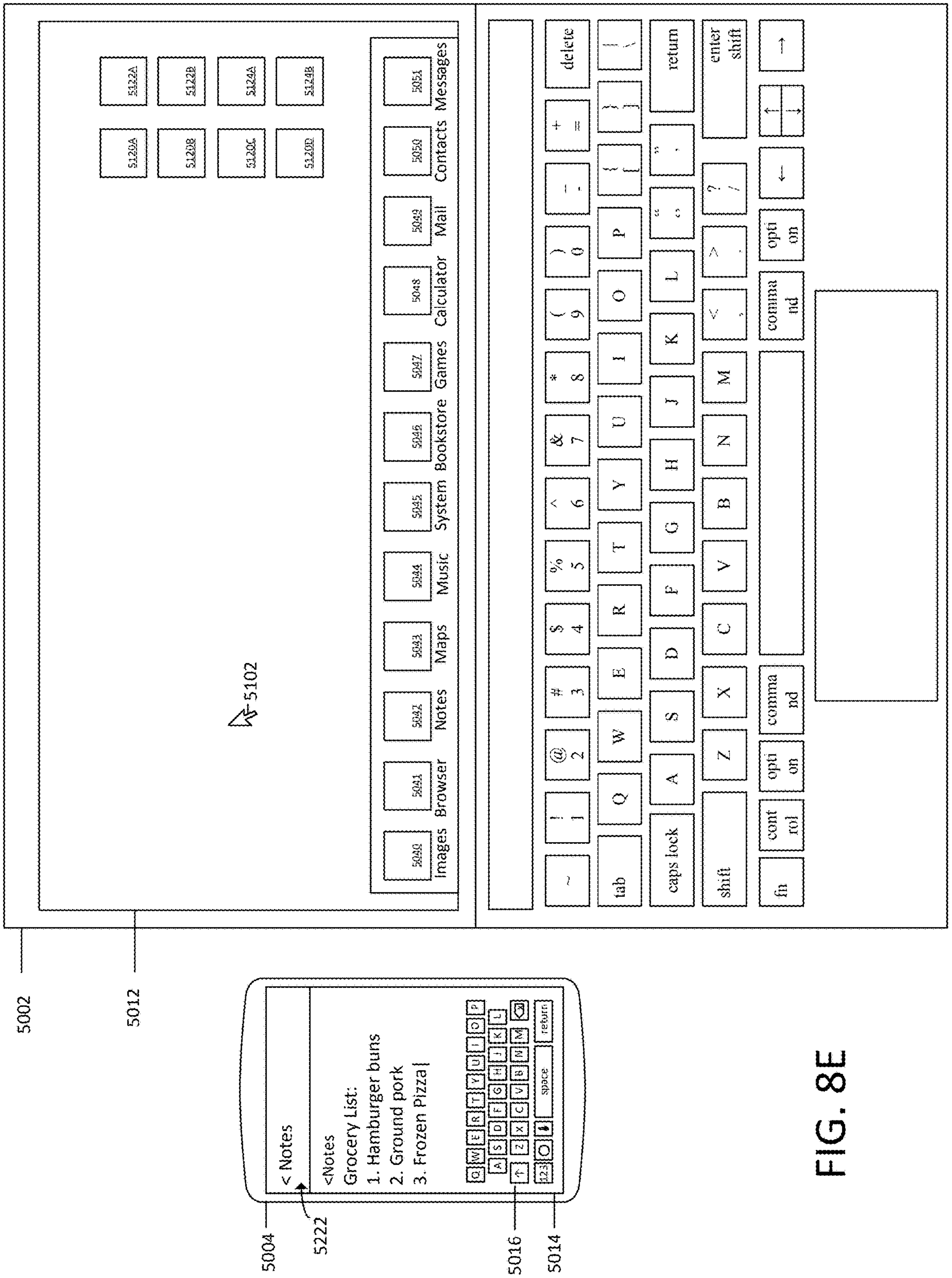

FIG. 8C is a continuation of FIG. 8B and illustrates electronic device 5004 (smartphone) placed side-by-side with electronic device 5002 (laptop computer) after electronic device 5004 is removed from display 5012 (laptop computer's display). In the illustrated embodiment of FIG. 8C, soft keyboard 5016 is displayed on display 5014 if electronic device 5004 is not placed over display 5012 (laptop computer's display) of electronic device 5004. Soft keyboard 5016 allows the user to enter user inputs in lieu of using input devices of device 5002 (e.g., keyboard, trackpad, etc.) to enter the user inputs. The user optionally interacts with soft keyboard 5016 to update the user's grocery list, or to enter other user inputs via soft keyboard 5016. In that regard, FIGS. 8D-8E illustrate detecting tap gestures with contacts 7608-7611 on soft keyboard 5016, and in response to detecting the tap gestures, displaying an updated grocery list that also includes "frozen pizza." In some embodiments, where the user's grocery list was displayed on display 5012 while electronic device 5004 was placed over display 5012, electronic device 5004, after determining that it has been removed from display 5012, displays the user's grocery list on display 5014. In one or more embodiments, electronic device 5004 displays an indication that the user's grocery list was previously displayed on display 5012. In one or more embodiments, electronic device 5004 also instructs electronic device 5002 to display an indication that the user's grocery list was previously displayed on display 5012. In one or more embodiments, where the user's grocery list was displayed on display 5012 while electronic device 5004 was placed over display 5012, electronic device 5004, after determining that it is no longer placed over display 5012, instructs electronic device 5002 to maintain display of the user's grocery list that was previously displayed on display 5012. In some embodiments, while electronic device 5004 is placed over display 5012, a third electronic device (not shown) having a third display is also placed over display 5012. In one or more of such embodiments, electronic device 5004, in response to receiving the user's tap gestures shown in FIG. 8B, updates the user's grocery list, and determines whether the user's focus is on electronic device 5002, electronic device 5004, or the third electronic device. Electronic device 5004 then displays the updated grocery list on display 5014 if focus is on electronic device 5004. Alternatively, electronic device 5004, upon determining that the user's focus is on electronic device 5002 or the third electronic device, instructs the respective electronic device to display the updated grocery list on the display of the respective electronic device. In one or more embodiments, electronic device 5004 displays the updated grocery list on display 5014 and instructs electronic device 5002 and the third electronic device to concurrently display the updated grocery list on respective displays of electronic device 5002 and the third electronic device.

Figure 8F:
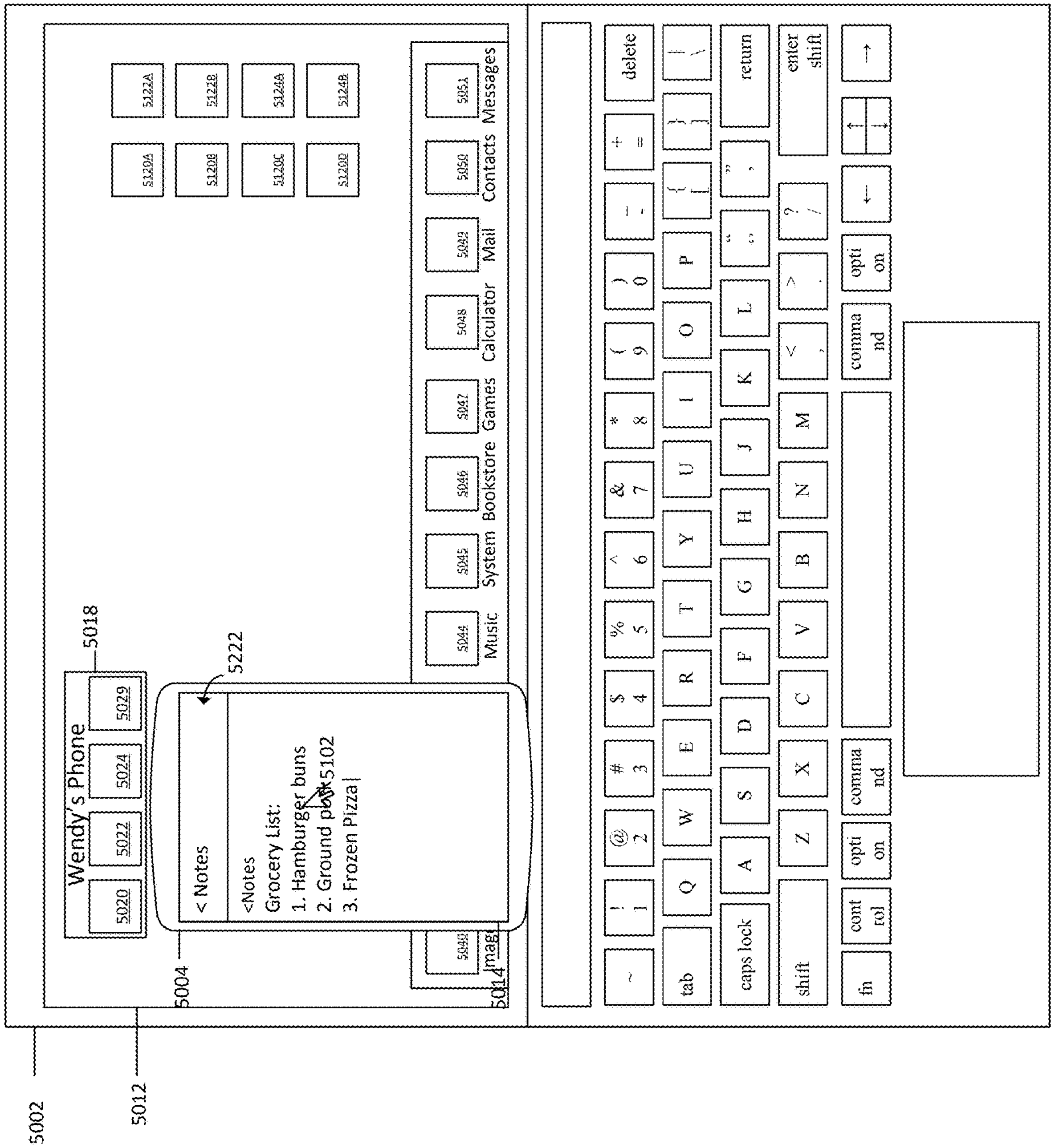

In some embodiments, the user, after removing an electronic device (e.g., electronic device 5004, the smartphone) from a display (e.g., display 5012, the laptop computer's display) of another electronic device (e.g., electronic device 5002, the laptop computer), places the electronic device back on the display of the other electronic device. In one or more embodiments, a content creation user interface (e.g., a soft keyboard), which was displayed on the display (e.g., display 5014, the smartphone's display) of the electronic device while the electronic device was removed from the display of the other electronic device, is removed from the display of the electronic device after the electronic device is again placed over the display of the other electronic device. In that regard, FIG. 8F is a continuation of FIG. 8E and illustrates electronic device 5004 (smartphone) placed over a region of display 5012 (laptop computer's display), after electronic device 5004 was removed from display 5012. Moreover, in the illustrated embodiment, soft keyboard 5016 is no longer displayed on display 5014 (smartphone's display) after electronic device 5004 is placed over display 5012. In one or more embodiments, the user optionally enters one or more user inputs via an input device of electronic device 5002 (e.g., trackpad, keyboard, etc.) to interact with the updated grocery list.

Figure 8G:
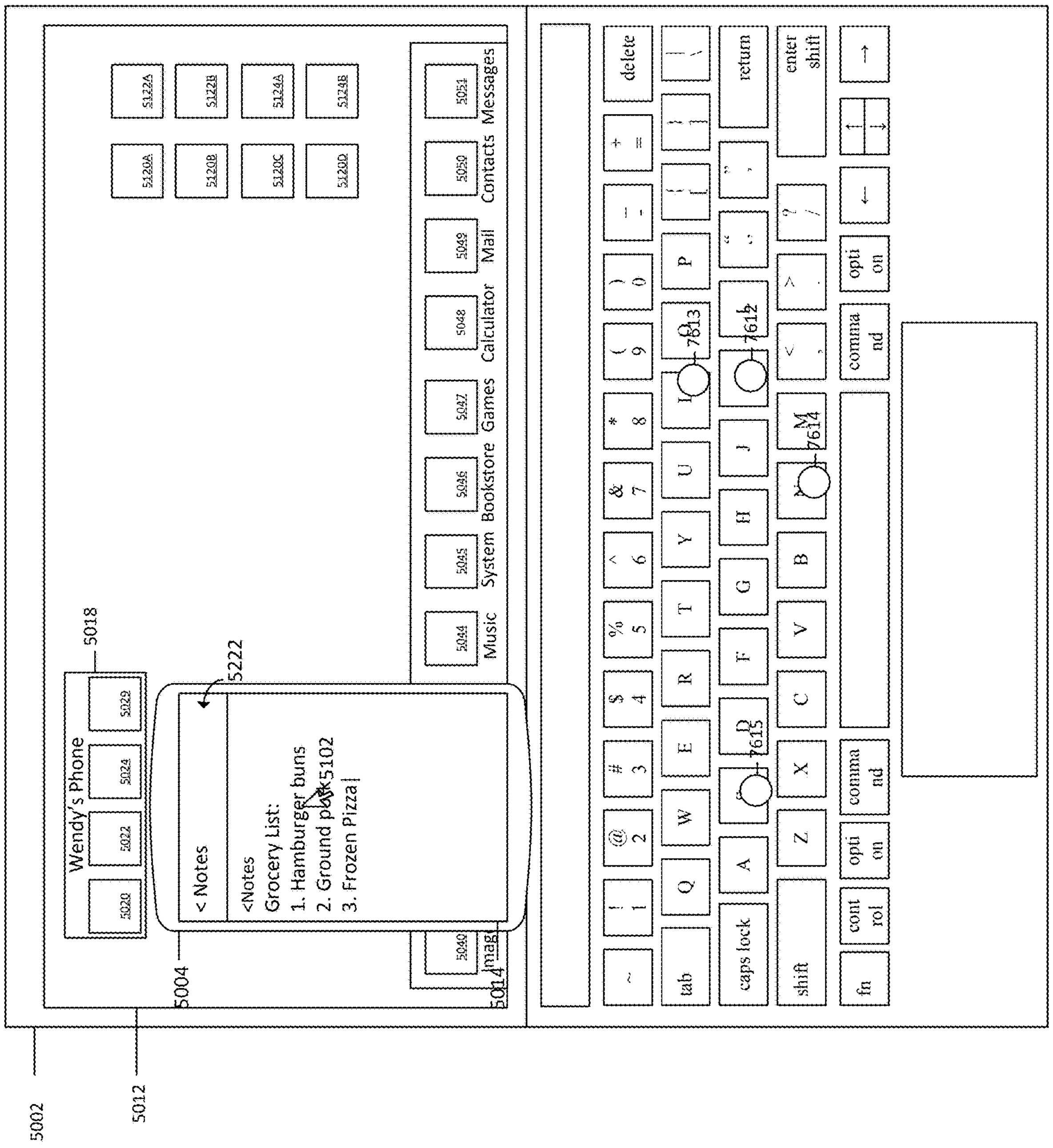
Figure 8H:
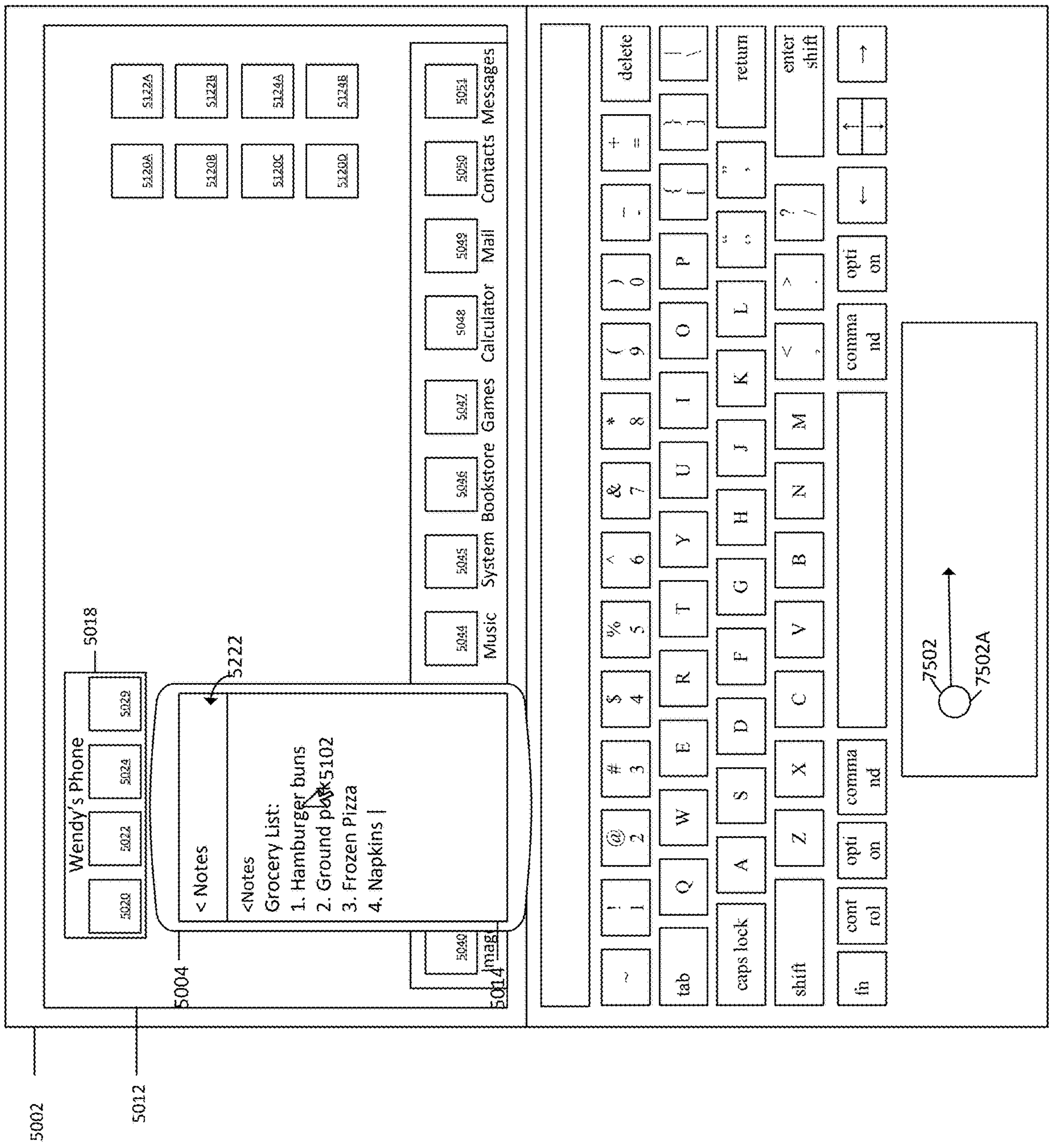

FIGS. 8G-8H illustrate detecting tap gestures with contact 7612-7615 on the keyboard of electronic device 5002 (laptop computer), and in response to detecting the tap gestures while cursor 5102 is displayed on electronic device 5004 (smartphone), updating the user's grocery list to include "napkins." In the illustrated embodiment of FIGS. 8G-8H, electronic device 5004 receives (or detects) the user's tap gestures on the keyboard of electronic device 5002 to add "napkins" to the user's grocery list. Electronic device 5004 also determines that cursor 5102 is displayed on display 5014, and determines that the user's updated grocery list should be displayed on display 5014 based on the location of cursor 5102. Electronic device 5004 then displays the updated grocery list, which also includes "napkins," on display 5014. In some embodiments, where electronic device 5004 determines that the user's updated grocery list should be displayed on display 5012 (laptop computer's display) or the display of another device (not shown), electronic device 5004 instructs electronic device 5002 or the other electronic device to display the user's updated grocery list. In some embodiments, the user optionally enters additional user inputs via the keyboard of electronic device 5002 to continue to update the user's grocery list.

Figure 8I:
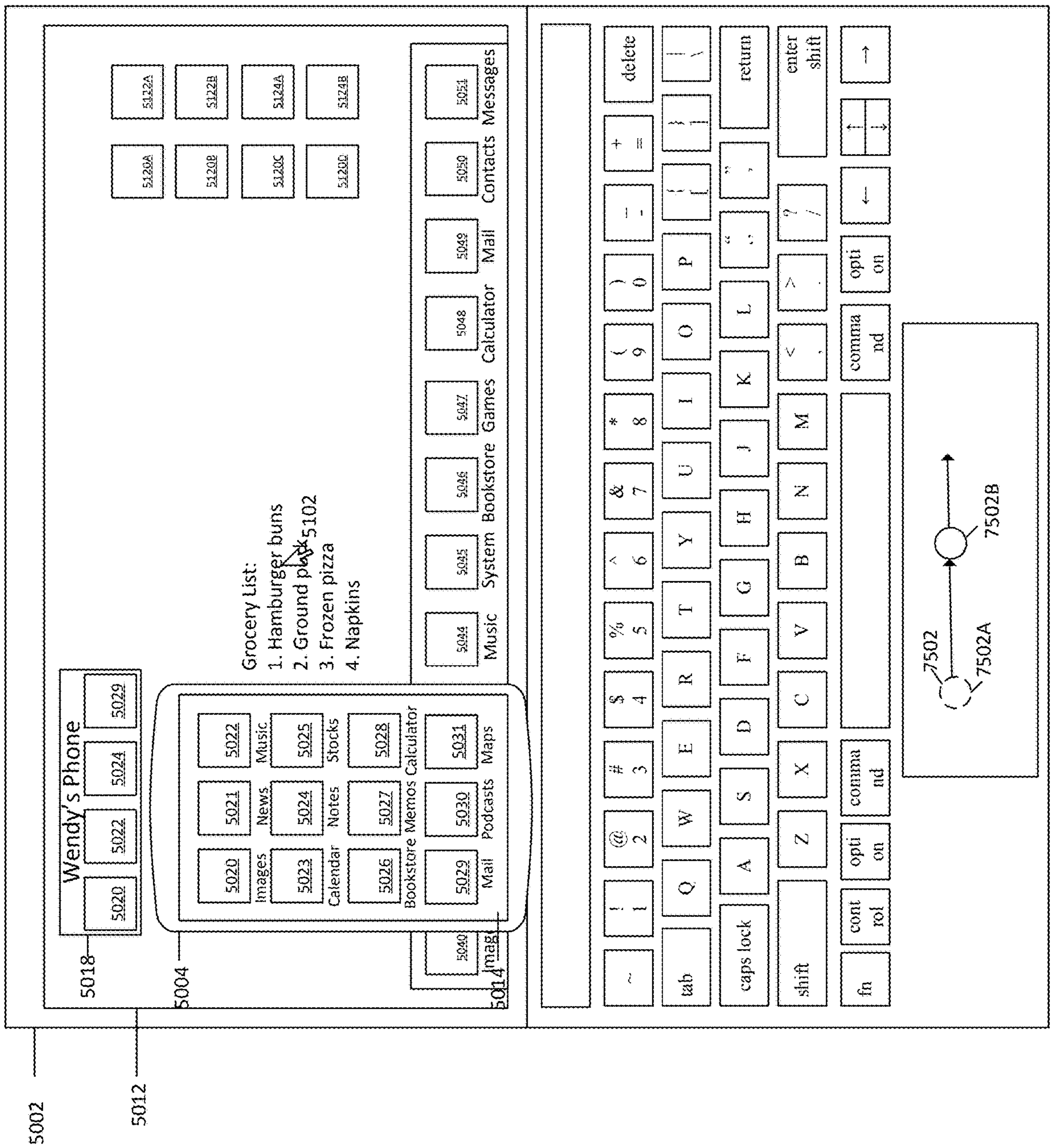

In some embodiments, the user optionally desires to view the user's grocery list on display 5012 (laptop computer's display), which has a greater screen size than the screen size of display 5014 (smartphone's display). In that regard, FIGS. 8H-8I illustrate detecting a drag gesture with contact 7502 on the trackpad of electronic device 5002 (laptop computer) from position 7502A to position 7502B, and in response to detecting the drag gesture while cursor 5102 is displayed over the user's grocery list, displaying movement of cursor 5102 and the user's grocery list from a region on display 5014 as illustrated in FIG. 8H to a region on display 5012 as illustrated in FIG. 8I. In the illustrated embodiment of FIGS. 8H-8I, the user's drag gesture causes the grocery list to be displayed on display 5012. In one or more embodiments, electronic device 5004, after receiving a user input that would cause movement of content previously displayed on display 5014 past the display boundaries of display 5014, instructs electronic device 5002 to display movement of the content on display 5012. In the illustrated embodiment of FIG. 8I, the drag gesture to move the user's grocery list (or another note that is displayed in notes user interface 5222 of FIG. 8H) also causes device 5004 to remove notes user interface 5222 from being displayed on display 5014. In some embodiments, the drag gesture performed in FIGS. 8H-8I does not cause electronic device 5004 to remove the user's grocery list from being displayed on display 5014. In one or more of such embodiments, the user's grocery list is concurrently displayed on display 5014 and display 5012.

Figure 8J:
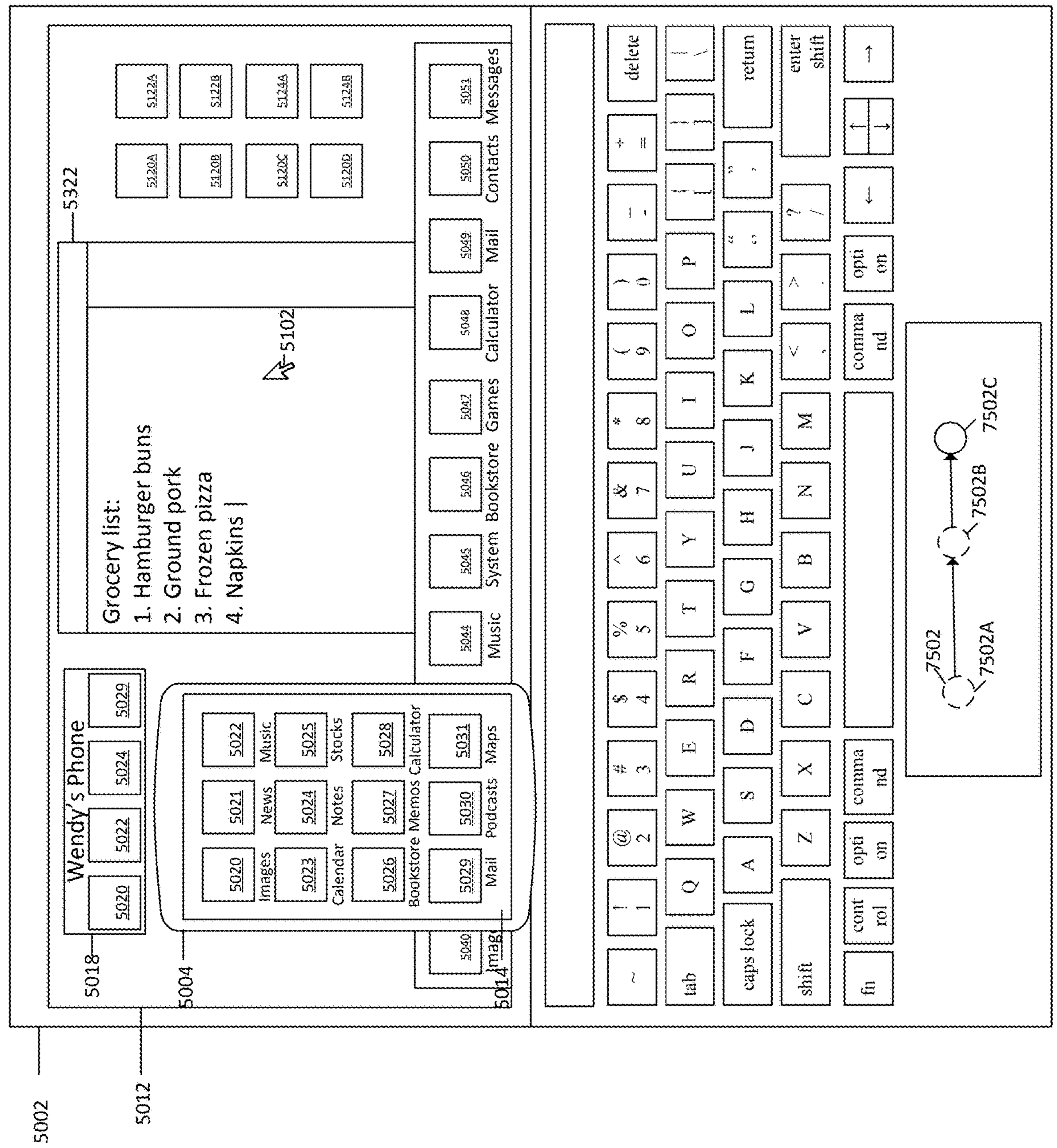

FIGS. 8I-8J illustrate a continuation of the drag gesture illustrated in FIGS. 8H-8I. More particularly, FIGS. 8I-8J illustrate detecting the drag gesture initiated in FIG. 8H with contact 7502 on the trackpad of electronic device 5002 (laptop computer) from position 7502B to position 7502C, and in response to detecting the drag gesture while cursor 5102 is displayed over the user's grocery list, displaying movement of cursor 5102 and the user's grocery list from the region of display 5012 as illustrated in FIG. 8I to another region of display 5012 as illustrated in FIG. 8J. Further, after the completion of the drag gesture, and while cursor 5102 is displayed on display 5012, electronic device 5004 instructs electronic device 5002 to display the user's grocery list on display 5012. In the illustrated embodiment of FIG. 8J, the user's grocery list is displayed in notes user interface 5322, which is a user interface of a notes application that runs on electronic device 5002.

Figure 8K:
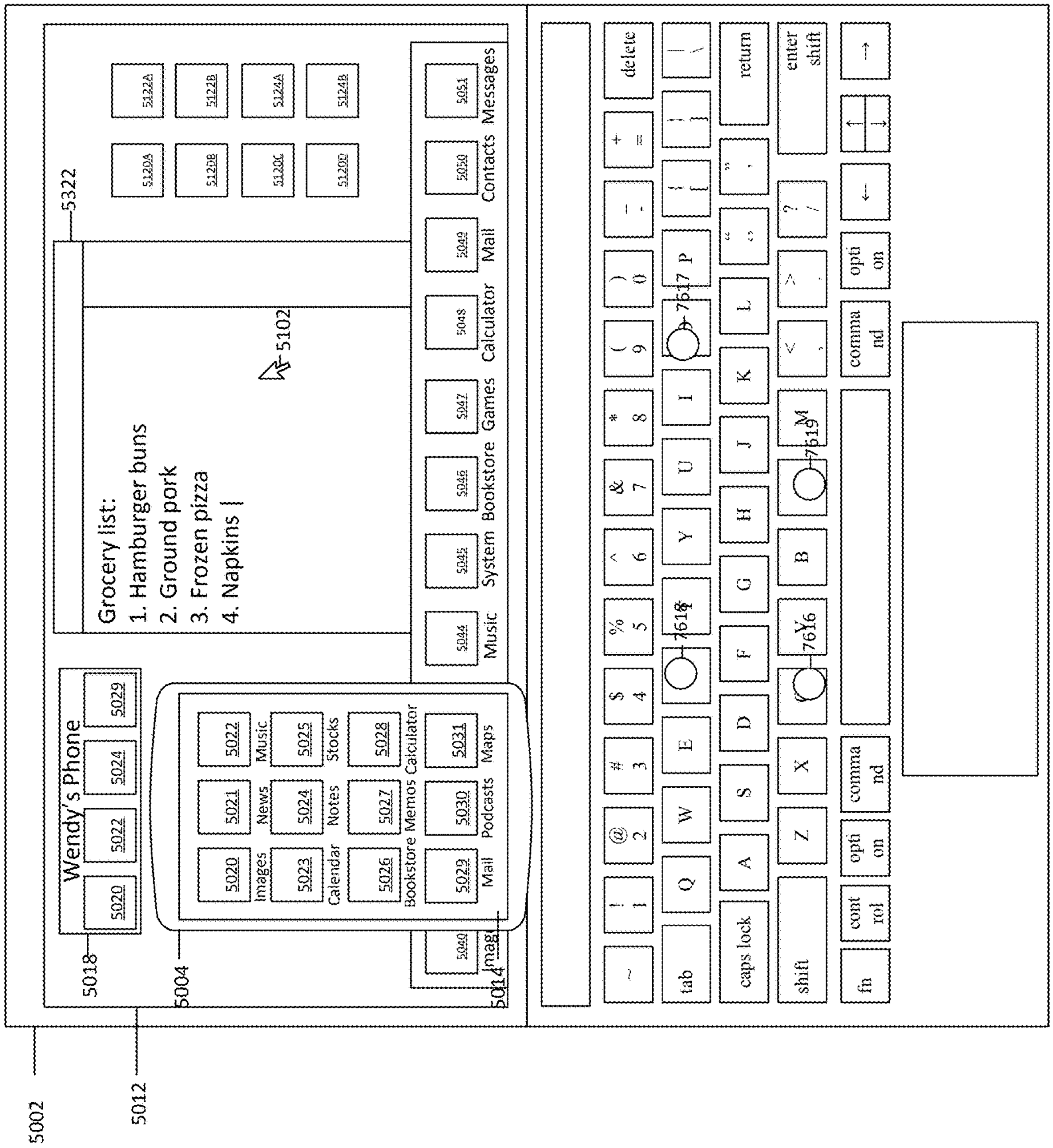
Figure 8L:
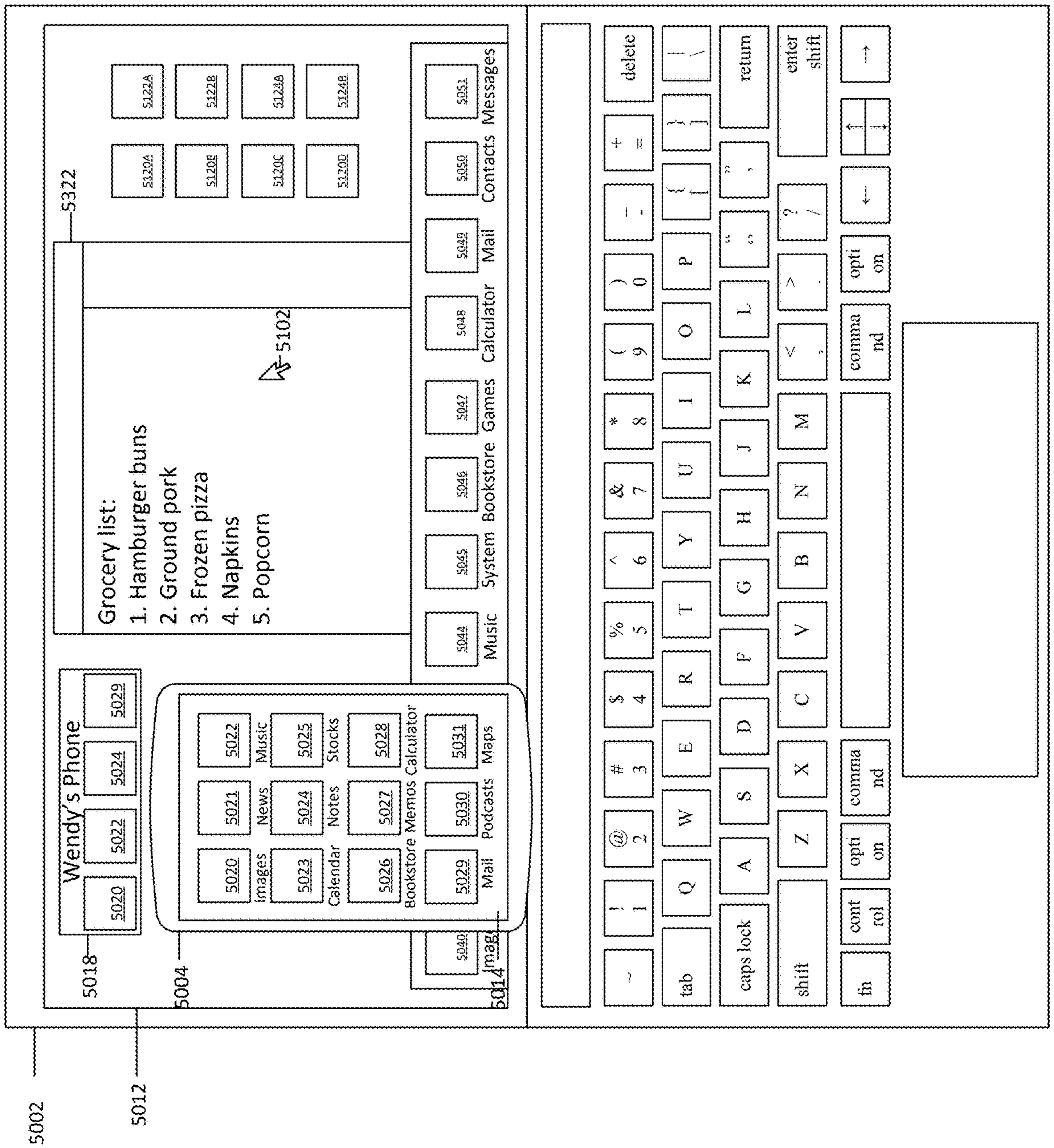
Figure 9A:
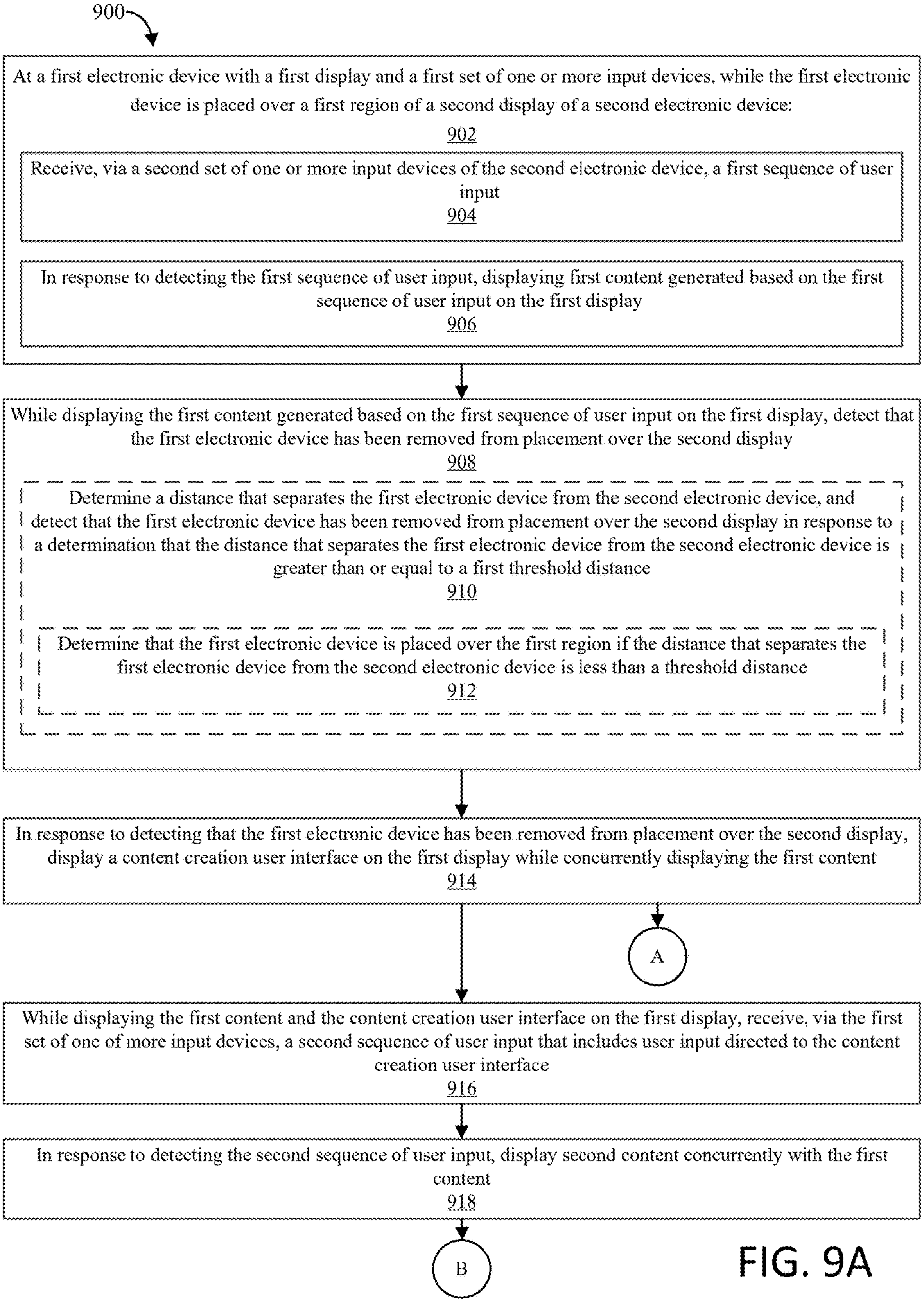
Figure 9C:
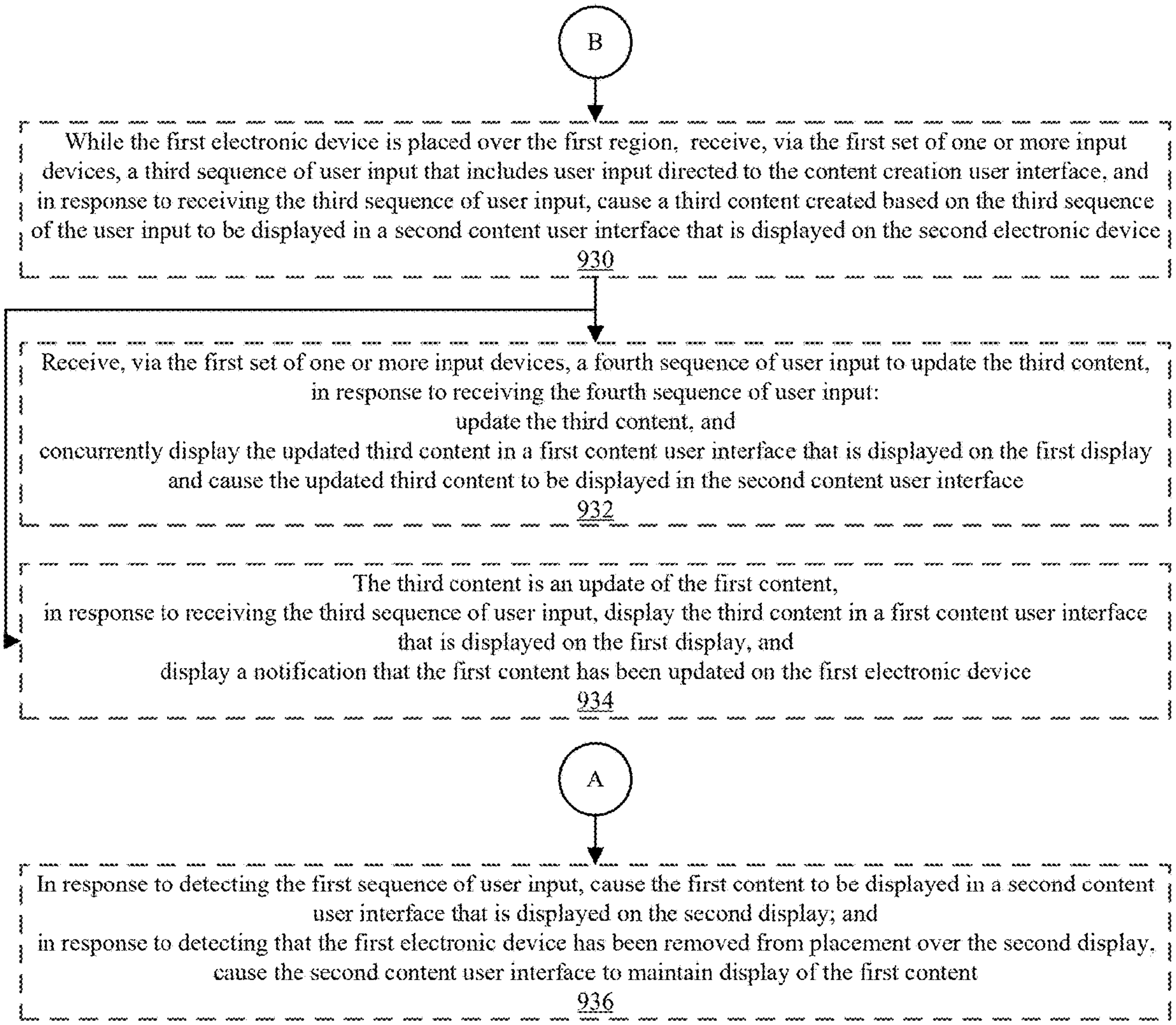

While the user's notes are displayed on display 5012, the user optionally enters additional user inputs via the keyboard or other input devices of electronic device 5002 (laptop computer) to update the user's grocery list. In that regard, FIGS. 8K-8L illustrate detecting tap gestures with contacts 7616-7619 on the keyboard of electronic device 5002, and in response to detecting the tap gestures while cursor 5102 is displayed on display 5012 (laptop computer's display), displaying an update to the user's grocery list. In the illustrated embodiment of FIG. 8L, electronic device 5004, receives (or detects) the user's tap gestures on the keyboard of electronic device 5002 to add "popcorn" to the user's grocery list. Electronic device 5004 also determines that cursor 5102 is displayed on display 5012 and determines that the user's updated grocery list should be displayed on display 5012 based on the location of cursor 5102. Electronic device 5004 then instructs electronic device 5002 to display the user's updated grocery list. In some embodiments, the user optionally enters additional user inputs via the keyboard of electronic device 5002 to continue to update the user's grocery list. In some embodiments, a content creation user interface (e.g., soft keyboard 5016 of FIG. 8C-8E) is displayed on display 5014 while electronic device 5004 is placed over display 5012. In one or more of such embodiments, the user optionally interacts with the content creation user interface that is displayed on display 5014 to update the user's grocery list. In one or more of such embodiments, where soft keyboard 5016 is displayed on display 5014, the user performs tap gestures on soft keyboard 5016 (e.g., to type "Napkins") in lieu of the keyboard of electronic device 5002 to update the user's grocery list. Electronic device 5004, in response to detecting the user's inputs, instructs electronic device 5002 to display updates to the user's grocery list in notes user interface 5322 of FIG. 8L. In some embodiments, where the user's grocery list is concurrently displayed on display 5014 and display 5012, electronic device 5004, after detecting (or receiving) user inputs to update the user's grocery list, displays the updated grocery list on display 5014 and requests electronic device 5002 to concurrently display the updated grocery list on display 5012. In some embodiments, where the user's grocery list is displayed on display 5012, electronic device 5004, after detecting (or receiving) user inputs to update the user's grocery list, instructs electronic device 5002 to concurrently display the updated grocery list and an update notification (e.g., an notification that the grocery list has been updated) on display 5012. Similarly, where the user's grocery list is displayed on display 5014, and electronic device 5004, after detecting (or receiving) user inputs to update the user's grocery list, concurrently displays the updated grocery list and an update notification on display 5014.

FIGS. 9A-9D are flow diagrams illustrating various embodiments of a method for engaging in cross device interactions. More particularly, FIGS. 9A-9D are flow diagrams illustrating a method for engaging in cross device interactions, using, for example, the user interfaces of FIGS. 8A-8L. As described in reference to FIGS. 8A-8L, method 900 can be utilized to engage in cross device interactions. Method 900 is performed at a device (e.g., electronic device 5002 or 5004, which are represented by any of device 100, 300, 500 illustrated in FIGS. 1, 3, and 5A, respectively) with a display and one or more input devices. In one of such embodiments, the display is a touch screen display and the touch-sensitive surface is on or integrated with the display. In some embodiments, the display is separate from the touch-sensitive surface. In other embodiments, the processes described herein may be implemented with devices having physical user-interfaces, voice interfaces, or other suitable interfaces. Some operations in method 900 are, optionally, combined and/or the order of some operations is, optionally, changed.

As described below, method 900 provides an intuitive way to utilize input devices of different electronic devices that are sometimes placed over each other to enter user inputs. The first electronic device of method 900 is represented by electronic device 5004 (smartphone) in the illustrated embodiments of FIGS. 8A-8L, whereas the second electronic device of method 700 is represented by electronic device 5002 (laptop computer) in the illustrated embodiments of FIGS. 8A-8L. Further, the first display of method 900 is represented by display 5014 (smartphone's display) in the illustrated embodiments of FIGS. 8L, whereas the second display of method 900 is represented by display 5012 (laptop computer's display) in the illustrated embodiments of FIGS. 8A-8L. While the first electronic device (e.g., electronic device 5004) is placed over a second electronic device (e.g., electronic device 5002), method 900 allows the user to utilize input devices of the second electronic device to interact with content displayed on the display of the first electronic device. Further, while the first electronic device is not placed over the second electronic device, method 900 allows the user to utilize input devices of the first electronic device to interact with content displayed on the display of the second electronic device. While the first electronic device is placed over the second electronic device, method 900 allows the user to enter inputs via the input devices of the second electronic device, which are sometimes more ergonomic input devices or more accessible to the user, thereby reducing the cognitive burden on the user and creating a more efficient human-machine interface. While the first electronic device is not placed over the second electronic device, method 900 allows the user to enter inputs via the inputs devices of the first electronic device, thereby also reducing the cognitive burden on the user and creating a more efficient human-machine interface. For battery-operated computing devices, enabling a user to enter user inputs faster and more efficiently conserves power and increases the time between battery charges.

A first electronic device (e.g., electronic device 5004) with a first display (e.g., display 5014) and a first set of one or more input devices, while the first electronic device is placed over a first region of a second display of a second electronic device (e.g., electronic device 5002), receives (902), via a second set of one or more input devices of the second electronic device, a first sequence of user input. FIG. 8B, for example, illustrates electronic device 5004 (smartphone) placed over a region of display 5012 (laptop computer's display) of electronic device 5002 (laptop computer). FIG. 8B also illustrates displaying tap gestures 7604-7607 over a keyboard of electronic device 5002.

The first electronic device (e.g., electronic device 5004), in response to detecting the first sequence of user input, displays (904) first content generated based on the first sequence of user input on the first display. FIG. 8B, for example, illustrates detecting tap gestures 7604-7607 with contact over the keyboard of electronic device 5002, and in response to detecting the tap gestures, displaying a grocery list including hamburger buns and ground pork in notes user interface 5222, which is displayed on display 5014 (smartphone's display).

While displaying the first content generated based on the first sequence of user input on the first display, the first electronic device (e.g., electronic device 5004) detects (906) that the first electronic device has been removed from placement over the second display. FIG. 8C, for example, illustrates electronic device 5004 (smartphone) no longer placed over display 5012 (laptop computer's display). In some embodiments, electronic device 5004 periodically determines whether it is within a threshold distance over display 5012 and determines that it is no longer placed over display 5012 if it is not within a threshold distance from display 5012.

The first electronic device (e.g., electronic device 5004), in response to detecting that the first electronic device has been removed from placement over the second display, displays (908) a content creation user interface on the first display while concurrently displaying the first content. FIG. 8C, for example, illustrates displaying content creation user interface (soft keyboard) on display 5014 (smartphone's display) after electronic device 5004 has been removed from placement over display 5012 (laptop computer).

In some embodiments, the first electronic device (e.g., electronic device 5004) determines (910) a distance that separates the first electronic device from the second electronic device. In some embodiments, the first electronic device detects that the first electronic device has been removed from placement over the second display in response to a determination that the distance that separates the first electronic device from the second electronic device is greater than or equal to a first threshold distance (910). In some embodiments, electronic device 5004 (smartphone) utilizes one or more sensors to determine its position relative to display 5012 (laptop computer's display). In one or more embodiments, electronic device 5002 (laptop computer) determines the distance between display 5012 and electronic device 5004 and provides the distance to electronic device 5004. In some embodiments, where the threshold distance is zero, or approximately zero, electronic device 5004 detects that it has been removed from placement over display 5012 if electronic device 5004 detects that it is no longer in contact with display 5012. The method allows a first electronic device to automatically determine whether the first electronic device is placed over a second electronic device based on a distance that separates the first electronic device and the second electronic device, thereby reducing the cognitive burden on the user and creating a more efficient human-machine interface. For battery-operated computer devices, allowing an electronic device to determine whether it is placed over another electronic device faster and more efficiently conserves power and increases the time between battery charges.

In some embodiments, the first electronic device (e.g., electronic device 5004) determines (912) that the first electronic device is placed over the first region if the distance that separates the first electronic device from the second electronic device is less than a threshold distance. In some embodiments, electronic device 5004 (smartphone) utilizes one or more sensors to determine its distance from display 5012 (laptop computer's display). In one or more embodiments, electronic device 5002 (laptop computer) determines the distance between display 5012 and electronic device 5004, and provides the distance to electronic device 5004. In some embodiments, where the threshold distance is zero, or approximately zero, electronic device 5004 detects that it has been placed over display 5012 if electronic device 5004 detects that it is in contact with display 5012. The method allows a first electronic device to automatically determine whether the first electronic device is placed over a second electronic device based on a distance that separates the first electronic device and the second electronic device, thereby reducing the cognitive burden on the user and creating a more efficient human-machine interface. For battery-operated computer devices, allowing an electronic device to determine whether it is placed over another electronic device faster and more efficiently conserves power and increases the time between battery charges.

In response to detecting that the first electronic device has been removed from placement over the second display, the first electronic device (e.g., electronic device 5004) displays (914) a content creation user interface on the first display while concurrently displaying the first content. FIGS. 8C, for example, illustrates displaying content creation user interface (soft keyboard 5016) concurrently with a partially typed item for "Froz," which was added to the grocery list while electronic device 5004 (smartphone) was placed over display 5012 (laptop computer's display).

While displaying the first content and the content creation user interface on the first display, the first electronic device (e.g., electronic device 5004) receives (916), via the first set of one or more input devices, a second sequence of user input that includes user input directed to the content creation user interface. FIG. 8D, for example, illustrates detecting typing gestures on content creation user interface (soft keyboard) 5016 while the user's grocery list is displayed on display 5014 (smartphone's display).

The first electronic device (e.g., electronic device 5004), in response to detecting the second sequence of user input, displays (918) second content concurrently with the first content. In the illustrated embodiment of FIG. 8D, the user's grocery list includes a first item for hamburger buns, a second item for ground pork, and a partially typed third item for "Froz." FIGS. 8D-8E, for example, illustrate detecting tap gestures with contacts 7608-7611 over content creation user interface (soft keyboard) 5016, and in response to detecting the tap gestures, displaying the completely typed third item for "frozen pizza" together with the first item and the second item.

In some embodiments, while displaying the first content on the first electronic device, and in response to detecting that the first electronic device (e.g., electronic device 5004) has been removed from placement over the second display, the first electronic device displays (920) an indicator on the first display notifying a user that the first content was previously displayed on the second display. FIGS. 8B-8C, for example, illustrate displaying the user's grocery list in notes user interface 5222, which is displayed on display 5014 (smartphone's display). In some embodiments, the user's grocery list is displayed on display 5012 (laptop computer's display) while electronic device 5004 (smartphone) is placed over display 5012. In one or more of such embodiments, the user's grocery list is displayed in a notes user interface, such as notes user interface 5222 of FIG. 8C after electronic device 5004 is removed from placement over display 5012. In one or more of such embodiments, an indication notifying the user that the user's grocery list was previously displayed on display 5012 is also displayed on display 5014. Displaying an indicator on a first display of a first electronic device that was previously placed over a second electronic device after the first electronic device has been removed from placement over the second display allows the user to determine that content currently displayed on the first electronic device was previously displayed on a second display of the second electronic device, thereby reducing the cognitive burden on the user and creating a more efficient human-machine interface. For battery-operated computer devices, allowing the user to determine where content was previously displayed faster and more efficiently conserves power and increases the time between battery charges.

In some embodiments, the content creation user interface includes a soft keyboard, and the second sequence of user input includes typing gestures on the soft keyboard (922). FIG. 8D, for example, illustrates displaying content creation user interface 5016, which is a soft keyboard. Further, FIG. 8D illustrates tap gestures with contacts 7608-7611 over keys of the soft keyboard to type the word "pizza." Displaying a soft keyboard and allowing the user to enter user inputs by typing on the soft keyboard provides the user with an efficient way to enter user inputs, thereby reducing the cognitive burden on the user and creating a more efficient human-machine interface. For battery-operated computer devices, allowing the user to enter user inputs faster and more efficiently conserves power and increases the time between battery charges.

In some embodiments, the second set of the one or more input devices includes a hardware keyboard, and the first sequence of user input includes typing on the hardware keyboard (924). FIG. 8B, for example, illustrates displaying a keyboard of electronic device 5002 (laptop computer). Further, FIG. 8B illustrates tap gestures with contacts 7604-7607 over keys of the keyboard to type "Froz." The method provides the user with an efficient way to enter user inputs via a keyboard, thereby reducing the cognitive burden on the user and creating a more efficient human-machine interface. For battery-operated computer devices, allowing the user to enter user inputs faster and more efficiently conserves power and increases the time between battery charges.

In some embodiments, the first electronic device (e.g., electronic device 5004), after detecting that the first electronic device has been removed from placement over the second display, detects (926) that the first electronic device has again been placed over the second display. In some embodiments, in response to detecting that the first electronic device has again been placed over the second display, the first electronic device removes (926) display of the content creation user interface from the first display. FIG. 8E, for example, illustrates displaying content creation user interface (soft keyboard) 5016 on display 5014 (smart phone's display) while electronic device 5004 (smartphone) is not placed over display 5012 (laptop computer's display). Further, FIGS. 8E-8F illustrate removing content creation user interface 5016 from being displayed on display 5014 after electronic device 5004 is placed over display 5012. In the illustrated embodiment of FIGS. 8E-8F, electronic device 5004 removes content creation user interface 5016 from being displayed on display 5014 after determining that electronic device 5004 has been placed over display 5012. Removing the content creation interface from being displayed on a first display of a first electronic device after detecting that the first electronic device is placed over a second electronic device provides an indication of the placement of the first electronic device, thereby reducing the cognitive burden on the user and creating a more efficient human-machine interface. For battery-operated computer devices, allowing the user to determine whether a first electronic device has been placed over a second electronic device faster and more efficiently conserves power and increases the time between battery charges.

In some embodiments, while the first electronic device is placed over the first region, the first electronic device (e.g., electronic device 5004) receives (928), via the first set of one or more input devices, a third sequence of user input that includes a user selection of an application running on the first electronic device. In some embodiments, in response to receiving the third sequence of user input, and while the first electronic device is placed over the first region, the first electronic device displays (928) a user interface of the application on the first display. FIG. 8A, for example, illustrates electronic device 5004 (smartphone) placed over a first region of display 5012 (laptop computer's display). Further, FIGS. 8A-8B illustrate detecting a tap gesture with contact 7602 on the trackpad of electronic device 5002 (laptop computer) to select notes affordance 5024, and in response to detecting the tap gesture, displaying notes user interface 5222 in display 5014 (smartphone's display). Displaying a user interface on a first display of a first electronic device after the first electronic device is placed over a second electronic device allows the user to view the user interface on the first display, thereby reducing the cognitive burden on the user and creating a more efficient human-machine interface. For battery-operated computer devices, allowing the user to view user interfaces on a display of an electronic device faster and more efficiently conserves power and increases the time between battery charges.

In some embodiments, while the first electronic device is placed over the first region, the first electronic device (e.g., electronic device 5004) receives (930), via the first set of one or more input devices, a third sequence of user input that includes user input directed to the content creation user interface. In some embodiments, in response to receiving the third sequence of user input, the first electronic device displays (930) a third content created based on the third sequence of the user input in a second content user interface that is displayed on the second electronic device (e.g., electronic device 5002). FIG. 8K, for example, illustrates displaying the user's grocery list in notes user interface 5322, which is displayed on display 5012 (laptop computer's display). Further, FIG. 8K-8L, illustrate detecting tap gestures with contacts 7616-7619 over the keyboard of electronic device 5002 (laptop computer) to type "popcorn," and in response to detecting the tap gestures, displaying "popcorn" in notes user interface 5322. In some embodiments, a content creation user interface, such as content creation user interface (soft keyboard) 5016 is displayed on display 5014 (smartphone's display) while electronic device 5004 (smartphone) is placed over display 5012. In one or more of such embodiments, the user optionally performs tap gestures over content creation user interface 5016, such as to type "popcorn," to update the user's grocery list. In one or more of such embodiments, electronic device 5004, in response to detecting the user's inputs via content creation user interface 5016, requests (or causes) electronic device 5002 to update the user's grocery list and to display the update in notes user interface 5322. While a first electronic device having a first display is placed over a second electronic device having a second display that has a larger screen size than the screen size of the first display, displaying content in a second user interface that is displayed on the second display allows the user to view the content on the display with the larger screen size. The foregoing allows the user to view the content with more case and also allows the user to view additional content on common display, thereby reducing the cognitive burden on the user and creating a more efficient human-machine interface. For battery-operated computer devices, allowing the user to view content on a larger display and to view content faster and more efficiently conserves power and increases the time between battery charges.

In some embodiments, the first electronic device (e.g., electronic device 5004) receives (932), via the first set of one or more input devices, a fourth sequence of user input to update the third content. In some embodiments, the first electronic device, in response to receiving the fourth sequence of user input, updates (932) the third content. In some embodiments, the first electronic device, in response to receiving the fourth user input, concurrently displays (932) the updated third content in a first content user interface that is displayed on the first display and causes the updated third content to be displayed in the second content user interface. Continuing with the foregoing example, in some embodiments, while electronic device 5004 (smartphone) is placed over display 5012 (laptop computer's display) an input device of electronic device 5004 (smartphone) detects additional user inputs to edit content (e.g., change "popcorn" to "popcorn kernel"). In one or more embodiments, electronic device 5004 requests (or causes) electronic device 5002 (laptop computer) to display the updated content (e.g., display "popcorn kernel" in lieu of "popcorn" in notes user interface 5322 of FIG. 8L). In one or more embodiments, the updated content (e.g., the user's updated grocery list) is also displayed on display 5014 (e.g., in a notes user interface such as notes user interface 5222 of FIG. 8H). Concurrently displaying updates to content on a first display of a first electronic device that is placed over a second electronic device and a second display of the second electronic device allows the user to view updates to the content on either the first display or the second display. The foregoing eliminates a need to view updates to the content on a particular display, thereby reducing the cognitive burden on the user, and creating a more efficient human-machine interface. For battery-operated computer devices, allowing the user to view content faster and more efficiently conserves power and increases the time between battery charges.

In some embodiments, the third content is an update of the first content (934). In some embodiments, the first electronic device (e.g., electronic device 5004), in response to receiving the third sequence of user input, displays (934) the third content in a first content user interface that is displayed on the first display. In some embodiments, the first electronic device, in response to receiving the third sequence of user input also displays (934) a notification that the first content has been updated on the first electronic device. Continuing with the foregoing example, in some embodiments, while electronic device 5004 (smartphone) is placed over display 5012 (laptop computer's display) an input device of electronic device 5004 (smartphone) detects additional user inputs to edit content (e.g., change "popcorn" to "popcorn kernel"). In one or more embodiments, the updated content (e.g., the user's updated grocery list) is displayed on display 5014 (e.g., in a notes user interface such as notes user interface 5222 of FIG. 8H) together with a notification notifying the user that the content has been updated. The method provides an efficient way to inform the user that content has been updated, thereby reducing the cognitive burden on the user and creating a more efficient human-machine interface. For battery-operated computer devices, allowing the user to determine whether content has been updated faster and more efficiently conserves power and increases the time between battery charges.

In some embodiments, the first electronic device (e.g., electronic device 5004), in response to detecting the first sequence of user input, causes (936) the first content to be displayed in a second content user interface that is displayed on the second display. In some embodiments, the first electronic device, in response to detecting that the first electronic device has been removed from placement over the second display, causes the second content user interface to maintain display of the first content. FIGS. 8K-8L, for example, illustrate detecting tap gestures with contacts 7616-7619 over the keyboard of electronic device 5002 (laptop computer) to type "popcorn," and in response to detecting the tap gestures, displaying "popcorn" in notes user interface 5322, which is displayed on display 5012 (laptop computer's display). In some embodiments, notes user interface 5322 of FIGS. 8K-8L remains displayed on display 5012 even after electronic device 5004 (smartphone) is no longer placed over display 5012. While a first electronic device having a first display is placed over a second electronic device having a second display that has a larger screen size than the screen size of the first display, displaying content on the second display allows the user to view the content on the display with the larger screen size. The foregoing allows the user to view the content with more case and also allows the user to view additional content on common display, thereby reducing the cognitive burden on the user and creating a more efficient human-machine interface. Further, maintaining the display of the content on the second display after the first electronic device is no longer placed over the second electronic device allows the user to continue to view the content on the larger display. The foregoing also allows the user to view the content with more case, thereby reducing the cognitive burden on the user and creating a more efficient human-machine interface. For battery-operated computer devices, allowing the user to view content faster, more comfortably, and more efficiently conserves power and increases the time between battery charges.

In some embodiments, while the first electronic device is placed over the first region, the first electronic device (e.g., electronic device 5004) detects (938) that a third electronic device having a third display has also been placed over the first region. FIG. 8B, for example, illustrates electronic device 5004 (smartphone) placed over a first region of display 5012 (laptop computer's display). In some embodiments, another electronic device (e.g., another smartphone) is placed over the first region of display 5012 while electronic device 5004 is placed over display 5012. In some embodiments, in response to detecting the first sequence of user input while the first electronic device and the third electronic device are placed over the first region and in accordance with a determination that the user has selected the first electronic device, the first electronic device maintains (938) display of the first content on the first display. FIGS. 8B-8C, for example, illustrate detecting tap gestures with contacts 7604-7607 on the keyboard of electronic device 5002 (laptop computer) while cursor 5102 is displayed on display 5014 (smartphone's display). In the illustrated embodiment, focus is directed to electronic device 5004 while cursor 5102 is displayed on display 5014. As such, electronic device 5004, in response to detecting the tap gestures illustrated in FIG. 8B, displays the user's grocery list on display 5014. In some embodiments, in response to detecting the first sequence of user input while the first electronic device and the third electronic device are placed over the first region and in accordance with a determination that the user has selected the third electronic device, the first electronic device causes (938) the first content to be displayed on the third display. In some embodiments, where the user performs the tap gestures illustrated in FIG. 8K while focus is on a third electronic device (e.g., cursor 5102 is displayed on the display of the third electronic device), electronic device 5004 requests or causes the third electronic device to display the content (e.g., the user's grocery list) on the display of the third electronic device. While a first electronic device that is placed over a second electronic device, displaying content on a first display of the first electronic device if the user has selected the first electronic device allows the user to view the content on a display of an electronic device that has been selected by the user, thereby reducing the cognitive burden on the user and creating a more efficient human-machine interface. Similarly, while a third electronic device that is placed over the second electronic device, displaying content on a third display of the third electronic device if the user has selected the third electronic device also allows the user to view the content on a display of an electronic device that has been selected by the user, thereby reducing the cognitive burden on the user and creating a more efficient human-machine interface. For battery-operated computer devices, allowing the user to view content on a display of an electronic device selected by the user faster and more efficiently conserves power and increases the time between battery charges.

In some embodiments, while the first electronic device and the third electronic device are placed over the first region, the first electronic device (e.g., electronic device 5004) receives (940), via the second set of one or more input devices, a fourth sequence of user input that includes user input directed to updating the first content. In some embodiments, in response to detecting the fourth sequence of user input and in accordance with a determination that the user has selected the first electronic device, the first electronic device displays (940) the updated content in a first content user interface that is displayed on the first display. Continuing with the foregoing example, where a user input to update the user's grocery list is detected while electronic device 5004 (smartphone) and another electronic device (e.g., another smartphone) are both placed over the first region of display 5012 (laptop computer's display), the updated grocery list is displayed on display 5014 if focus is directed to electronic device 5004 (e.g., if cursor 5102 is displayed in display 5014). In some embodiments, in response to detecting the fourth sequence of user input and in accordance with a determination that the user has selected the third electronic device, the first electronic device causes (940) the updated content to be displayed in the third content user interface. Continuing with the foregoing example, where a user input to update the user's grocery list is detected while electronic device 5004 and another electronic device are both placed over the first region of display 5012 (laptop computer's display), the updated grocery list is displayed on the display of the other electronic device if focus is directed to the other electronic device (e.g., if cursor 5102 is displayed on the display of the other electronic device). While a first electronic device that is placed over a second electronic device, displaying an update to content on a first display of the first electronic device if the user has selected the first electronic device allows the user to view the update to the content on a display of an electronic device that has been selected by the user, thereby reducing the cognitive burden on the user and creating a more efficient human-machine interface. Similarly, while a third electronic device that is placed over the second electronic device, displaying an update to content on a third display of the third electronic device if the user has selected the third electronic device also allows the user to view the update to the content on a display of an electronic device that has been selected by the user, thereby reducing the cognitive burden on the user and creating a more efficient human-machine interface. For battery-operated computer devices, allowing the user to view an update to content on a display of an electronic device selected by the user faster and more efficiently conserves power and increases the time between battery charges.

The particular order in which the operations in FIGS. 9A-9D have been described is merely exemplary and is not intended to indicate that the described order is the only order in which the operations could be performed. One of ordinary skill in the art would recognize various ways to reorder the operations described herein. Additionally, details of the processes described above with respect to method 700 (e.g., FIGS. 7A-7F) are also applicable in an analogous manner to the methods described above. For example, method 700 optionally includes one or more of the characteristics of the various methods described above with reference to method 900. For example, the methods for interacting with content and user interface elements displayed on a display of an electronic device when the electronic device is placed over a display of another electronic device and when the electronic device is removed from the display of the other electronic device described above with reference to 900 are optionally used by method 700 to engage in cross device interactions. For brevity, these details are not repeated above.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. A method comprising:

at a first electronic device in communication with a first display, one or more input devices, and a second electronic device:

displaying, via the first display, a respective user interface including a first user interface element containing one or more selectable options associated with the second electronic device, wherein the first user interface element is displayed at a first location in the respective user interface relative to a first portion of the first display corresponding to content from the second electronic device, and the one or more selectable options are for controlling one or more operations of the second electronic device;

while displaying the first user interface element, detecting, via the one or more input devices, a user selection of a first selectable option of the one or more selectable options associated with the second electronic device; and in response to detecting the user selection:

initiating a process to transmit a signal to the second electronic device to perform a first operation from the one or more operations of the second electronic device corresponding to the first selectable option; and updating the respective user interface based on the first operation performed by the second electronic device corresponding to the first selectable option.

2. The method of claim 1, wherein the first user interface element is displayed adjacent to the first portion of the first display.

3. The method of claim 1, further comprising:

detecting an event corresponding to movement of a portion of the first display corresponding to the content from the second electronic device from the first portion of the first display to a second portion of the first display, different from the first portion; and in response to detecting the event:

ceasing to display the first user interface element at the first location in the respective user interface, and displaying, via the first display, the first user interface element at a second location in the respective user interface relative to the second portion of the first display corresponding to the content from the second electronic device.

4. The method of claim 1, wherein:

in accordance with a determination that the first portion of the first display has a first orientation, the first user interface element is displayed at a first relative position relative to the first portion of the first display, and in accordance with a determination that the first portion of the first display has a second orientation, different from the first orientation, the first user interface element is displayed at the first relative position relative to the first portion of the first display.

5. The method of claim 1, wherein the one or more selectable options are for recently-accessed applications on the second electronic device.

6. The method of claim 1, wherein at least one of the selectable options of the one or more selectable options is designated by a user.

7. The method of claim 1, further comprising:

detecting an event corresponding to no portion of the first display corresponding to the content from the second electronic device; and in response to detecting the event, ceasing to display the first user interface element in the respective user interface.

8. The method of claim 1, wherein the respective user interface includes a plurality of different application affordances for accessing a plurality of different applications on the first electronic device.

9. The method of claim 1, further comprising:

detecting, via the one or more input devices, an input while a user interface associated with the second electronic device is a first user interface; and in response to detecting the input, updating the user interface associated with the second electronic device to be a second user interface, different from the first user interface.

10. A first electronic device, comprising:

a first display;

one or more input devices;

one or more processors;

memory; and one or more programs stored in the memory and configured to be executed by the one or more processors, wherein the one or more programs include instructions for:

while the first electronic device is in communication with a second electronic device:

displaying, via the first display, a respective user interface including a first user interface element containing one or more selectable options associated with the second electronic device, wherein the first user interface element is displayed at a first location in the respective user interface relative to a first portion of the first display corresponding to content from the second electronic device, and the one or more selectable options are for controlling one or more operations of the second electronic device;

while displaying the first user interface element, detecting, via the one or more input devices, a user selection of a first selectable option of the one or more selectable options associated with the second electronic device; and in response to detecting the user selection:

initiating a process to transmit a signal to the second electronic device to perform a first operation from the one or more operations of the second electronic device corresponding to the first selectable option; and updating the respective user interface based on the first operation performed by the second electronic device corresponding to the first selectable option.

11. The first electronic device of claim 10, wherein the first user interface element is displayed adjacent to the first portion of the first display.

12. The first electronic device of claim 10, the one or more programs further including instructions for:

detecting an event corresponding to movement of a portion of the first display corresponding to the content from the second electronic device from the first portion of the first display to a second portion of the first display, different from the first portion; and in response to detecting the event:

ceasing to display the first user interface element at the first location in the respective user interface, and displaying, via the first display, the first user interface element at a second location in the respective user interface relative to the second portion of the first display corresponding to the content from the second electronic device.

13. The first electronic device of claim 10, wherein:

in accordance with a determination that the first portion of the first display has a first orientation, the first user interface element is displayed at a first relative position relative to the first portion of the first display, and in accordance with a determination that the first portion of the first display has a second orientation, different from the first orientation, the first user interface element is displayed at the first relative position relative to the first portion of the first display.

14. The first electronic device of claim 10, wherein the one or more selectable options are for recently-accessed applications on the second electronic device.

15. The first electronic device of claim 10, wherein at least one of the selectable options of the one or more selectable options is designated by a user.

16. The first electronic device of claim 10, the one or more programs further including instructions for:

detecting an event corresponding to no portion of the first display corresponding to the content from the second electronic device; and in response to detecting the event, ceasing to display the first user interface element in the respective user interface.

17. The first electronic device of claim 10, wherein the respective user interface includes a plurality of different application affordances for accessing a plurality of different applications on the first electronic device.

18. The first electronic device of claim 10, the one or more programs further including instructions for:

detecting, via the one or more input devices, an input while a user interface associated with the second electronic device is a first user interface; and in response to detecting the input, updating the user interface associated with the second electronic device to be a second user interface, different from the first user interface.

19. A non-transitory computer readable storage medium storing one or more programs, the one or more programs comprising instructions which, when executed by one or more processors of a first electronic device with a first display and one or more input devices, cause the first electronic device to perform a method including:

while the first electronic device is in communication with a second electronic device:

displaying, via the first display, a respective user interface including a first user interface element containing one or more selectable options associated with the second electronic device, wherein the first user interface element is displayed at a first location in the respective user interface relative to a first portion of the first display corresponding to content from the second electronic device, and the one or more selectable options are for controlling one or more operations of the second electronic device;

while displaying the first user interface element, detecting, via the one or more input devices, a user selection of a first selectable option of the one or more selectable options associated with the second electronic device; and in response to detecting the user selection:

initiating a process to transmit a signal to the second electronic device to perform a first operation from the one or more operations of the second electronic device corresponding to the first selectable option; and updating the respective user interface based on the first operation performed by the second electronic device corresponding to the first selectable option.

20. The non-transitory computer readable storage medium of claim 19, wherein the first user interface element is displayed adjacent to the first portion of the first display.

21. The non-transitory computer readable storage medium of claim 19, the method further comprising:

detecting an event corresponding to movement of a portion of the first display corresponding to the content from the second electronic device from the first portion of the first display to a second portion of the first display, different from the first portion; and in response to detecting the event:

ceasing to display the first user interface element at the first location in the respective user interface, and displaying, via the first display, the first user interface element at a second location in the respective user interface relative to the second portion of the first display corresponding to the content from the second electronic device.

22. The non-transitory computer readable storage medium of claim 19, wherein:

in accordance with a determination that the first portion of the first display has a first orientation, the first user interface element is displayed at a first relative position relative to the first portion of the first display, and in accordance with a determination that the first portion of the first display has a second orientation, different from the first orientation, the first user interface element is displayed at the first relative position relative to the first portion of the first display.

23. The non-transitory computer readable storage medium of claim 19, wherein the one or more selectable options are for recently-accessed applications on the second electronic device.

24. The non-transitory computer readable storage medium of claim 19, wherein at least one of the selectable options of the one or more selectable options is designated by a user.

25. The non-transitory computer readable storage medium of claim 19, the method further comprising:

detecting an event corresponding to no portion of the first display corresponding to the content from the second electronic device; and in response to detecting the event, ceasing to display the first user interface element in the respective user interface.

26. The non-transitory computer readable storage medium of claim 19, wherein the respective user interface includes a plurality of different application affordances for accessing a plurality of different applications on the first electronic device.

27. The non-transitory computer readable storage medium of claim 19, the method further comprising:

detecting, via the one or more input devices, an input while a user interface associated with the second electronic device is a first user interface; and in response to detecting the input, updating the user interface associated with the second electronic device to be a second user interface, different from the first user interface.

* * * * *